(12) United States Patent
Bard et al.

(10) Patent No.: US 10,826,697 B2
(45) Date of Patent: Nov. 3, 2020

(54) CONFIGURING A LOAD CONTROL SYSTEM

(71) Applicant: Lutron Technology Company LLC, Coopersburg, PA (US)

(72) Inventors: Benjamin F. Bard, Zionsville, PA (US); Craig Alan Casey, Coopersburg, PA (US); Erica L. Clymer, Northampton, PA (US); Christina Evans, Quakertown, PA (US); Christopher Matthew Jones, St. Davids, PA (US); Sanjeev Kumar, Harleysville, PA (US); John Nill, Emmaus, PA (US); Neil R. Orchowski, Plymouth Meeting, PA (US); Brent Protzman, Easton, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 274 days.

(21) Appl. No.: 15/922,796

(22) Filed: Mar. 15, 2018

(65) Prior Publication Data

US 2018/0270063 A1     Sep. 20, 2018

Related U.S. Application Data

(60) Provisional application No. 62/471,782, filed on Mar. 15, 2017, provisional application No. 62/520,002, (Continued)

(51) Int. Cl.
*H04L 9/32* (2006.01)
*F24F 11/52* (2018.01)
(Continued)

(52) U.S. Cl.
CPC .............. *H04L 9/321* (2013.01); *F24F 11/52* (2018.01); *F24F 11/56* (2018.01); *F24F 11/63* (2018.01); *G05B 19/0426* (2013.01); *H04L 12/281* (2013.01); *H04L 12/282* (2013.01); *H04L 63/0876* (2013.01); *H05B 47/19* (2020.01); *H05B 47/105* (2020.01)

(58) Field of Classification Search
None
See application file for complete search history.

(56) References Cited

U.S. PATENT DOCUMENTS 5,248,919 A  9/1993 Hanna et al.
5,905,442 A  5/1999 Mosebrook et al.
(Continued)

*Primary Examiner* — Ramesh B Patel
(74) *Attorney, Agent, or Firm* — Flaster Greenberg, P.C.

(57) ABSTRACT

A load control system may be configured using a graphical user interface (GUI) software. The GUI software may be implemented to collect control devices and add the control devices to the load control system for configuration. Programming data may be automatically determined for the added control devices based on the type of control device, the location of the control device, and/or the load type controlled by the control device. The programming data may include control settings for a scene, a schedule, or an automated control feature. The programming data may be displayed for being viewed and/or adjusted by a user. The programming data may be transmitted to the control devices and/or a system controller for being implemented in performing load control.

22 Claims, 45 Drawing Sheets

Related U.S. Application Data filed on Jun. 15, 2017, provisional application No. 62/553,749, filed on Sep. 1, 2017, provisional application No. 62/637,290, filed on Mar. 1, 2018.

(51) Int. Cl.

| | |
|---|---|
| *F24F 11/56* | (2018.01) |
| *F24F 11/63* | (2018.01) |
| *H04L 29/06* | (2006.01) |
| *G05B 19/042* | (2006.01) |
| *H04L 12/28* | (2006.01) |
| *H05B 47/19* | (2020.01) |
| *H05B 47/105* | (2020.01) |

(56) References Cited

U.S. PATENT DOCUMENTS

| | | | |
|---|---|---|---|
| 8,228,163 B2 | 7/2012 | Cash et al. | |
| 8,417,388 B2 | 4/2013 | Altonen et al. | |
| 2002/0152298 A1* | 10/2002 | Kikta | H04L 67/34 709/223 |
| 2008/0092075 A1* | 4/2008 | Jacob | H05B 47/18 715/771 |
| 2009/0206983 A1 | 8/2009 | Knode et al. | |
| 2010/0141153 A1* | 6/2010 | Recker | H05B 45/00 315/149 |
| 2012/0026726 A1* | 2/2012 | Recker | H01Q 1/44 362/157 |
| 2012/0248210 A1* | 10/2012 | Warren | G05D 23/1902 236/1 C |
| 2014/0001977 A1 | 1/2014 | Zacharchuk et al. | |
| 2014/0132475 A1 | 5/2014 | Bhutani et al. | |
| 2014/0265568 A1 | 9/2014 | Crafts et al. | |
| 2015/0185752 A1 | 7/2015 | Bard et al. | |
| 2015/0253364 A1* | 9/2015 | Hieda | G01R 21/00 702/62 |
| 2016/0170389 A1* | 6/2016 | Im | G05B 15/02 700/275 |
| 2016/0174146 A1* | 6/2016 | Wang | H04L 63/101 370/254 |
| 2016/0284207 A1* | 9/2016 | Hou | H04L 63/0853 |
| 2017/0209338 A1* | 7/2017 | Potucek | B25J 9/1694 |
| 2017/0234562 A1* | 8/2017 | Ribbich | G05B 19/048 700/277 |
| 2017/0235470 A1* | 8/2017 | Baluja | H05B 47/175 715/735 |

* cited by examiner

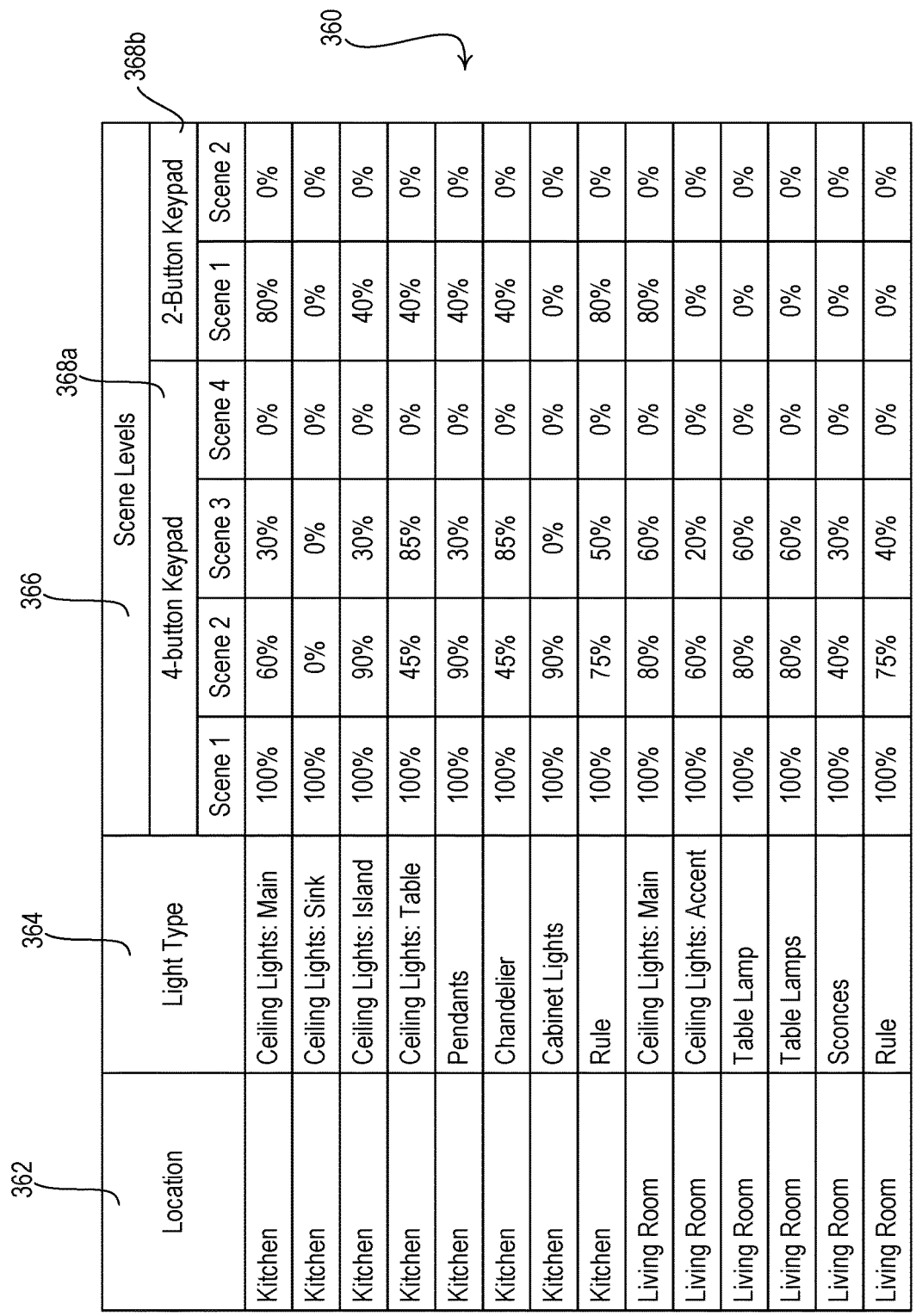

| Location | Light Type | Scene Levels | | | | | |
|---|---|---|---|---|---|---|---|
| | | 4-button Keypad | | | | 2-Button Keypad | |
| | | Scene 1 | Scene 2 | Scene 3 | Scene 4 | Scene 1 | Scene 2 |
| Kitchen | Ceiling Lights: Main | 100% | 60% | 30% | 0% | 80% | 0% |
| Kitchen | Ceiling Lights: Sink | 100% | 0% | 0% | 0% | 0% | 0% |
| Kitchen | Ceiling Lights: Island | 100% | 90% | 30% | 0% | 40% | 0% |
| Kitchen | Ceiling Lights: Table | 100% | 45% | 85% | 0% | 40% | 0% |
| Kitchen | Pendants | 100% | 90% | 30% | 0% | 40% | 0% |
| Kitchen | Chandelier | 100% | 45% | 85% | 0% | 40% | 0% |
| Kitchen | Cabinet Lights | 100% | 90% | 0% | 0% | 0% | 0% |
| Kitchen | Rule | 100% | 75% | 50% | 0% | 80% | 0% |
| Living Room | Ceiling Lights: Main | 100% | 80% | 60% | 0% | 80% | 0% |
| Living Room | Ceiling Lights: Accent | 100% | 60% | 20% | 0% | 0% | 0% |
| Living Room | Table Lamp | 100% | 80% | 60% | 0% | 0% | 0% |
| Living Room | Table Lamps | 100% | 80% | 60% | 0% | 0% | 0% |
| Living Room | Sconces | 100% | 40% | 30% | 0% | 0% | 0% |
| Living Room | Rule | 100% | 75% | 40% | 0% | 0% | 0% |

FIG. 3Q

CONFIGURING A LOAD CONTROL SYSTEM

CROSS-REFERENCE TO RELATED APPLICATIONS

This application claims priority from U.S. Provisional Patent Application No. 62/471,782, filed Mar. 15, 2017, and U.S. Provisional Patent Application No. 62/520,002, filed Jun. 15, 2017, and U.S. Provisional Patent Application No. 62/553,749, filed Sep. 1, 2017, and U.S. Provisional Patent Application No. 62/637,290, filed Mar. 1, 2018. All above mentioned applications are hereby incorporated by reference.

BACKGROUND

A load control environment, such as a residence or an office building, for example, may be configured with various types of load control systems. For example, a lighting control system may be used to control the lighting loads in the user environment. A motorized window treatment control system may be used to control the natural light provided to the user environment. A heating, ventilation, and air-conditioning (HVAC) system may be used to control the temperature in the user environment.

Each load control system may include various control devices, including control-source devices and control-target devices. The control-target devices may receive digital messages from one or more of the control-source devices. The digital messages may include load control messages for controlling an electrical load. The control-target devices may be capable of directly controlling the electrical load. The control-source devices may be capable of indirectly controlling the electrical load via the control-target device by sending digital messages to the control-target device that include control instructions for controlling the electrical load controlled by the control-target device.

The programming procedures for programming the control devices in a load control system are time consuming and often fail to be consistently implemented in similar rooms in a building, or in similar rooms in different buildings. Each of the control devices in the load control system are programmed by an on-site technician individually by making selections on the devices themselves, or by performing device-by-device programming at a remote location and uploading the programming instructions to the system as a whole. These programming procedures are not tailored to the needs of the occupants of a building and their specific load control system, and can prevent consistency in how control devices are controlled in similar locations.

Once the control devices have been programmed, it is also difficult to update the settings to make changes tailored to individual user preferences. Performing such individualized programming is often time consuming due to the number of settings available for programming in a load control system, as well as the difficulty of performing the programming.

A user account may need to be created before some features may be configured, for example, to integrate with a third party service to allow the third party service to (access information associated with the load control system and/or to control the load control system. The third party service may be executed by a remote server and may require authorization for access to the load control system to enable the third party service to request information regarding the load control system and/or to all control of the load control system by the third party service. The authorization for access to the load control system may be granted via a user account associated with the load control system. However, when commissioning the load control system, a user account associated with the load control system may not yet exist to allow the third party service to obtain authorization to access the system information and/or control the load control system.

SUMMARY

As described herein, a load control system may be configured using a graphical user interface (GUI) software. Using the GUI software, control devices may be collected and added to the load control system for configuration. The control devices may be collected by a user choosing a type of control device to add to the load control system on a network device. A button may be actuated on the control device to transmit an identifier of the control device to a system controller for discovering the control device. A room may be selected in which the control device is located. The identifier and the selected room may be stored in a database. A load type may be selected that is controlled by the control device, which may also be stored in the database. For example, when the control device is a lighting control device, a light type may be selected that is controlled by the lighting control device.

Programming data may be automatically determined based on the collected control devices. The programming data may be automatically determined for a control device based on the type of control device, the location of the control device, and/or the load type controlled by the control device. The programming data may include settings for one or more control features, such as, a scene (e.g., a preset), a schedule, or an automated control feature. The automated control feature may comprise location-based services for automatically controlling the control devices. Different locations or load types may cause different programming data to be generated for the same control device.

The determined programming data may be displayed for being viewed and/or adjusted by a user. User selections may be received to adjust the programming data. The programming data may be transmitted to the control devices and/or a system controller for being implemented in performing load control.

The load control system may be configured (e.g., automatically programmed with the determined programming data) prior the creation of an account associated with the load control system. In addition, a third party service (e.g., executed by a third party server) may be authorized for access to the load control system prior the creation of the account associated with the load control system. The authorization to access the load control system may allow the third party service to acquire information regarding the load control system and/or control of the load control system after the account is created. Prior to authorization being granted, the third party service may transmit an indication of the load control system to an authorization device (e.g., an authorization server). The authorization device may determine if the third party service is authorized for access. For example, the authorization device may monitor for an event (e.g., a button push on a device associated with the load control system) to verify the authorization request for access to the load control system. When access has been authorized, the authorization device may transmit a token to the third party service. The token may be used by the third party service to access the load control system (e.g., to request information regarding the load control system and/or to control the load control system).

A device (e.g., the third party server) may receive an authorization request from another device (e.g., a network device). The request may be authorization to access information associated with a system (e.g., a load control system). The request may include an identifier of the system (e.g., a media access control (MAC) address associated with the load control system). The request may be verified by another device within the system (e.g., a system controller within the load control system). When the request has been verified, the device (e.g., the third party server) may transmit an access token to a device associated with the system (e.g., a resource server). The access token may be configured to allow the third party server to access the system (e.g., to access information associated with the load control system).

DETAILED DESCRIPTION

Figure 1:
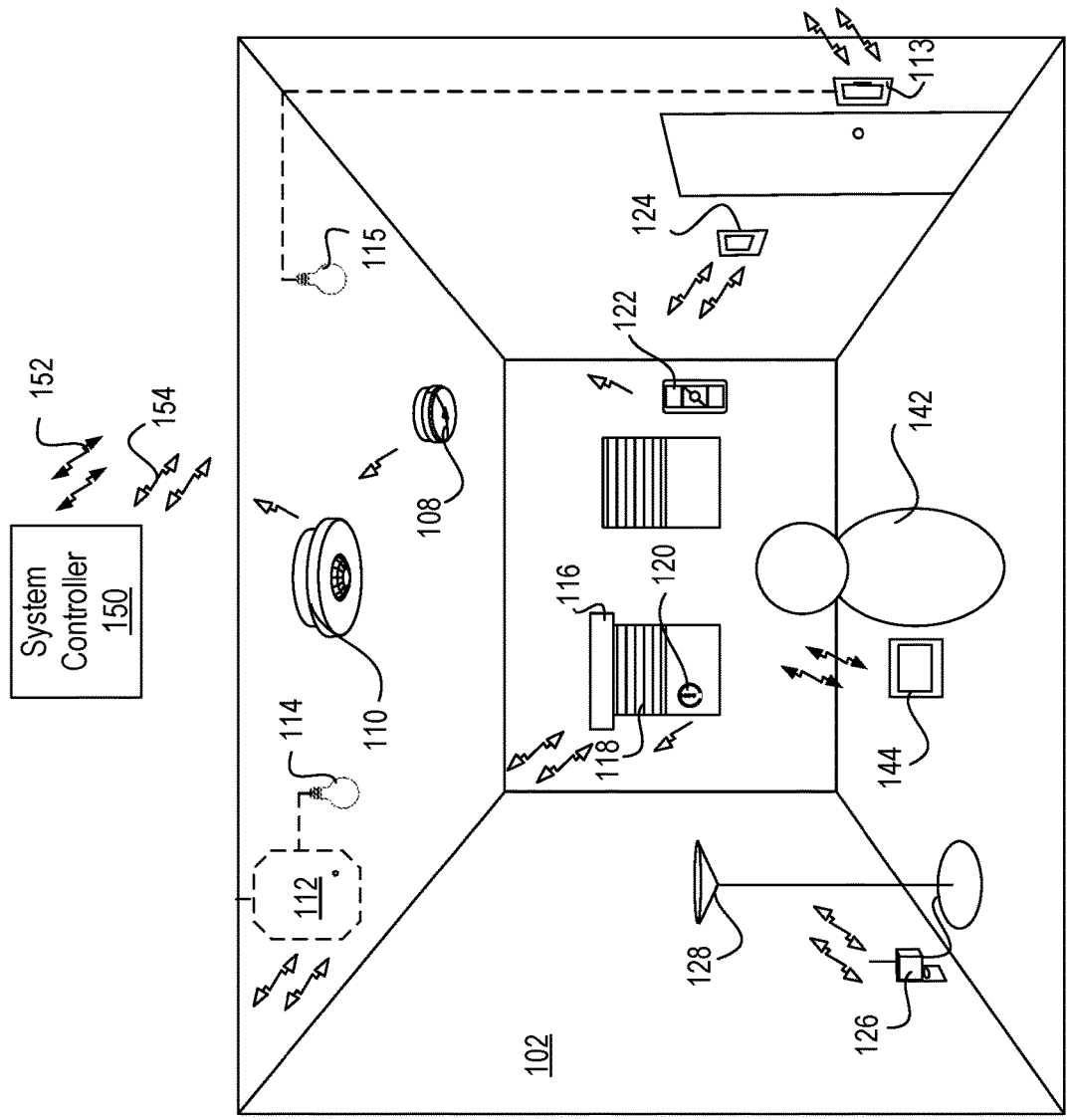
FIG. 1 is a system diagram that illustrates an example load control environment for configuring control devices and controlling electrical loads.

FIG. 1 depicts a load control system 100 that includes load control devices for controlling electrical loads. As shown in FIG. 1, the load control system 100 may be a load control environment, e.g., a room 102 in a building. The load control system 100 may include control devices that may be capable of controlling (e.g., directly controlling) an electrical load. The control devices may include control-source devices capable of communicating digital messages for controlling electrical loads and/or control-target devices capable of controlling electrical loads in response to instructions received in digital messages. The control-target devices may include load control devices capable of directly controlling the electrical loads in response to the instructions received in the digital messages from control-source devices.

Lighting control devices, such as the lighting control devices 112, 113, may be an example of control-target devices in the load control system 100. The lighting control device 112 may be a dimmer, an electronic switch, a ballast, a light emitting diode (LED) driver, and/or the like. The lighting control device 112 may be capable of directly controlling an amount of power provided to lighting load 114. The lighting control device 112 may be configured to wirelessly receive digital messages via the RF signals 154 (e.g., from the system controller 150 and/or another associated control device) and to control the lighting load 114 in response to the received digital messages.

The lighting control device 113 may be a wall-mounted dimmer, a wall-mounted switch, or other keypad device for controlling a lighting load 115. The lighting control device 113 may be adapted to be mounted in a standard electrical wallbox. The lighting control device 113 may comprise a tabletop or plug-in load control device. The lighting control device 113 may comprise one or more buttons for controlling the lighting load 115. The lighting control device 113 may include a toggle actuator. Actuations (e.g., successive actuations) of the toggle actuator may toggle (e.g., turn off and on) the lighting load 115. The lighting control device 113 may include an intensity adjustment actuator (e.g., a rocker switch or intensity adjustment buttons). Actuations of an upper portion or a lower portion of the intensity adjustment actuator may respectively increase or decrease the amount of power delivered to the lighting load 115 and thus increase or decrease the intensity of the receptive lighting load from a minimum intensity (e.g., approximately 1%) to a maximum intensity (e.g., approximately 100%). The lighting control device 113 may comprise a plurality of visual indicators, e.g., light-emitting diodes (LEDs), which may be arranged in a linear array and are illuminated to provide feedback of the intensity of the lighting load 115. Examples of wall-mounted dimmers are described in greater detail in U.S. Pat. No. 5,248,919, issued Sep. 29, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The lighting control device 113 may be configured to wirelessly receive digital messages via wireless signals, such as radio-frequency (RF) signals 154 (e.g., from the system controller 150 and/or another associated control device) using a first wireless protocol (e.g., a proprietary protocol, such as the ClearConnect protocol). The lighting control device 113 may be configured to control the lighting load 115 in response to the received digital messages. Examples of dimmer switches operable to transmit and receive digital messages is described in greater detail in commonly-assigned U.S. patent application Ser. No. 12/033,223, filed Feb. 19, 2008, entitled COMMUNICATION PROTOCOL FOR A RADIO-FREQUENCY LOAD CONTROL SYSTEM, the entire disclosure of which is hereby incorporated by reference.

The load control system 100 may include one or more other control-target devices, such as a motorized window treatment 116 for directly controlling the covering material 118 (e.g., via an electrical motor); a plug-in load control device 126 for directly controlling a floor lamp 128 a desk lamp, and/or other electrical loads that may be plugged into the plug-in load control device 126; and/or a temperature control device 124 (e.g., thermostat) for directly controlling an HVAC system. The load control system 100 may also, or alternatively, include an audio control device (e.g., a speaker system) and/or a video control device (e.g., a device capable of streaming video content).

The control-source devices in the load control system 100 may include a remote control device 122, an occupancy sensor 110, a daylight sensor 108, and/or a window sensor 120. The control-source devices may send digital messages to associated control-target devices for indirectly controlling an electrical load by transmitting digital messages, such as load control messages, to the control-target devices. The remote control device 122 may send digital messages for controlling control-target devices after actuation of one or more buttons on the remote control device 122. One or more buttons may correspond to a preset (e.g., a scene) for controlling the lighting load 115. The occupancy sensor 110 may send digital messages to control-target devices in response to an occupancy or vacancy condition (e.g., movement or lack of movement) that is sensed within its observable area. The daylight sensor 108 may send digital messages to control-target devices in response to the detection of an amount of light within its observable area. The window sensor 120 may send digital messages to control-target devices in response to a measured level of light received from outside of the load control system 100. For example, the window sensor 120 may detect when sunlight is directly shining into the window sensor 120, is reflected onto the window sensor 120, and/or is blocked by external means, such as clouds or a building. The window sensor 120 may send digital messages indicating the measured light level.

The control-source devices and/or the control-target devices may be in communication with a system controller 150. The system controller 150 may be capable of transmitting digital messages to, and/or receiving digital messages from, control devices (e.g., control-source devices and/or control-target devices). The digital messages may include association information for associating control-source devices and control-target devices.

The system controller 150 may facilitate communication of control information from control-source devices to associated control-target devices using the association information. For example, the system controller 150 may communicate with one or more control devices (e.g., control-source devices and/or control-target devices) using the radio frequency (RF) signals 154. When the system controller 150 receives a digital message from a control device, the system controller may facilitate the communication of control instructions and/or other information to associated devices using the association information. The system controller 150 may also receive programming data (e.g., settings) for control devices and transmit messages for performing control according to the programming data.

The system controller 150 may also, or alternatively, communicate via wireless signals, such as RF signals 152, using a second wireless protocol (e.g., a standard protocol, such as WiFi, Bluetooth, etc.). For example, the system controller 150 may communicate with one or more network devices, such as a network device 144. The network device 144 may include a personal computer (PC), a laptop, a tablet, a smart phone, or equivalent device via the RF signals 152. The system controller 150 may be a gateway device, a network bridge device, an access point, and/or the like. Examples of load control systems having system controllers 150 are described in greater detail in commonly-assigned U.S. Patent Application Publication No. 2014/0001977, published Jan. 2, 2014, entitled LOAD CONTROL SYSTEM HAVING INDEPENDENTLY-CONTROLLED UNITS RESPONSIVE TO A BROADCAST CONTROLLER, and U.S. Patent Application Publication No. 2015/0185752, published Jul. 2, 2015, entitled WIRELESS LOAD CONTROL SYSTEM, the entire disclosures of which are hereby incorporated by reference.

The control-source devices in load control system 100 may be associated with the control-target devices using various association techniques. For example, in an association procedure, the control-source devices may be associated with the control-target devices by the user 142 actuating a button on the control-source device and/or the control-target device. The actuation of the button on the control-source device and/or the control-target device may place the control-source device and/or the control-target device in an association mode, for example, for being associated with one another. In the association mode, the control-source device may transmit an association message to the control-target device. The association message from a control-source device may include a unique identifier of the control-source device. The control-target device may locally store the unique identifier of the control-source, such that the control-target device may be capable of recognizing digital messages (e.g., subsequent digital messages) from the control-source device that may include load control instructions. The control-target device may be capable of responding to the digital messages from the associated control-source device by controlling a corresponding electrical load according to the load control instructions received in the digital messages. Examples of load control systems are described in greater detail in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, and U.S. Pat. No. 8,417,388, issued Apr. 9, 2013, entitled LOAD CONTROL SYSTEM HAVING AN ENERGY SAVINGS MODE, the entire disclosures of which are hereby incorporated by reference.

The load control system 100 may be designed and/or configured using a design software, e.g., a graphical user interface (GUI) software, running on the network device 144, such as a personal computer (PC), a laptop, a tablet, a smart phone, or equivalent device having a visual display. Using the design software, a user 142 may select the control devices (e.g., the control devices of the load control system, such as control-source devices and/or control target devices) and/or adjust programming data for configuring the system. For example, the user 142 may be a homeowner, who may be using the network device 144 to design and/or configure the load control system 100 in a house in which the homeowner lives. In addition, the user 142 may be a worker, such as an electrical contractor, who may be hired by the homeowner to design and/or configured the load control system 100 in a house in which the homeowner lives. Examples of configuration procedures for load control systems are described in greater detail in commonly-assigned U.S. Pat. No. 8,228,163, issued Jul. 24, 2012, entitled HANDHELD PROGRAMMER FOR LIGHTING CONTROL SYSTEM, and U.S. Patent Application Publication No. 2014/0265568, published Sep. 18, 2014, entitled COMMISSIONING LOAD CONTROL SYSTEMS, the entire disclosures of which are hereby incorporated by reference.

The functionality of the load control system 100 may be automatically configured by the design software in response to types of control devices (e.g., lighting control devices, remote control devices, etc.) that are added to the load control system during the configuration procedure. The design software may automatically generate the programming data (e.g., including one or more control features) that defines the operation of the load control system 100 based on the location and/or load type of the control devices that have been added to the load control system. After the control devices have been added to the load control system 100, the design software may be configured to review with the user of the design software the details of the control features that were automatically programmed. The user may confirm that the automatically programmed functionality is desired and/ or manually edit the control features. Once functionality of the control features is confirmed and/or edited, portions of the programming database may be transmitted to the control devices of the load control system 100 for use during normal operation of the load control system. For example, the full programming database may be transferred from the network device 144 to the system controller 150 and the system controller 150 may transmit the portions of the programming database to each of the control devices. As soon as the system controller 150 begins to transmit the portions of the programming database to the control devices, the user may be able to use the network device 144 to control the operation of the load control system 100. For example, since the entire programming database is stored on the system controller, the user may select a command using the network device 144 and the network device 144 may transmit a message including the command to the system controller 150, which may in turn transmit commands to the appropriate control devices of the load control system 100 (e.g., based on the programming data base stored on the system controller. The programming data that is transferred to the control devices may be used when the control devices transmit commands directly to load control devices. As soon as a load control device has its portion of the database, the load control device may be controlled by the control devices (e.g., remote control devices and other control devices in the system).

The design software executing at the system controller 150 may automatically update the programming data after the programming data has been transmitted to the control devices and the load control system 100 is fully functional (e.g., during normal operation). When one or more control devices (e.g., lighting control devices and/or remote control devices) are added to the load control system 100, the design software executing at the system controller 150 may automatically update the control features associated with the added control devices and/or add control features. For example, if the user uses the design software to add a lighting control device to the load control system 100 via the network device 144, the design software executing at the system controller 150 may automatically add the lighting control device to various scenes and/or schedules. When automatically updating the control features after the programming data is transmitted to the control devices, the design software may not overwrite manual changes previously made by the user to the control features. This may ensure that a user's manual changes are maintained after subsequent automatic updates.

Figure 2A:
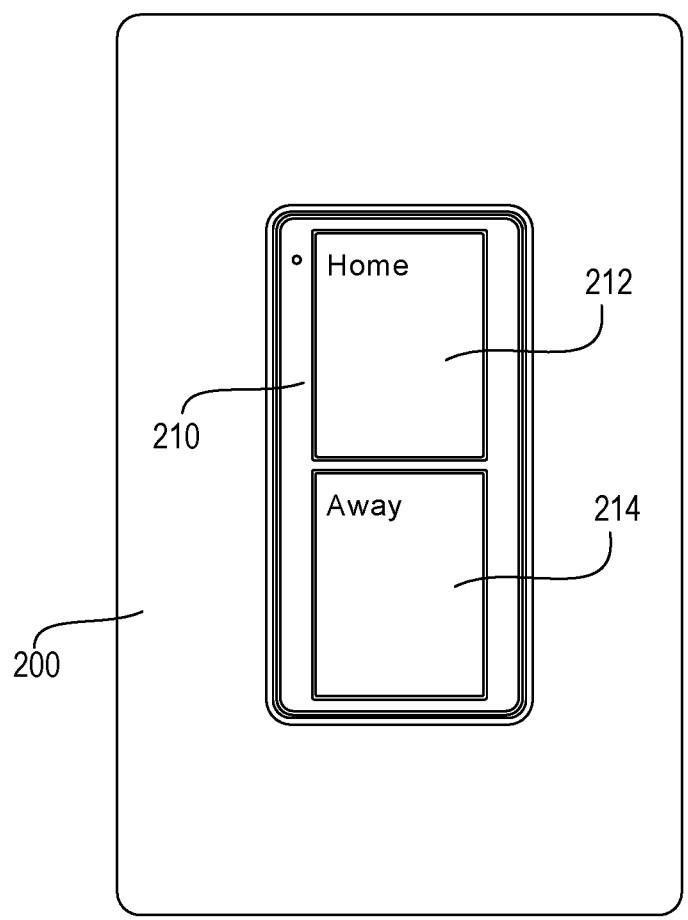
FIGS. 2A and 2B illustrate example configurations of wall-mounted remote control devices.
Figure 2B:
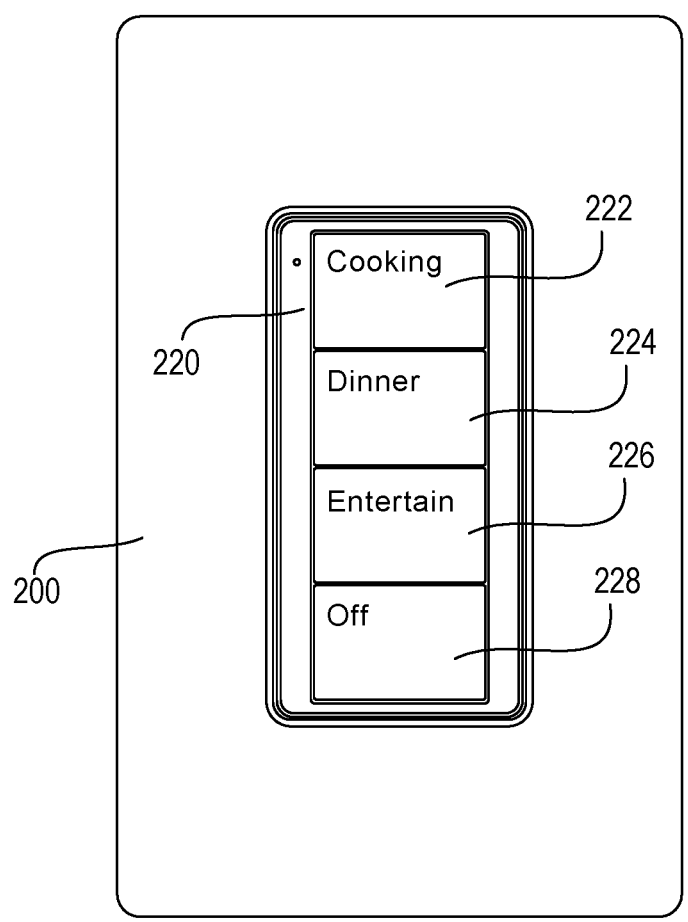

FIGS. 2A and 2B show example configurations of wall-mounted remote control devices, similar to the remote control device 122 of the load control system 100 shown in FIG. 1. FIG. 2A shows an example configuration of a two-button remote control device 210. The remote control device 210 may be mounted in a faceplate 200. The remote control device 210 may include buttons 212, 214 that correspond to different scenes for controlling electrical loads in a load control environment. The scenes may correspond to a location (e.g., room or rooms) in a load control environment where the remote control device 210 may be installed. For example, the remote control device 210 may include a configuration for an entryway into a home or other building.

The settings for the scenes may be programmed as described herein. For example, the settings for the "Home" button 212 and the "Away" button 214 may be automatically programmed to control one or more electrical loads. After programming of the "Home" button 212 and/or the "Away" button 214, the remote control device 210 may detect the actuation of the "Home" button 212 or the "Away" button 214 and transmit digital messages to control one or more load control devices (e.g., directly to the load control devices or via the system controller 150) according to the programmed settings. For example, the remote control device 210 may detect the actuation of the "Home" button 212 and transmit a digital message that causes one or more lighting control devices to set the dimming levels of corresponding lighting loads to respective preset intensities (e.g., a first lighting load may be set to 75% and a second lighting load may be set to 50%). The remote control device 210 may detect the actuation of the "Away" button 214 and transmit a digital message that causes the lighting control devices to set the dimming levels of the corresponding lighting loads to other preset intensities (e.g., both to 0%).

FIG. 2B shows another example configuration of a four-button remote control device 220. The remote control device 220 may be mounted in the faceplate 200 or a different faceplate. The remote control device 220 may include buttons 222, 224, 226, 228 that correspond to different scenes for controlling electrical loads in a load control environment. The scenes may correspond to a location (e.g., room or rooms) in a load control environment where the remote control device 220 may be installed. For example, the remote control device 220 may include a configuration for a kitchen and/or dining area.

The settings for the scenes may be programmed as described herein. After programming the buttons 222, 224, 226, 228, the remote control device 220 may detect the actuation of one of the buttons 222, 224, 226, 228 and transmit digital messages to control one or more load control devices (e.g., directly to the load control devices or via the system controller 150) according to the programmed settings for the button. For example, the remote control device 220 may detect the actuation of the "Cooking" button 222 and transmit a digital message that cause one or more lighting control devices to set the dimming levels of corresponding lighting load to respective preset intensities (e.g., a first lighting load may be set to 75% and a second lighting load may be set to 50%). The remote control device 220 may detect the actuation of the "Dinner" button 224 or the "Entertain" button 226 and transmit a digital message that causes the lighting control devices to set the dimming levels of the corresponding lighting loads to other preset intensities (e.g., both to 25%). The "Off" button 228 may cause the remote control device 220 to transmit a digital message that causes the lighting control devices to turn off (e.g., preset intensities of 0%).

If there are multiple keypads of the same type in a single room (e.g., multiple four-button keypads having the same scene buttons), each of the keypads of the same type may operate in the same manner (e.g., to select the same scenes). For example, when the user manually changes the programming data of a scene of one of the multiple keypads, each of the keypads of the same type in the room may then operate to select the edited scene.

Though the remote control devices 210, 220 includes a two-button configuration and a four-button configuration, respectively, as shown in FIGS. 2A and 2B, other configurations may be implemented that include different numbers of scenes. Additionally, though the remote control devices 210, 220 are wall-mounted remote control devices, the remote control devices 210, 220 may be detached from the wall. For example, the remote control devices 210, 220 may be handheld and/or may be mounted to a base portion to be located on a surface, such as a tabletop. Further, though the remote control devices 210, 220 illustrate particular scenes, the remote control devices 210, 220 may include different scenes that may be programmed as described herein. For example, the remote control devices 210, 220 may include different scenes for a living room or entertainment area (e.g., a relax scene, a movie scene, an entertain scene, etc.), different scenes for a bedroom (e.g., a wake scene, a relax scene, an alert scene, a goodnight scene, etc.), or different scenes for other locations within a home or other building. A wall switch/dimmer (which may have an integral load control circuit, such as a dimming circuit) may include similar buttons as shown in FIGS. 2A and 2B for implementing scenes in the load control environment.

Figure 3A:
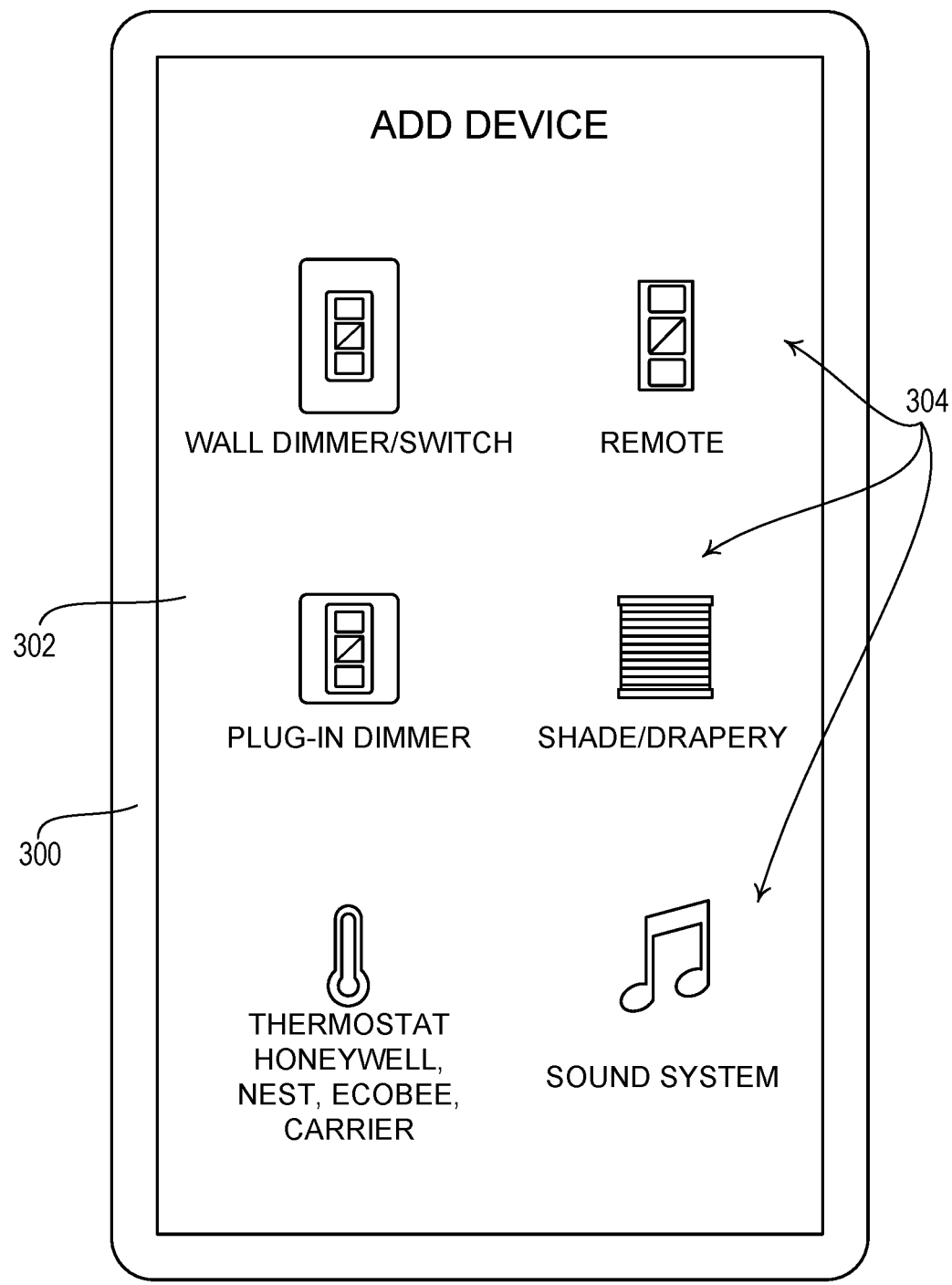
FIGS. 3A-3P illustrate example configurations of a user interface that may be displayed on a visual display for designing and/or configuring a load control system.
Figure 3B:
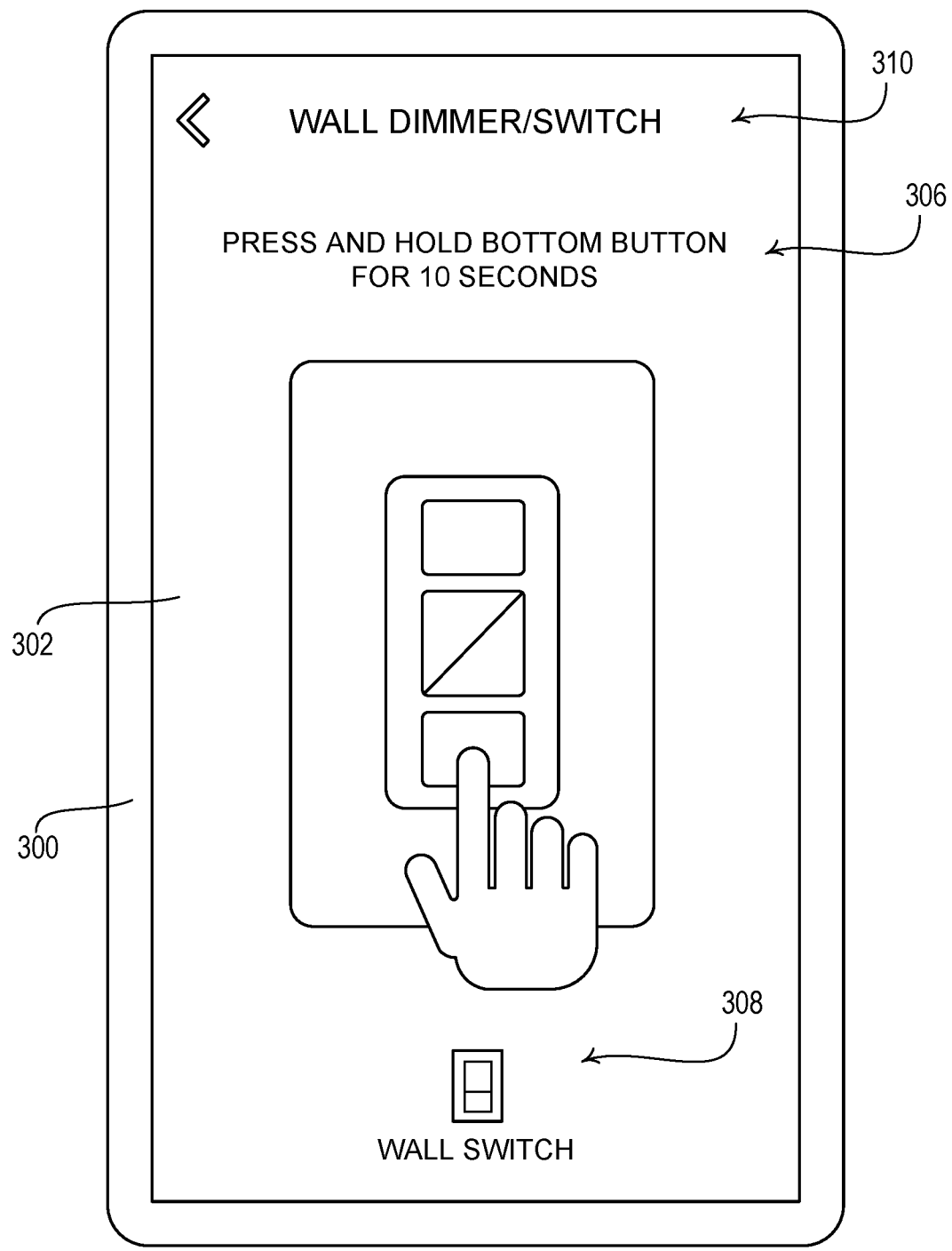
FIG. 3Q illustrates a portion of an example lookup table that may be used to automatically generate programming data for a load control system.
Figure 3C:
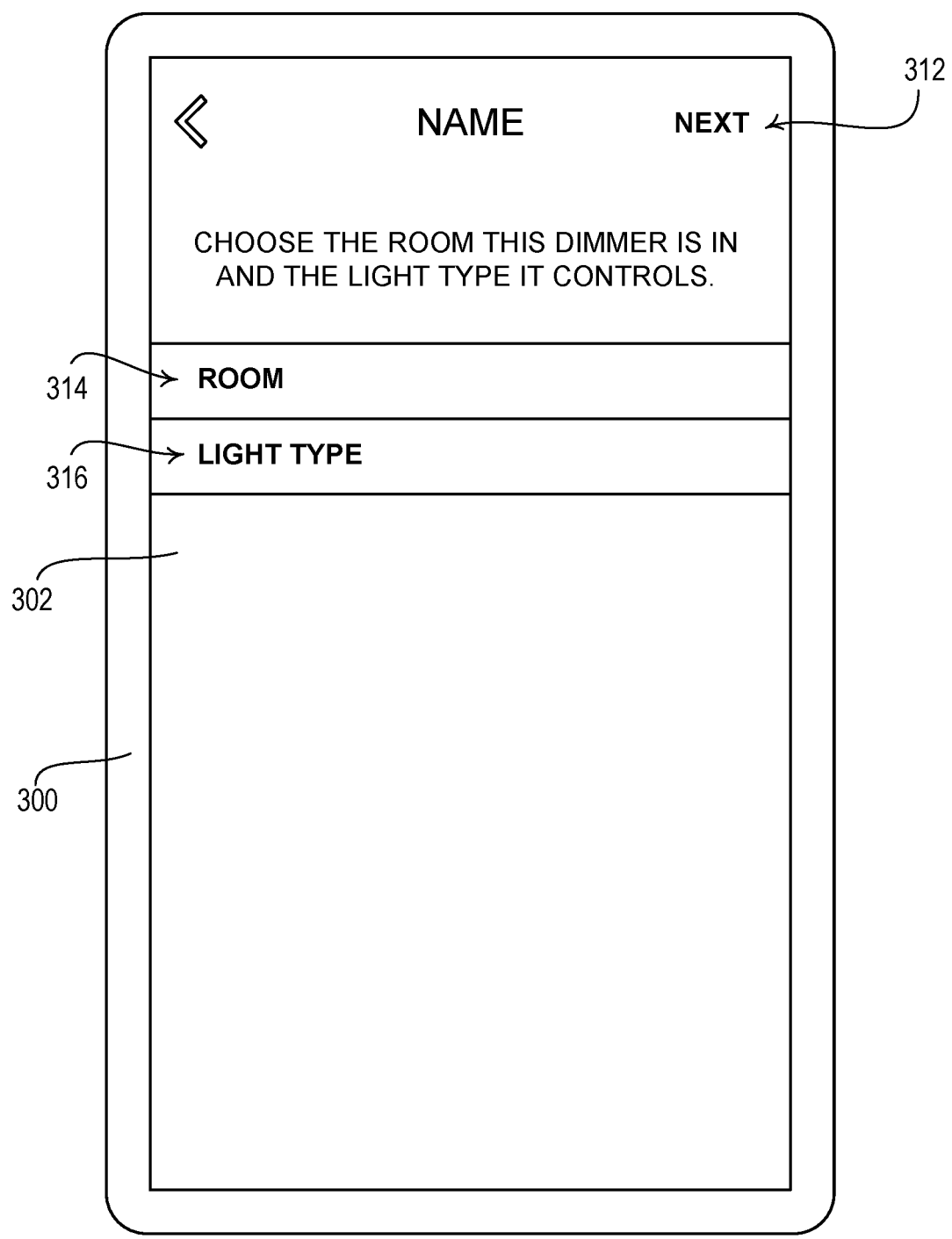
Figure 3D:
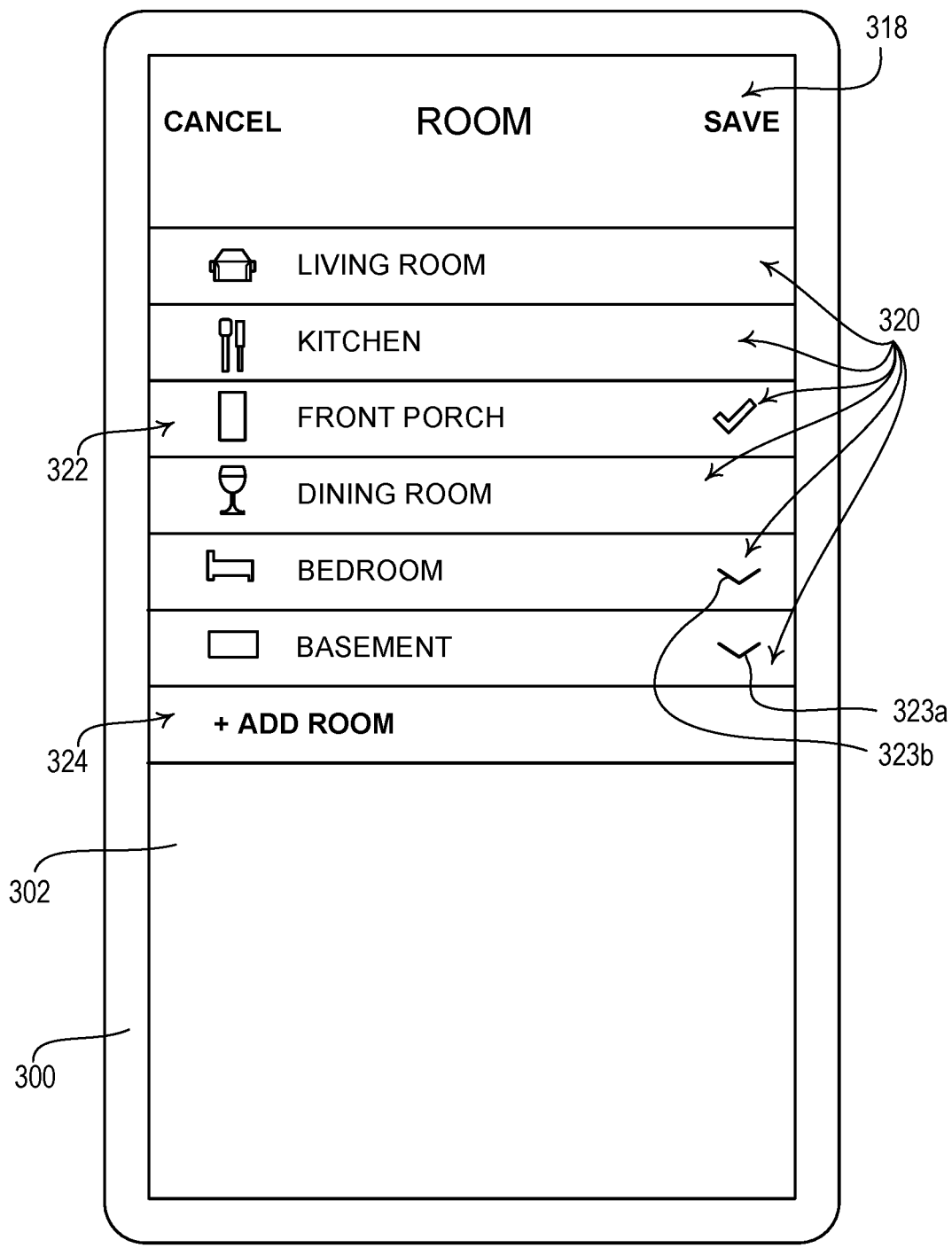
Figure 3E:
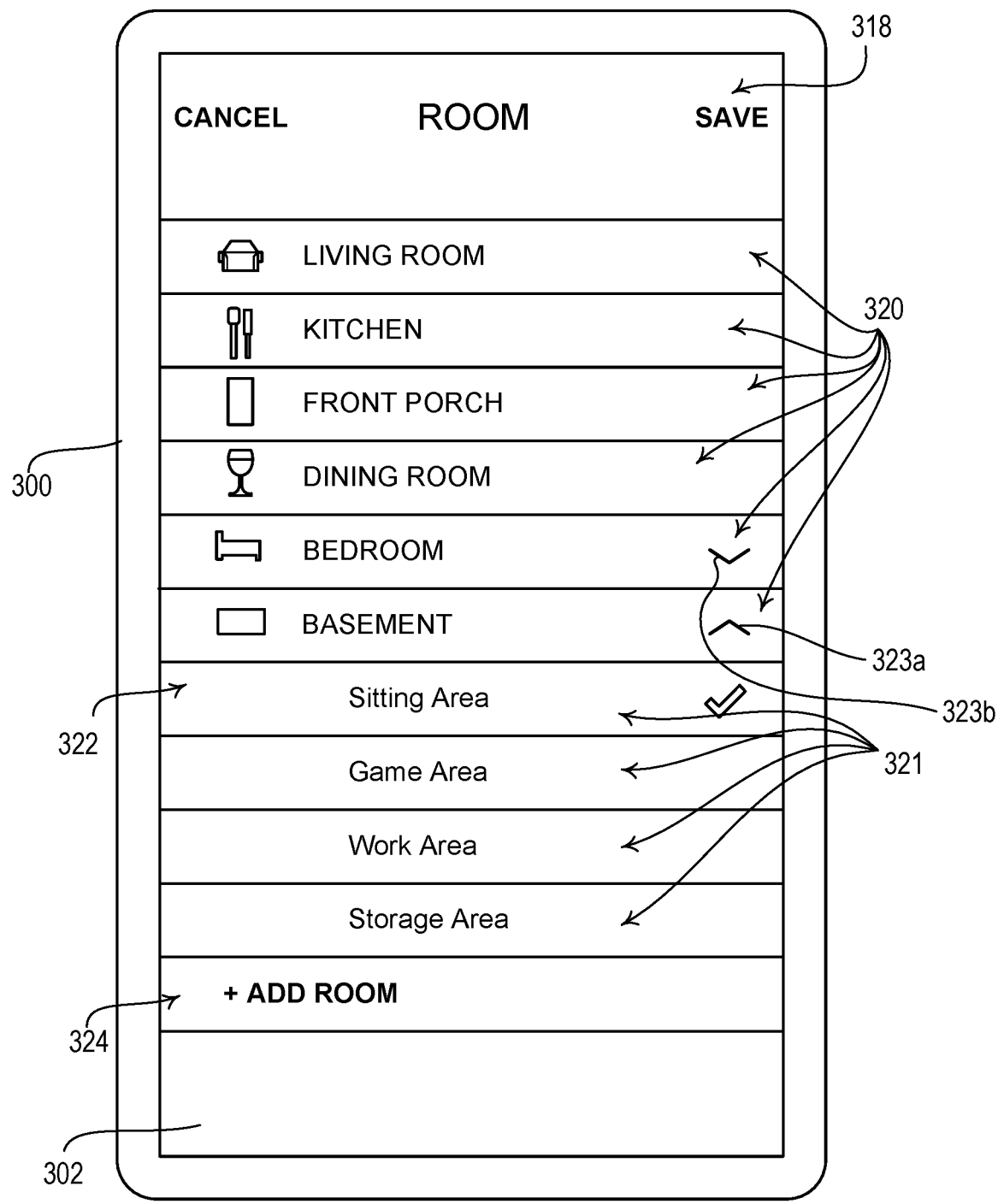
Figure 3F:
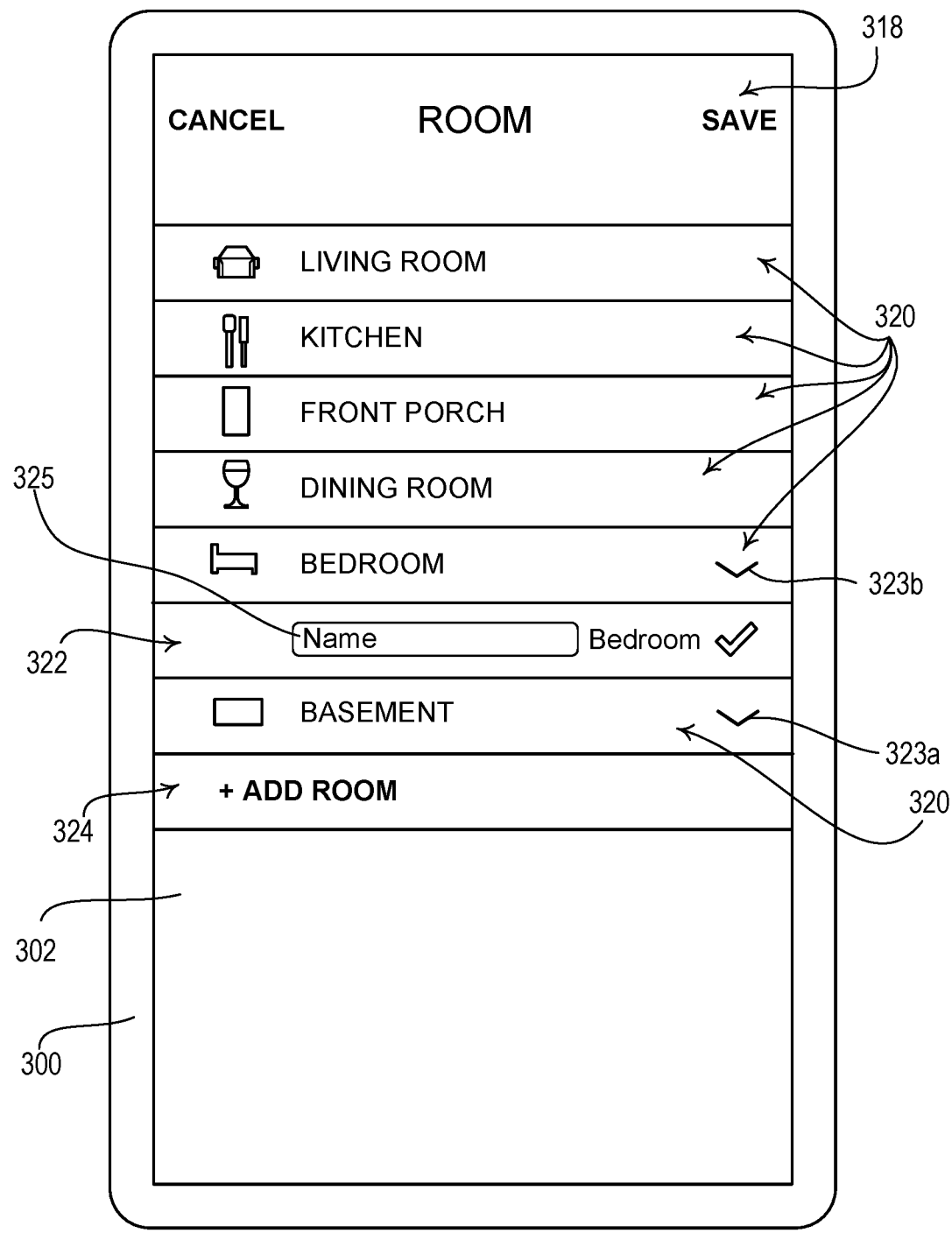
Figure 3G:
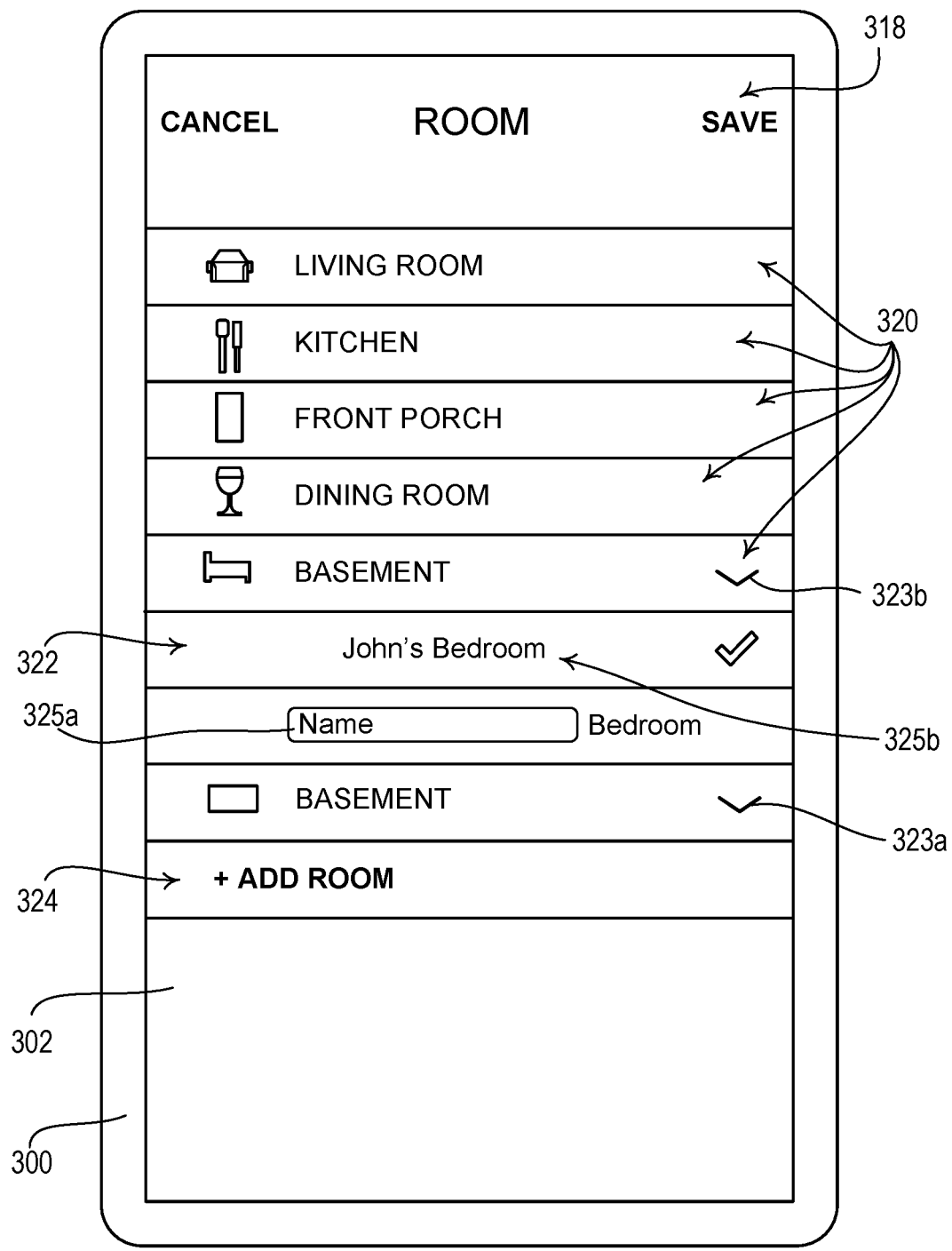
Figure 3H:
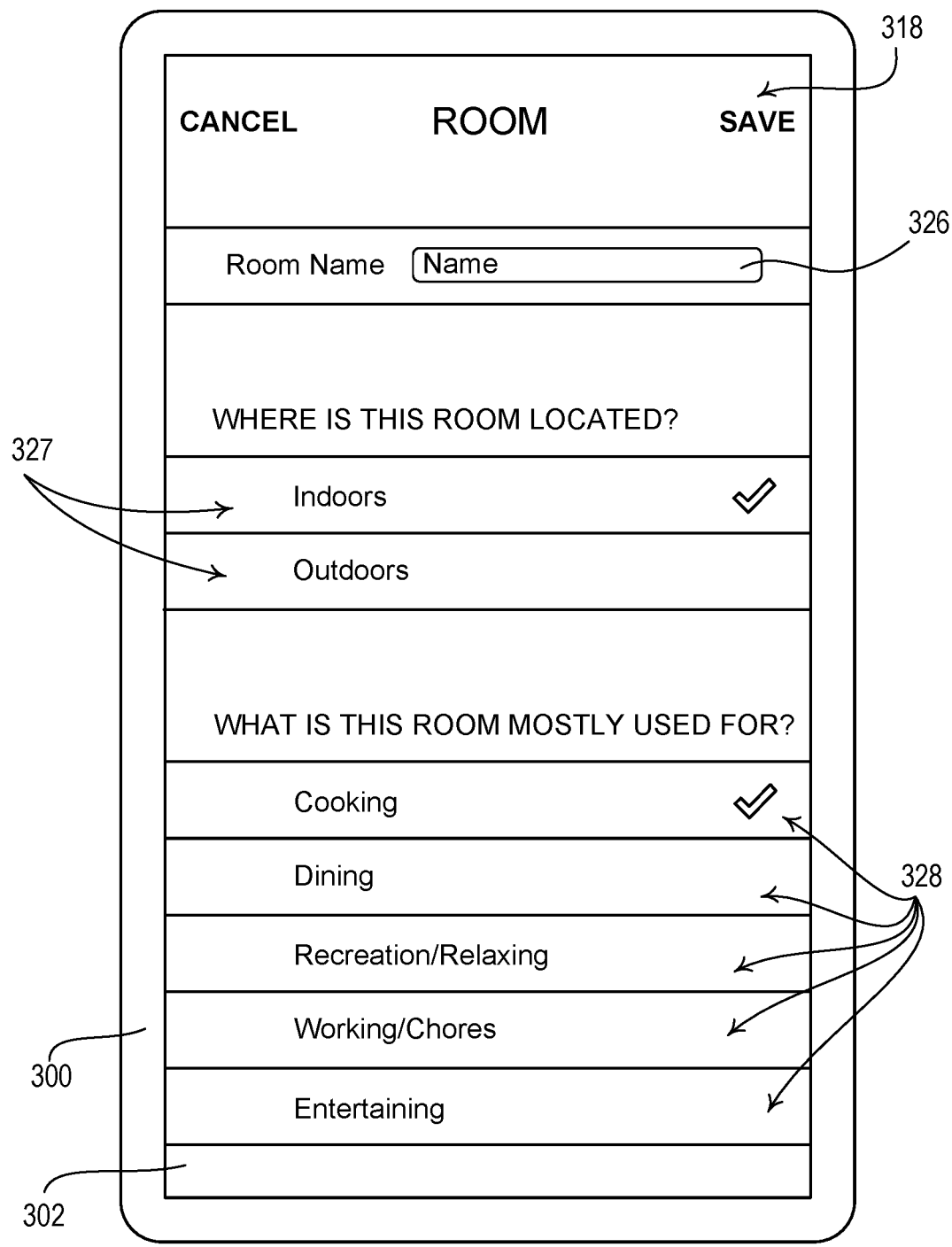
Figure 3I:
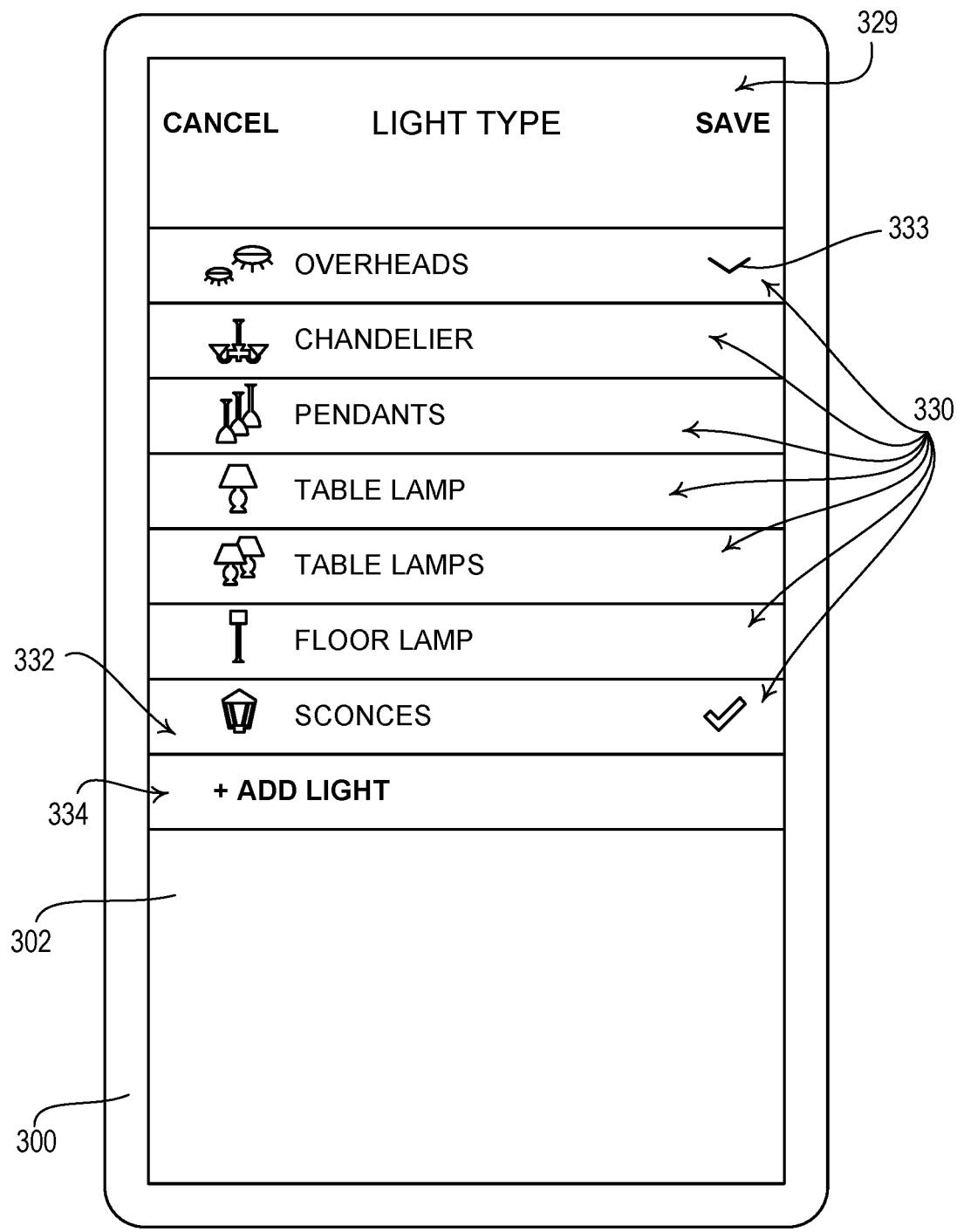
Figure 3J:
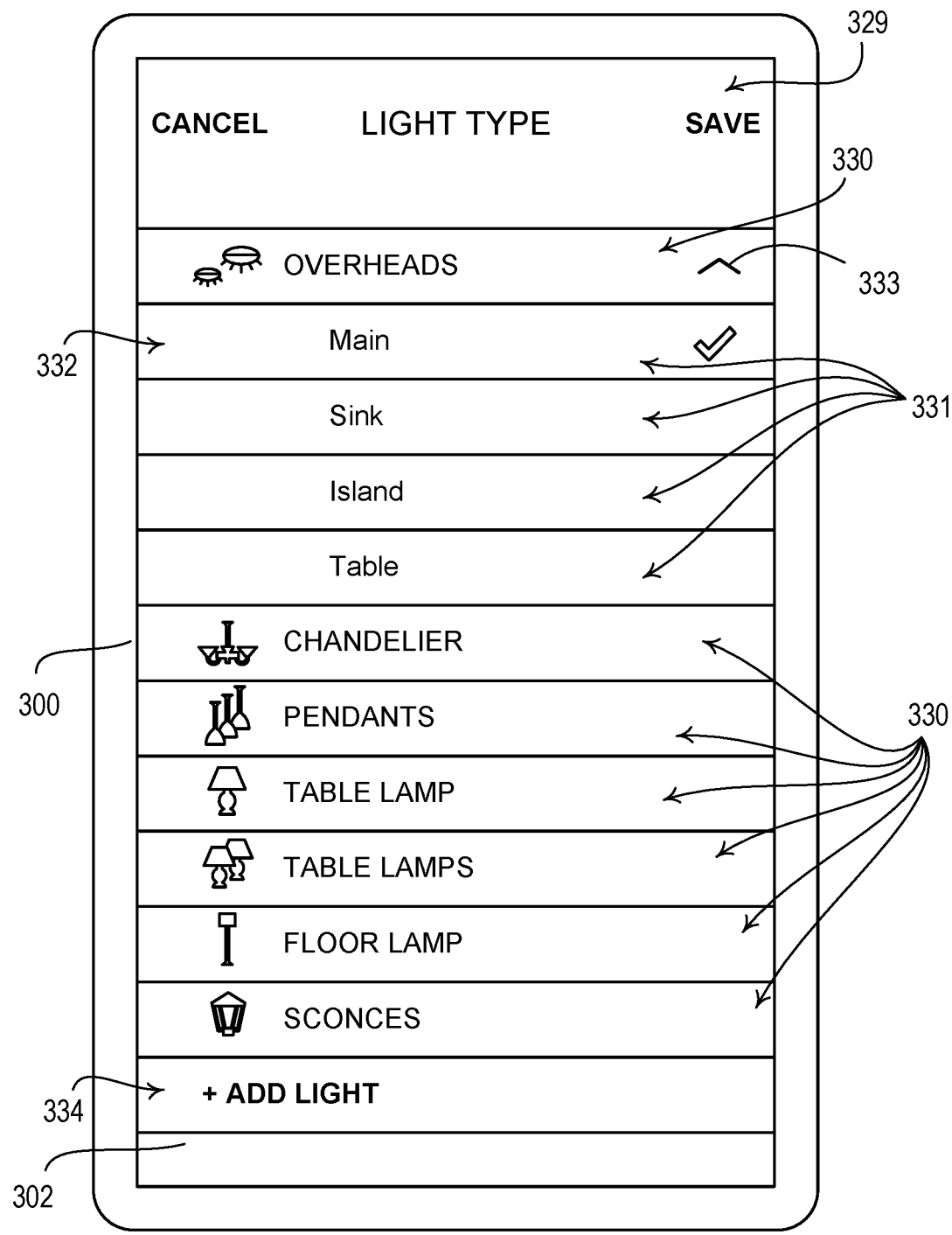
Figure 3K:
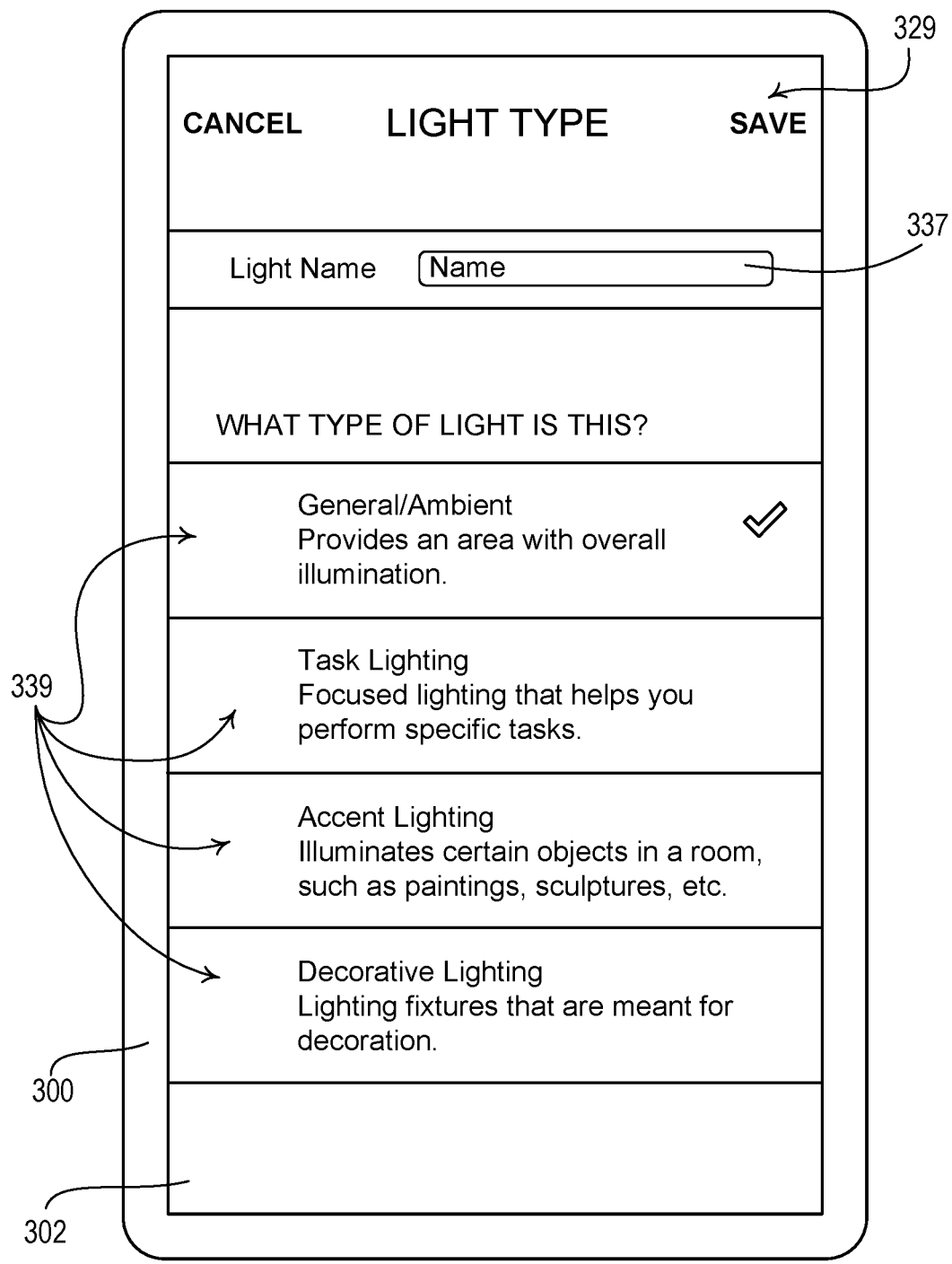
Figure 3L:
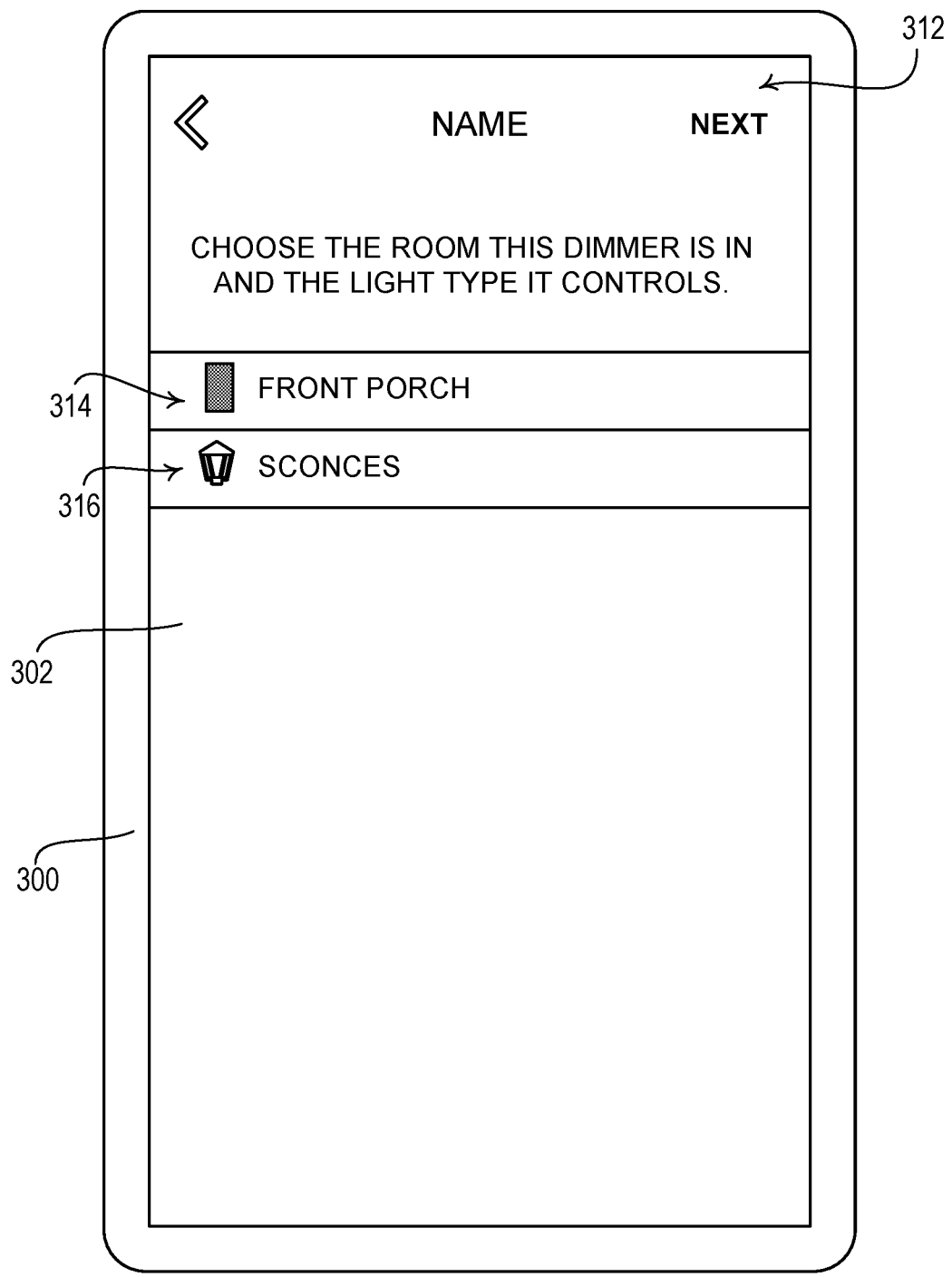
Figure 3M:
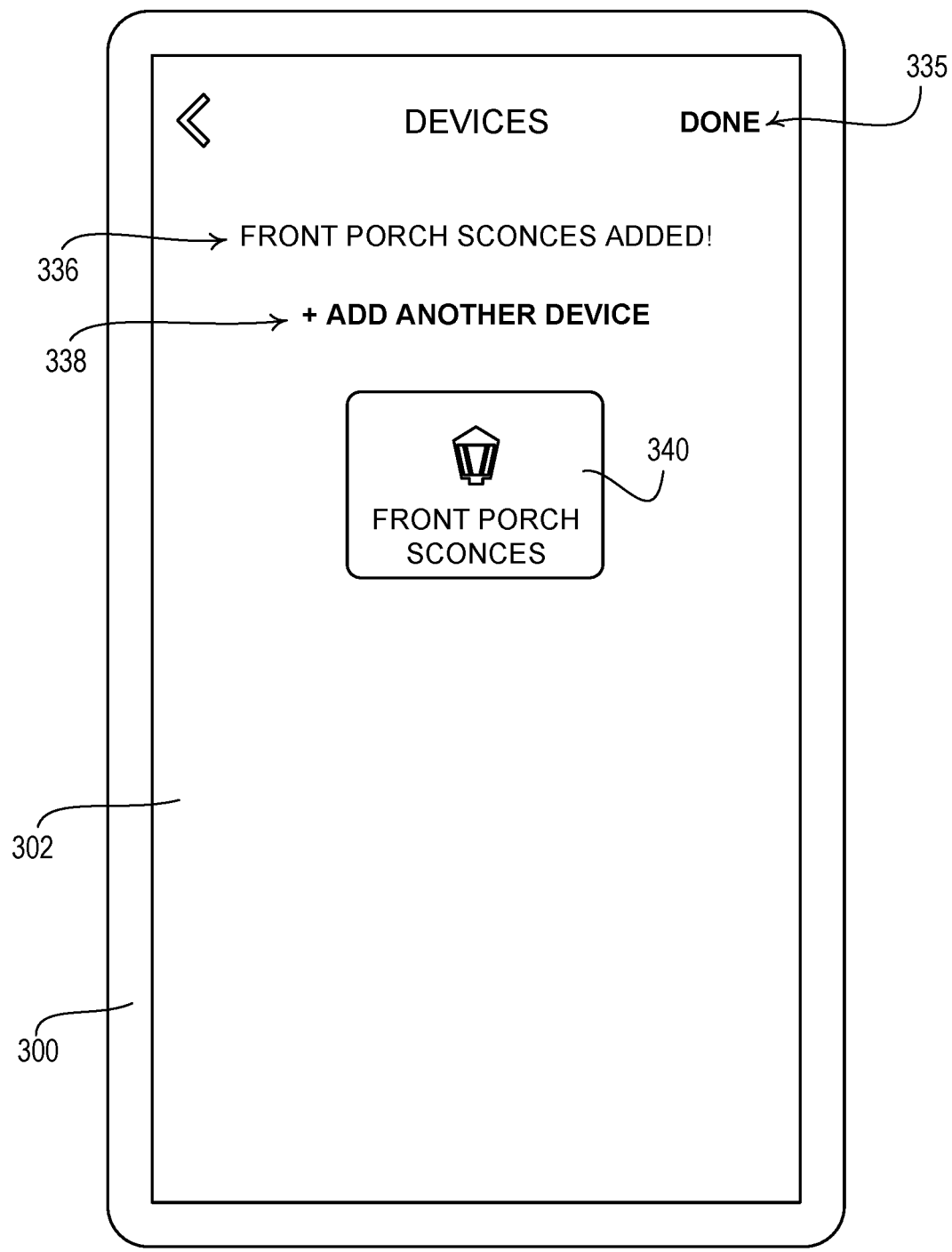
Figure 3N:
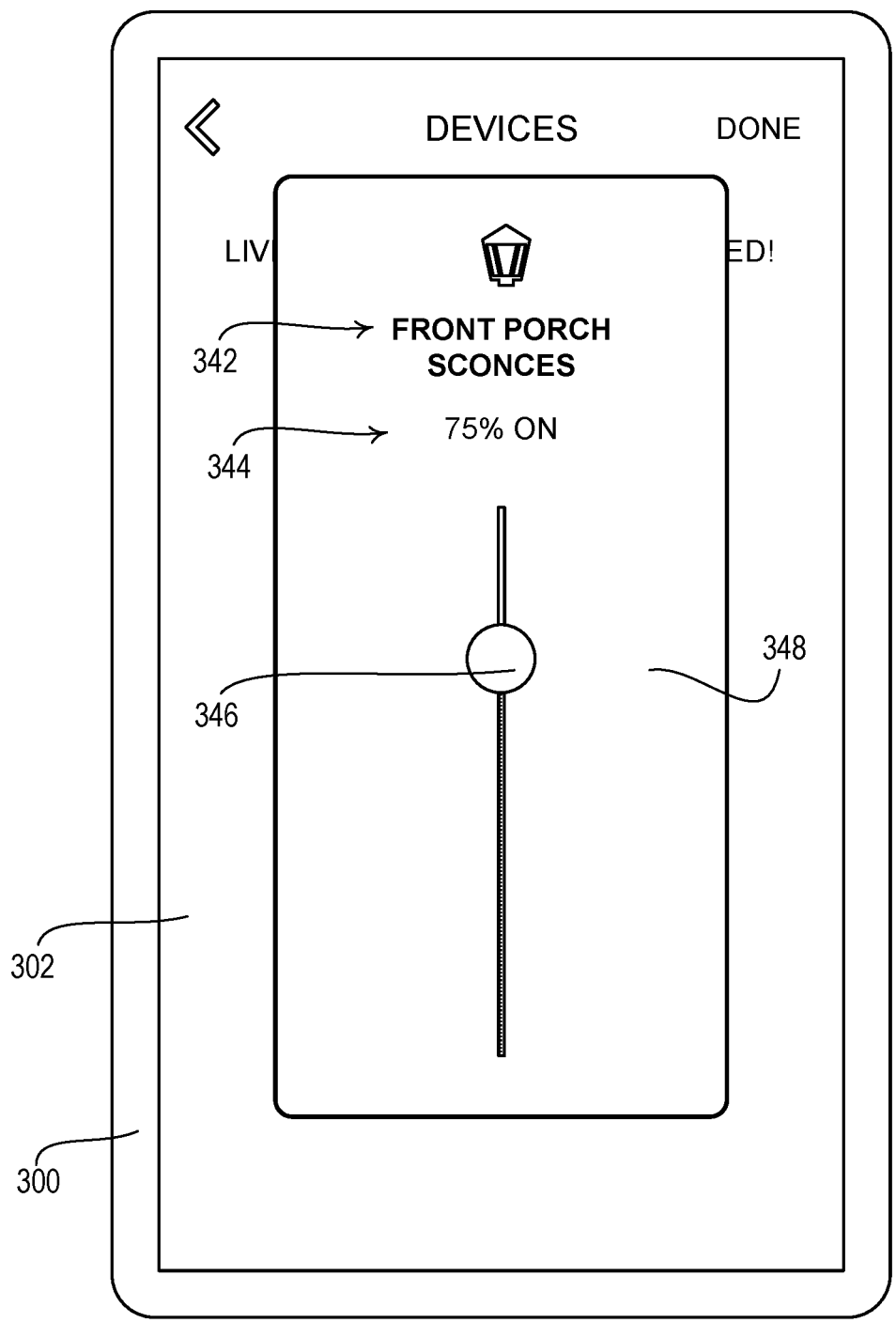
Figure 3P:
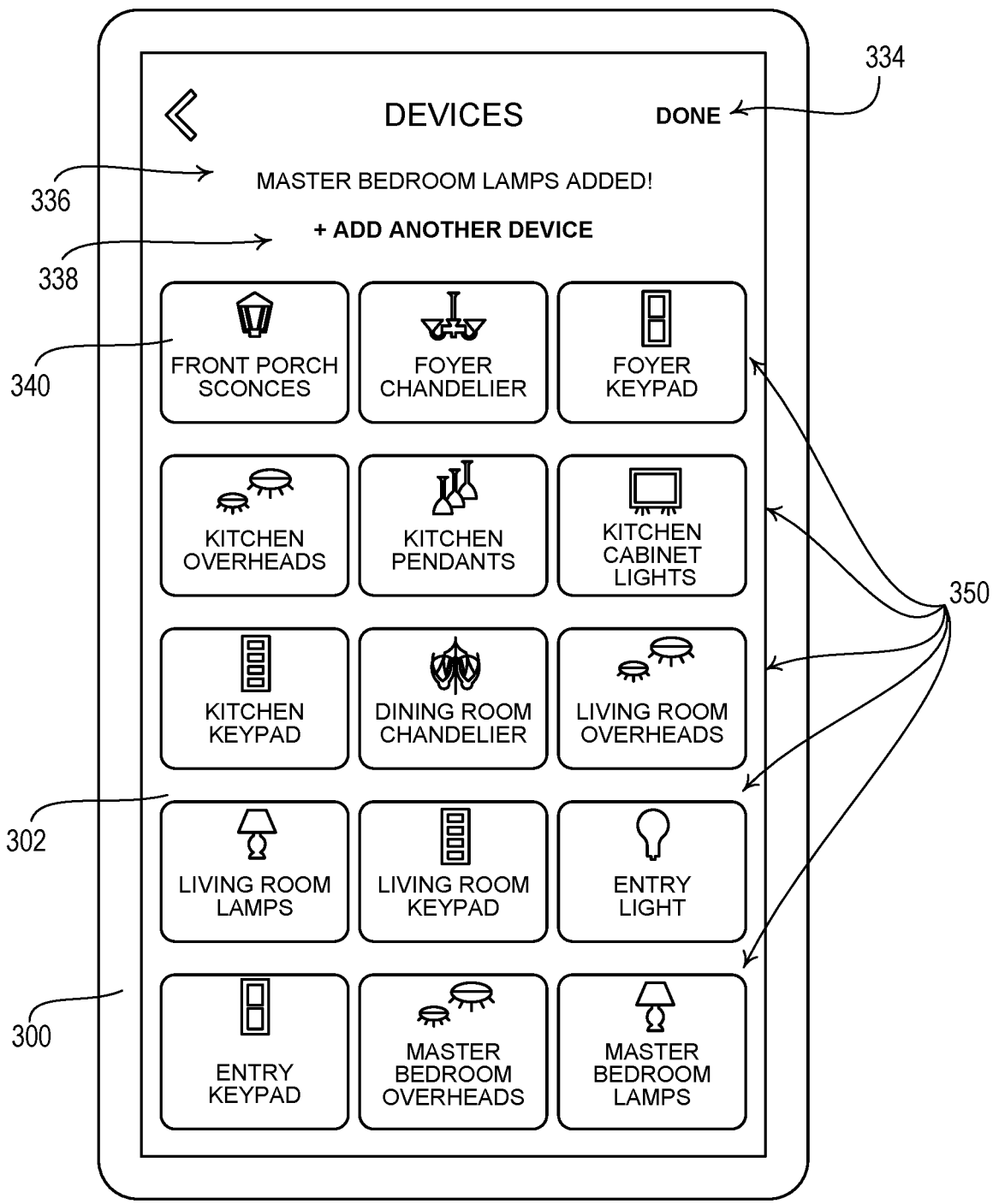

FIGS. 3A-3P illustrate example configurations of a user interface 302 that may be displayed on a visual display of a network device 300 by a design software, e.g., a graphical user interface (GUI) software, for designing and/or configuring a load control system (e.g., a building control system, such as the load control system 100 shown in FIG. 1). The user interface 302 may be generated and displayed locally on the network device 300 or may be generated at a remote device (e.g., a system controller or other remote computing device) for being displayed on the network device 300 via a local application (e.g., a web browser or other application).

The load control system may be automatically programmed by the design software in response to types of control devices that are added to the load control system during the configuration procedure. For example, the design software may collect the location and/or load type of control devices (e.g., lighting control devices and/or remote control devices) as a user of the design software adds the control devices to the load control system. The design software may automatically generate a programming database that defines the operation of the load control system in response to the location and/or load type of the control devices that have been added to the load control system. For example, the design software may be configured to automatically determine which lighting control devices should be included in a particular preset and the respective preset intensities for the preset based on the location of the lighting control devices and/or the load type that the lighting control devices are controlling. The design software may be configured to automatically edit the programming database as control devices are added to the load control system and/or after the control devices have been added to the load control system.

After the control devices have been added to the load control system during the configuration procedure, the design software may be configured to review with the user of the design software the details of the programming database that were automatically programmed. The user may confirm that the automatically programmed functionality is desired and/or manually edit the programming information. In some cases, the design software may prompt the user with a few programming options, and the user may select one of the options. Once functionality of the programming database is confirmed, portions of the programming database may be transmitted to the control devices of the load control system for use during normal operation of the load control system.

Referring now to FIG. 3A, the user interface 302 may display a number of device options 304 that indicate control devices (e.g., control-source and/or control-target devices) for being added to the load control system. The device options 304 may include a lighting control device (e.g., a wall-mounted dimmer, a wall-mounted electronic switch, a light emitting diode (LED) driver, a ballast, and/or the like), a plug-in control device, a lighting control panel, a motorized window treatment, a temperature control device, a humidity control device, a water flow control device, an audio control device, a video control device, a security system control device or interface, a controllable door lock, a remote control device, and/or a sensor (e.g., occupancy sensor, daylight sensor, shadow sensor, etc.). The device options 304 may be displayed as text and/or images indicating the devices to be added to the load control system.

The network device 300 may receive a user selection of a control device to add to the load control system in response to a selection of one of the device options 304 displayed on the user interface 302. As shown in FIG. 3B, the network device 300 may display instructions 306 for adding the selected control device to the load control system. The instructions 306 may be displayed as text and/or images. The user interface 302 may identify the control device for which the instructions are being provided with an identification icon 308 and/or text 310. The network device 300 may display the instructions 306 to instruct the user on how to recognize the control device within the load control system. For example, the user may be instructed to select a button or buttons on the control device for a period of time to cause the control device to send a digital message that identifies the control device within the load control system. The control device may be recognized by the system controller, the network device 300, and/or other devices in the load control system capable of receiving the digital message.

After the control device is recognized in the load control system (e.g., by the system controller, the network device 300, and/or other devices), the network device 300 may request the location of the control device. For example, as shown in FIG. 3C, the user interface 302 may display a room identification button 314 to identify the room in which the control device is located. The room identification button 314 may allow the user to define rooms of control devices that may be automatically programmed for performing control of electrical loads.

After selection of the room identification button 314, the network device 300 may allow the user to define the room in which the control device is located. As shown in FIG. 3D, the user interface 302 may display a number of locations 320 for defining the location of the control device after selection of the room identification button 314. As shown in FIG. 3E, the user interface 302 may display a number of sub-locations 321 (e.g., nested areas) of a location. For example, the sub-locations 321 may be displayed in response to the selection of a carat icon 323*a* that corresponds to a given location 320. The sub-locations 321 may allow for further defining the location of the control device. For example, a basement may include one or more sub-locations 321, such as, a sitting area, a game area, a work area, a storage area, an exercise area, stairs, and/or a bathroom. The user interface 302 may display a number of alternate location names (not shown) for further defining the location of the control device. For example, in response to the selection of a carat icon next to a location of "Foyer/Entry," the user interface 302 may display a number of alternate location names, such as "Front Foyer," "Garage Entry," "Back Entry," and/or "Mudroom."

Some locations may be customized (e.g., personalized) based on the primary occupants of the space in which the lighting control system is being installed. For example, as shown in FIG. 3F, the user interface 302 may display a name entry field 325a. The name entry field 325a may be displayed in response to the selection of a carat icon 323b for further defining the location of the control device. After a name is entered into the name entry field 325a, the user interface 302 may display a customized location 325b, as shown in FIG. 3G. Other locations may be similarly customized, such as bathrooms and/or closets, for example.

The locations 320 may be predefined and/or user defined. The user may add a location by selecting the add room button 324 and defining a name of the location to be added to the locations 320. For example, in response to the selection of the add room button 324, the user interface 302 may display a name entry field 326, as shown in FIG. 3H, to allow the user to enter the name of the location to be added to the locations 320. The user may further define the location and purpose of the added location. For example, the user may select one of a number of location identifiers 327 (e.g., "Indoors," "Outdoors," etc.) and one of a number of location uses 328 (e.g., Cooking, Dining, Recreation/Relaxing, Working/Chores, Entertaining, Sleeping, Exercising, Entering/Exiting the House, Transition Space (e.g., hallway, stairs), Storage, etc.). The locations 320 may be stored in programming data at the network device 300, a system controller, and/or other devices.

The control settings for control devices may be programmed (e.g., automatically programmed) according to a selected location 322 of the control devices. The programmed control settings may be stored in the programming data. Control devices may be programmed with different settings depending on the defined location of the control device. The settings may be different for different scenes for a location 320. For example, the control devices (e.g., remote control devices) illustrated in FIGS. 2A and 2B may be installed in one of the corresponding locations 320 and the scenes corresponding to each button may be different in different locations.

After the location 322 (e.g., the "Front Porch" as shown in FIG. 3D, the "Basement Sitting Area" as shown in FIG. 3E, "John's Bedroom" as shown in FIG. 3G, etc.) is selected as the location for the control device being added, the network device 300 and/or the system controller may program the control device being added with the control settings for the defined location. For example, if a remote control device having buttons for different scenes is being added to the load control system, the control settings for each button on the control device may be programmed for the location 322. The user interface 302 may indicate the selected location 322 (e.g., with a checkmark). After selection of the save button 318, the network device 300 may store the selected location and/or indicate the selected location to the system controller for enabling the programming of the control device being added to the load control system.

Referring again to FIG. 3C, the user interface 302 may display a light type button 316 when adding a control device to the load control system for controlling a lighting load. For example, the light type button 316 may be displayed when a lighting control device (e.g., a wall dimmer/switch, a ballast, a light emitting diode (LED) driver, and/or the like) is being added. The light type button 316 may not be displayed, for example, when other types of control devices, such as remote control devices, are being added. The light type button 316 may be displayed to enable the identification of the type of light being controlled by the lighting control device being added to the system. For example, as shown in FIG. 3C, the light type button 316 may allow a user to select a type of light that may be controlled by a wall switch/dimmer being added to the system. Though the light type button 316 is provided as an example, other types of loads may be similarly selected when there are multiple options of the type of load being controlled by a load control device.

The network device 300 may receive a selection of the light type button 316 to define the type of light to be controlled by the added control device. After receiving a selection of the light type button 316, the network device 300 may display types of lights for being controlled by the added control device. The network device 300 and/or the system controller may program (e.g., automatically program) devices in the load control system differently based on the location and/or the type of lights or other electrical loads being controlled. For a particular scene to be programmed, decorative lighting devices (e.g., sconces, chandeliers, pendant lights, etc.) may be programmed to different light intensities than functional lighting devices (e.g., overhead lights, under-cabinet lights, table lamps, floor lamps, etc.). For example, for a task-based scene (e.g., a "cooking" scene) the functional lighting (such as overhead lights and under-cabinet lights) may be programmed to have higher light level than decorative lighting. In addition, for a non-task-based scene (e.g., a entertain scene), the functional lighting may be programmed to off and the decorative lighting may be programmed to a low light level.

As shown in FIG. 3I, the user interface 302 may display a number of light types 330 for defining the location of the control device after selection of the light type button 316. As shown in FIG. 3J, the user interface 302 may display a number of light type names 331. For example, the light type names 331 may be displayed in response to the selection of a carat icon 333 for further defining the light type. The user interface 302 may automatically display the list of light types 330 shown in FIG. 3I after the user selects the save button 318 shown in FIGS. 3D-3H to store the selected location 322 of the control device. The user interface 302 may be configured to display those light types 330 that are defined for the selected location 322. For example, when the selected location 322 is "Kitchen," the user interface 302 may display the defined light types 330 of "Ceiling Lights," "Pendants," Chandelier," and "Cabinet Lights." For other selected locations, different light types may be displayed.

The light types 330 may be predefined and/or user defined. Other light types may be added to the light types 330 upon the network device 300 receiving a selection of the add light button 334. The selection of the add light button 334 may allow the user to define the name of the light and/or the function of the light (e.g., decorative or functional). Though examples are provided for adding light types, other types of electrical loads may be added for being controlled by a control device being added to the load control system. For example, in response to the selection of the add light button 334, the user interface 302 may display a name entry field 337, as shown in FIG. 3K, to allow the user to enter the name of the light type to be added to the light types 330. The user may further define the purpose of the added light type. For example, the user may select one of a number of light type uses 339 (e.g., General/Ambient, Task Lighting, Ascent Lighting, Decorative Lighting, etc.).

The network device 300 may receive a selection of the light type 332 (e.g., "Sconces" as shown in FIG. 3I, "Main Overheads" as shown in FIG. 3J, etc.) and update the programming information based on the light type 332 that is selected. For example, as the light type 332 may include sconces, which may be decorative lighting loads, the programming for the load control system may be updated to the settings for controlling decorative lighting loads, or sconces specifically. Though examples are provided for updating the programming settings for the load control system based on decorative lighting loads and functional lighting loads, different programming settings may be established for each type of load (e.g., each light type 330). The light type 332 may be stored as the selected type of light for being controlled by the control device after selection of a save button 329.

FIG. 3L illustrates an example configuration of the user interface 302 after the location and the light type have been defined. As shown in FIG. 3L, the room identification button 314 and the light type button 316 may be updated to reflect the selected location and light type, respectively. After the location and/or the light type have been defined, the network device 300 may receive a selection of the next button 312. The selection of the next button 312 may cause the network device 300 to store the selections in programming data and/or send the selections in the programming data to the system controller for updating the programming of the load control system. The network device 300 and/or the system controller may use the selections to automatically program the settings for the load control system.

As shown in FIG. 3M, the user interface 302 on the network device 300 may provide a description 336 that indicates the device that has been added to the load control system and/or the associated location. For example, the description 336 may indicate "Front Porch Sconces added!" The user interface 302 may display a tile 340 identifying the added control device. As the added control device is a lighting control device, the added device may be described using the location of the control device and/or the light type directly controlled by the control device if the control device is a lighting control device. The added device may also, or alternatively, be described using the name of the control device itself (e.g., "Front Porch Wall Switch/Dimmer). As a control-source device, such as a remote control device, may indirectly control a number of electrical loads, the control-source devices may be described by the name of the control device that is added and/or the location of the control device (e.g., "Living Room Keypad" or "Living Room Remote Control").

The network device 300 may receive a selection of the add another device button 338 to add another device to the load control system (e.g., beginning at FIG. 3A or FIG. 3C). The network device 300 may receive a selection of the done button 335 to finish adding control devices and finalize the programming of the settings for performing control in the load control system. The added control devices, and/or associated control devices, may be configured (e.g., automatically programmed) with settings for performing load control according to the type of control device being added and/or the location of the control device.

The network device 300 and/or the system controller may automatically generate the programming data for enabling load control based on the type of control devices that are added, the location of the added control device, and/or the type of load being controlled. For example, the network device 300 and/or the system controller may automatically program lighting control devices to control a lighting load to a predefined dimming level in response to a scene or other control instructions. The dimming level of the added load control device may be programmed to different predefined dimming levels for different locations and/or different scenes. For example, the dimming level to which a lighting control device may be programmed to control lights on the front porch may be different than the dimming level to which the lighting control device may be programmed control lights in the kitchen. Additionally, the dimming level to which a lighting control device may be programmed to control lights in the kitchen for a "Cooking" scene may be different than the dimming level to which the lighting control device may be programmed control the lights in a "Dinner" scene. Further, if a type of load is selected for being controlled by the added control device, the control settings may be programmed differently according to the type of load being controlled. For example, the dimming level to which a lighting control device may be programmed to control overhead lights in the living room may be different than the dimming level to which the lighting control device may be programmed control a chandelier in the living room.

The network device 300 and/or the system controller may be configured to use a lookup table to automatically generate the programming data for enabling load control based on the type of control devices that are added, the location of the added control device, and/or the type of load being controlled. FIG. 3Q illustrates a portion of an example lookup table 360 that may be used to automatically generate the programming data for a load control system. The lookup table 360 may include a location column 362, a light type column 364, and/or a scene levels column 366. The location column 362 may include entries that correspond to a defined room location. The light type column 364 may include entries that correspond to a defined light type. The scene levels column 366 may include entries that correspond to defined lighting intensity levels to which the corresponding light type 364 may be controlled at the defined location 362 for a given scene.

The lighting intensity levels in the scene levels column 366 may be defined according different types of control devices and/or different scenes. For example the scene levels column 366 may include lighting intensity levels for scenes that are implemented by different keypads, such as a 4-Button Keypad 368a and a 2-Button Keypad 368b. Each of the scenes defined under the column heading for the 4-Button Keypad 368a may correspond to a different scene that is triggered by selection of a different button on the 4-Button Keypad. Each of the scenes defined under the column heading for the 2-Button Keypad 368b may correspond to a different scene that is triggered by selection of a different button on the 2-Button Keypad. The lookup table 360 may be implemented by the network device 300 and/or the system controller to determine lighting intensity levels in response to user-selected scenes on a control device. For example, if the load control system includes a four-button remote control device (e.g., the four-button remote control device 220 as shown in FIG. 2B), the network device 300 and/or the system controller may be configured to determine the dimming levels for the lighting loads in the kitchen using the lookup table 360. If the kitchen includes main ceiling lights, pendants, and cabinet lights, the network device 300 and/or the system controller may set the dimming levels for "Scene 2" (e.g., that may be selected in response to an actuation of the second button 224) to 60% for the main ceiling lights, 90% for the pendants, and 90% for the cabinet lights. Scenes 1-3 of the 4-button Keypad and Scene 1 of the 2-button Keypad may be considered on scenes since at least one of the lighting loads in each scene has a dimming level greater than 0%. Scene 4 of the 4-button Keypad and Scene 2 of the 2-button Keypad may be considered off scenes since all of the lighting loads in each of the scenes have a dimming level of 0%.

The network device 300 and/or the system controller may be configured to automatically generate the programming data for the load control system using the lookup table 360 and one or more rules. The lookup table 360 may include an entry in the light type column 364 for each location that is labeled "Rule," which may not represent an actual light type. The row labeled "Rule" for each location may include values for each scene in the location. For example, as shown in FIG. 3Q, the row labeled "Rule" includes the value 75% for Scene 2. The rule may define that each scene that is automatically configured by the network device 300 and/or the system controller includes at least one lighting load having an intensity greater than or equal to the value in the row labeled "Rule." For example, if the kitchen includes main ceiling lights and a chandelier, the network device 300 and/or the system controller may retrieve the dimming levels of 60% for the main ceiling lights and 45% for the chandelier from the lookup table 360 for "Scene 2." However, since both dimming levels are less than the value in the row labeled "Rule" for the kitchen (e.g., 75%), the network device 300 and/or the system controller may increase the dimming level for one or both of the two lighting loads to 75% when creating Scene 2. For example, the network device 300 and/or the system controller may increase the dimming level of the lighting load having the highest dimming level (e.g., the main ceiling lights at 60%) to the value in the row labeled "Rule" (e.g., by changing the dimming level of the main ceiling lights for Scene 2 from 60% to 75%). If multiple lighting loads in the scene have the same highest dimming level in the scene, the network device 300 and/or the system controller may choose the lighting load for which to increase the dimming level using a priority or weighting factor of each lighting load. For example, the main ceiling lights may have a higher priority than the chandelier.

In addition, some of the lighting loads of the load control system may be switched loads (e.g., controlled by an electronic switch). The switched loads may be turned on and off. Thus, the intensities of the switched loads may be controlled to the maximum intensity (e.g., 100%) and 0%. When the network device 300 and/or the system controller are automatically generating the programming data for the scenes of the load control system, the dimming level for switched loads may be set at either 100% or 0% based on the dimming levels provided in the lookup table 360. For example, if the dimming level for a particular scene is greater than or equal to 50%, the dimming level for the switched load is set to 100% for the scene, and if the dimming level for a particular scene is less than 50%, the dimming level for the switched load is set to 0% for the scene.

If all of the lighting loads in a location are switched loads, the programming data for the scenes in the location may result in all of the lighting loads being controlled to 100% or all of the lighting loads being controlled to 0%, which may be undesirable. For example, if the programming data determined from the lookup table 360 sets all of the lighting loads of a scene to be less than 50% and/or the rule of the scene is less than 50%, the resulting scene may have all lighting loads at 0%. As shown in FIG. 3Q, Scene 3 in the living room has a dimming level of 30% for the sconces and 40% for the rule. If the living room only has sconces and the sconces are switched loads, the network device 300 and/or the system controller may use the lookup table to determine the programming data for Scene 3 as having the sconces at a dimming level of 30%, after which the network device 300 and/or the system controller may set the dimming level of the sconces in Scene 3 to 40% based on the rule. Since the sconces are switched loads and the dimming level of the sconces are less than 50%, the network device 300 and/or the system controller may set the programming data for Scene 3 as having the sconces at a dimming level of 0%. As a result, no lighting loads would be turned on for Scene 3.

For locations that have only switched loads, the network device 300 and/or the system controller may be configured to set the programming data for on scenes to ensure that at least one lighting load is on. For example, if all of the dimming levels of the lighting loads in a location are less than 50% for a particular on scene, the network device 300 and/or the system controller may set the lighting load in the location that has the greatest dimming level for that scene to have a dimming level of 100% (e.g., with the other lighting loads having a dimming level of 0%). For example, if the living room includes ceiling accent lights and sconces that are both switched loads, the network device 300 and/or the system controller may set the programming data for Scene 3 to have a dimming level of 100% for the sconces and 0% for the ceiling accent lights.

The network device 300 and/or the system controller may be configured to set the programming data for on scenes in locations having only switched loads in a way that each scene provides a different lighting experience. For example, for the 4-button Keypad, the network device 300 and/or the system controller may set Scene 1 to have three lighting loads on at 100%, Scene 2 to have two lighting loads on at 100%, and Scene 3 to have one lighting load on at 100%. The network device 300 and/or the system controller may choose which lighting load is on for each scene based on the dimming levels for the scene in the lookup table. For example, the network device 300 and/or the system controller may set Scene 3 to have the lighting load having the highest dimming level in the scene (e.g., according to the lookup table) at a dimming level of 100%, set Scene 2 to have the two lighting loads with the two highest dimming levels in the scene at dimming levels of 100%, and set Scene 1 to have the three lighting loads with the three highest dimming levels in the scene at dimming levels of 100%.

The lookup table 360 and/or the rules therein may be stored on an external cloud server. The external cloud server may be managed by the manufacturer of the load control system. Enabling access to the lookup table 360 and/or the rules therein on an external cloud server may allow for easy access from various locations for updating the information therein.

The user interface 302 may allow the user to select the control devices for adjusting the programming settings for the selected control devices. The tile 340, shown in FIG. 3M, may be a button that may be selected to further configure the predefined control settings for the added control device. As shown in FIG. 3N, the user interface 302 may display a control window 348 for the added control device after the network device 300 receives the selection of the tile 340 identifying the control device. The control window 348 may be displayed to allow for control of the intensity of the lighting load controlled by the lighting control device identified by the tile 340 prior to the completion of the configuration procedure. The control window 348 may include a description 342 of the location of the control device and/or the type of load being controlled. The control window 348 may identify a present intensity level 344 (e.g., a present dimming level) to which the added control device may be controlled according to the user selections. The present intensity level 344 may be adjusted upon user selection of an intensity adjustment icon 346. The intensity adjustment icon 346 may be moved up/down to adjust the intensity level to which the lighting control device may be controlled. Though a slide bar is provided as an example for the intensity adjustment icon 346, other forms of input may be provided for adjusting the intensity level of the lighting control devices.

Control devices may continue to be added to the load control system for performing load control, as described herein. The programming data for an added device may be generated after the addition of the device, which may cause programming data to be generated for a device in parallel with other devices being added by the user. In another example, the programming data may be generated after the addition of multiple devices (e.g., after the user indicates the addition of devices is completed, which may reduce the number of changes that may be made after the addition of other devices). FIG. 3P illustrates an example of an updated configuration of the user interface 302 that is shown in FIG. 3M, after additional control devices have been added to the load control system. As shown in FIG. 3P, the user interface 302 may display the tiles 350 for the added control devices. Each of the added control devices indicated by the tiles 350 may be selected to individually adjust the previously-configured settings for the device (e.g., the location and/or the light type). The configuration of the user interface 302 shown in FIGS. 3M and 3P may be displayed after the addition of a control device to the system, or may be displayed in response to a user selection to view/update the control devices added to the load control system.

The control settings that result from the programming of the load control system may be applied by the system controller in response to messages received from control-source devices, and/or the control settings may be uploaded to the control-target devices (e.g., load control devices) as a part of the programming data for being implemented at the control-target devices added to the system. The configuration of the user interface 302 may allow a user to make changes to the programming data that have been automatically applied to added devices, or proceed with the automatically generated programming data.

The network device 300 may also, or alternatively, provide the user with options for adjusting the settings for devices added to the load control system. FIGS. 4A-4I show example configurations of the user interface 302 that may be displayed on a visual display of the network device 300 by a design software, e.g., a graphical user interface (GUI) software, for a settings review process that may be implemented to configure a load control system (e.g., a building control system). The configurations of the user interface 302 that are illustrated in FIGS. 4A-4I may be implemented after adding control devices (e.g., as shown in FIGS. 3A-3P) to the load control system to provide the user with options for configuring the programming data (e.g., settings) for performing control of electrical loads in the load control system.

Figure 4A:
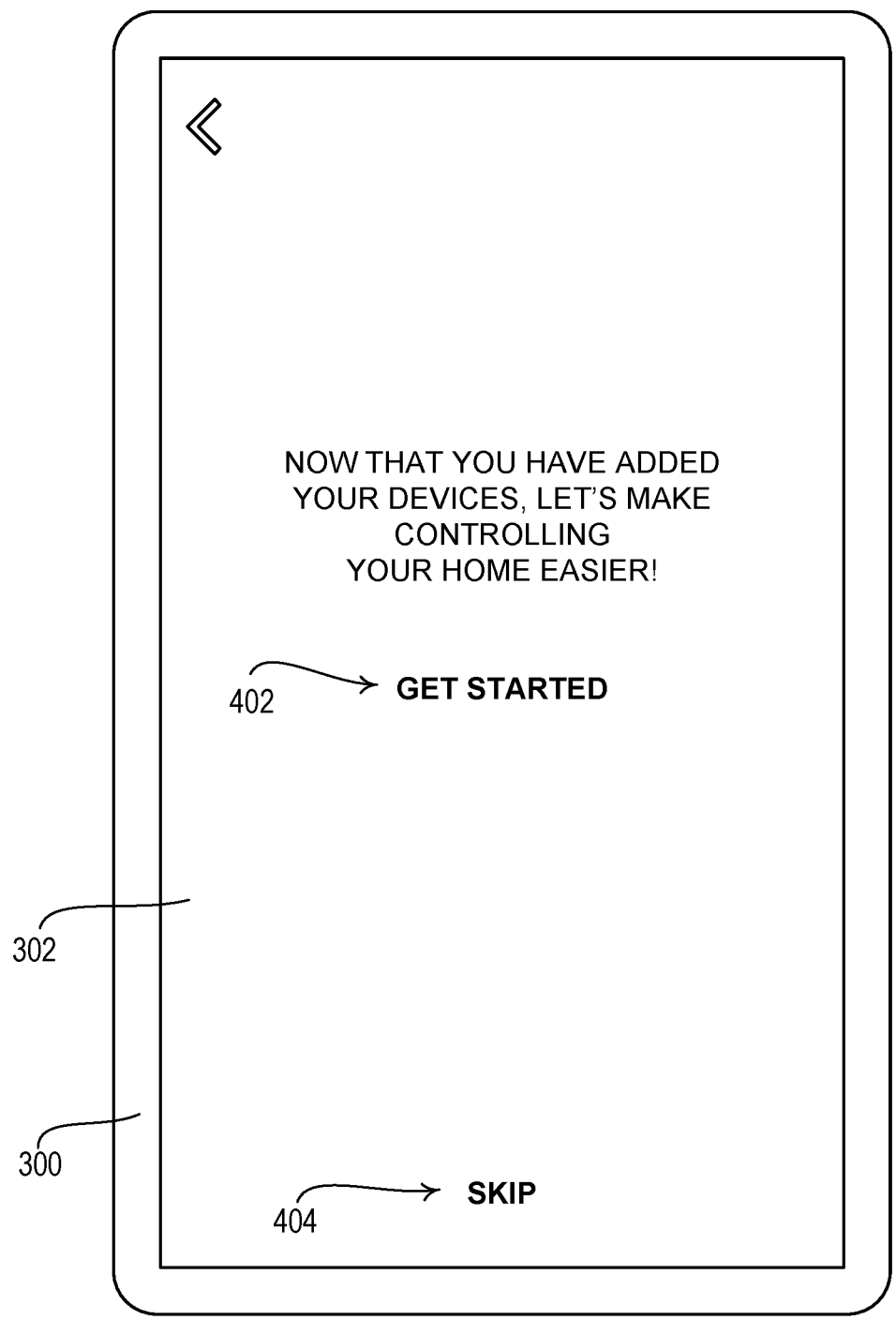
FIGS. 4A-4I show example configurations of a user interface that may be displayed on a visual display for a settings review process that may be implemented to configure a load control system.

The user interface 302 may display a start review process button 402 and a skip button 404, as shown in FIG. 4A, in response to another triggering event to enable later adjustment of the added control devices. The start review process button 402 may provide the user with an option to begin the settings review process. The skip button 404 may provide the user with an option to skip the settings review process and proceed with the automatically generated programming data (e.g., settings) for the added control devices.

Figure 4B:
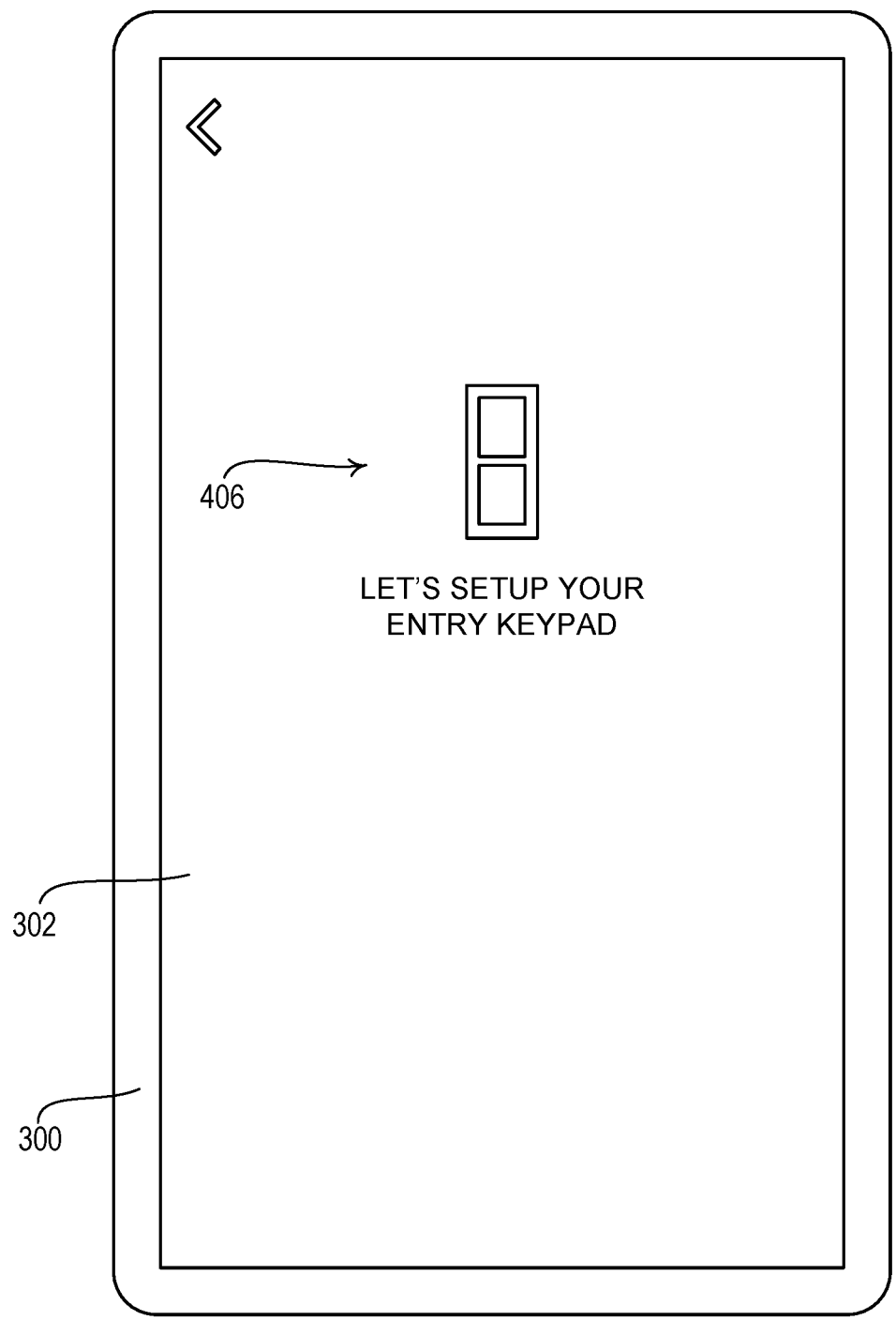

After the network device 300 receives the user selection of the start review process button 402, the user interface 302 may guide the user through the settings review process. The settings review process may provide the user with an indication of the programming data (e.g., settings) for performing control of electrical loads in the load control system. The settings review process may also allow the user to adjust the settings accordingly. As shown in FIG. 4B, the settings review process may begin with a review of the programming data of one of the added control devices (e.g., one of the remote control devices). The user interface 302 may include a control device descriptor 406 of the chosen control device for which the settings may be reviewed and/or adjusted. The control device descriptor 406 may include the location of the control device, the type of control device for which the settings are being adjusted, and/or an image of the control device. In the example shown in FIG. 4B, the control device descriptor 406 identifies the "Entry Keypad" as the selected device for which settings may be adjusted. The "Entry Keypad" may be a remote control device configured to transmit digital messages for performing load control and the programmed settings may allow for load control of electrical loads in response to the actuation of buttons on the "Entry Keypad." An image of the "Entry Keypad" is provided to identify to the user the type of control device. The number of buttons on the "Entry Keypad" may be different for different remote control devices having different button configurations, or a single icon may be implemented to represent different types of remote control devices. Referring again to FIGS. 2A and 2B, the remote control devices may have different button configurations that may correspond to different scenes having settings for controlling one or more devices. The "Entry Keypad" identified in the control device descriptor 406 may include a two-button remote control device, similar to the two-button remote control device illustrated in FIG. 2A.

The settings review process may proceed to display the control settings that have been programmed for the selected control device. For example, for a remote control device, such as the "Entry Keypad," the settings review process may iterate through the programmed settings for each of the buttons on the remote control device. For other types of control devices in the system, the settings review process may similarly iterate through the programmed settings for the control devices.

Figure 4C:
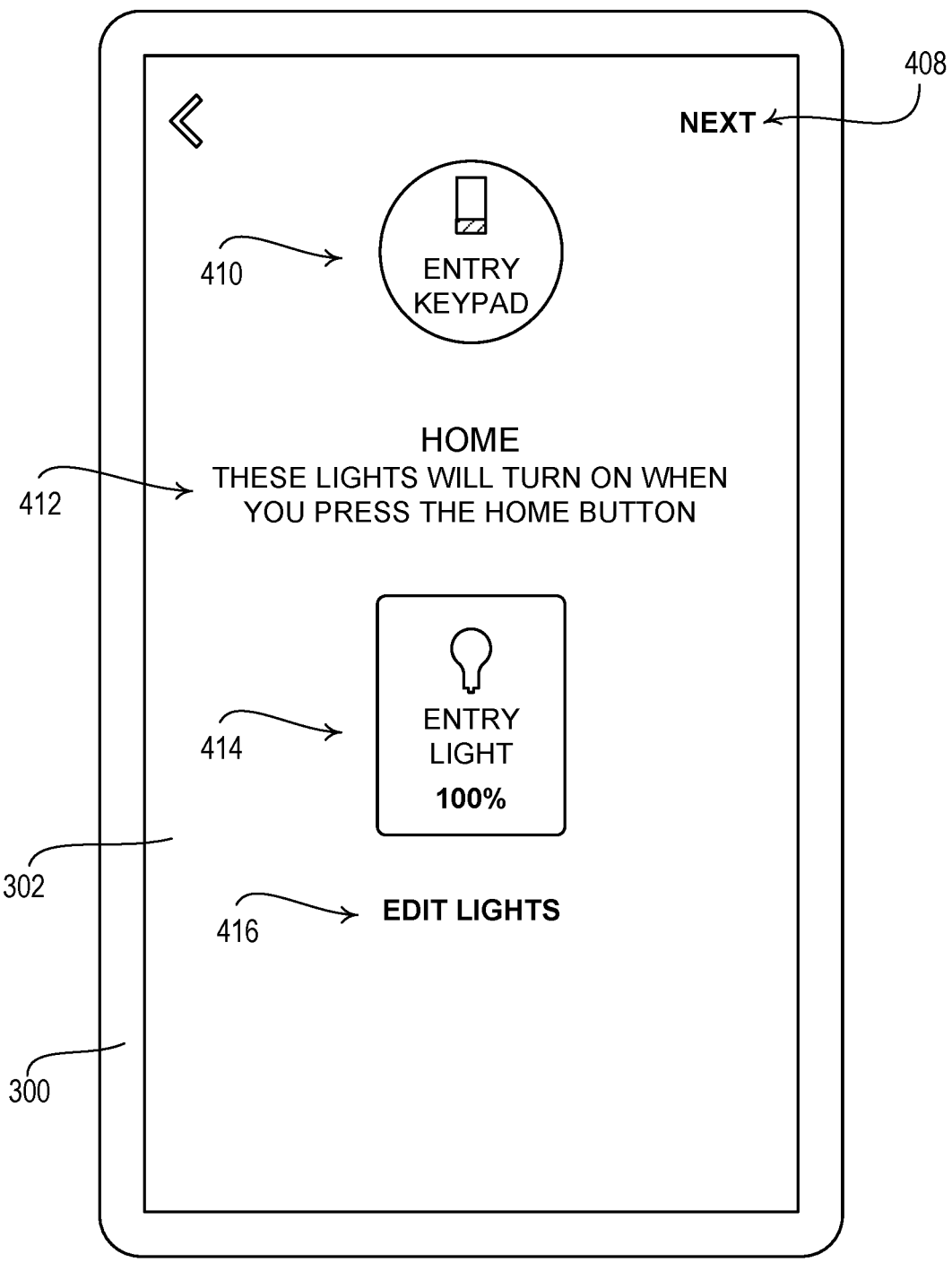

As shown in FIG. 4C, the user interface 302 may identify the control device (e.g., "Entry Keypad") for which control settings are being configured in a device identifier 410. The user interface 302 may identify the control setting (e.g., scene or other setting) being configured for the identified control device (e.g., "Entry Keypad") in a setting description 412. The setting description 412 may identify the name of the setting (e.g., "Home" scene) and/or a definition for the setting. The "Home" button may be selected on the "Entry Keypad" for sending a digital message from the "Entry Keypad" for implementing the "Home" scene. The user interface 302 may display load control configuration information 414 that is stored in the programming data for performing control in response to the selection of the "Home" button on the "Entry Keypad." The load control configuration information 414 may be represented as a tile that identifies the name of the load control device or electrical load (e.g., "Entry Light") configured to be controlled in the currently identified settings (e.g., "Home" scene) and/or the current control settings (e.g., 100% dimming level) for controlling the load control device or electrical load in response to the selection of the "Home" scene.

Though a lighting load and a dimming level are provided in the load control configuration information 414, other control settings may be provided for other types of loads.

The user interface 302 may include an edit settings button 416 that enables the user to edit the control settings for controlling the electrical load (e.g., "Entry Light") in response to selection of the "Home" scene on the control device (e.g., "Entry Keypad"). For example, the edit settings button 416 may cause the user interface 302 to display a current control settings screen for the lighting load (e.g., "Entry Light"), similar to the current control settings 348 shown in FIG. 3N, that enables the current dimming level to be adjusted for the lighting device (e.g., "Entry Light") in response to the selection of the "Home" scene. After the settings for the "Home" scene are adjusted, or otherwise determined to be at the appropriate level, the network device 300 may receive a selection of the next button 408 to view/adjust additional settings for the control device (e.g., "Entry Keypad").

Figure 4D:
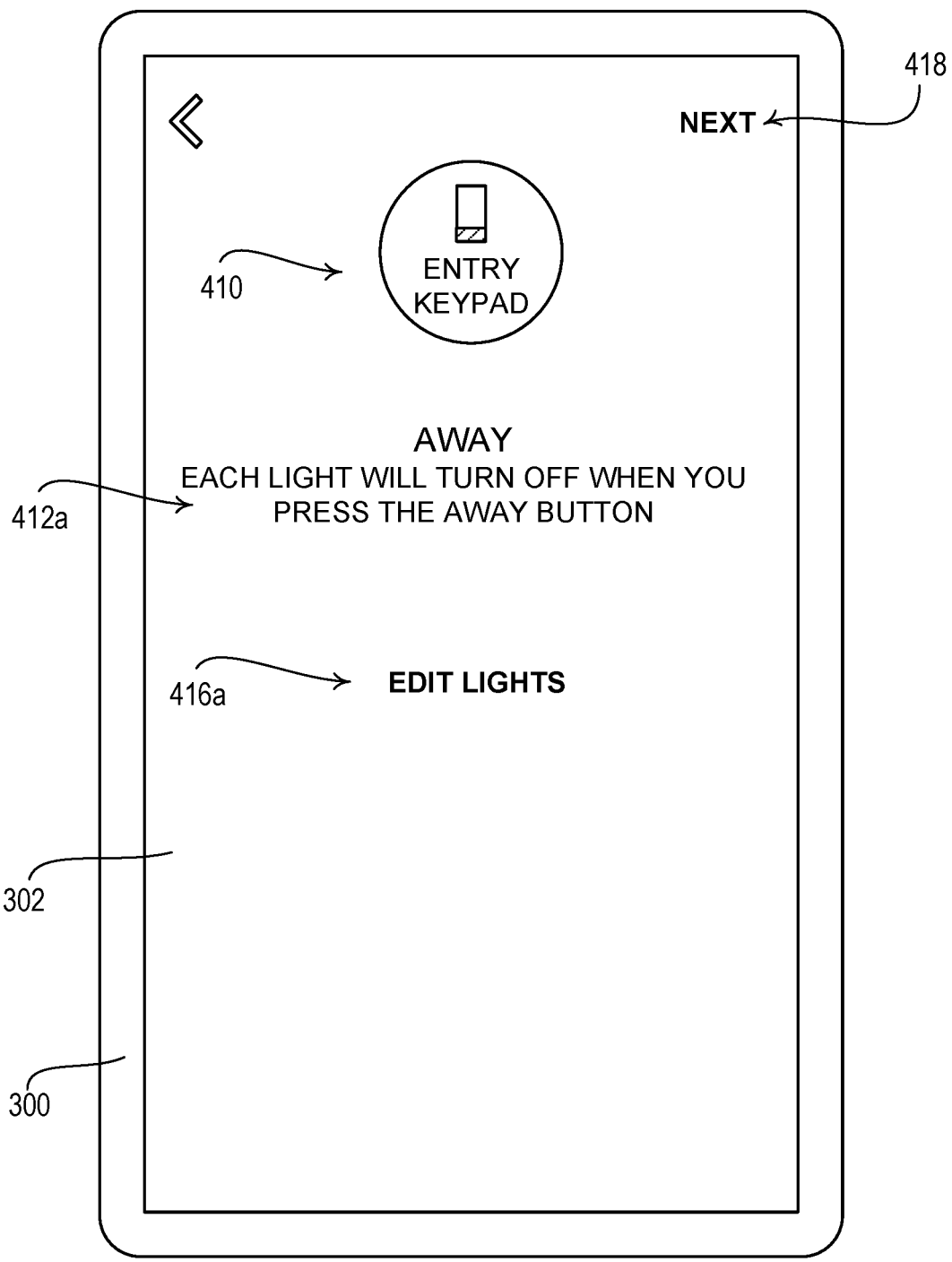

As shown in FIG. 4D, the additional settings for the control device (e.g., "Entry Keypad") may correspond to the settings programmed for another button on the control device (e.g., "Entry Keypad"). The settings review process may iterate through each of the settings (e.g., scenes or other settings) that have been automatically programmed for the control device to enable review and/or adjustment of the settings. The user interface 302 may identify the current settings being configured for the identified control device (e.g., "Entry Keypad") in a setting description 412a. The setting description 412a may identify the name of the setting (e.g., "Away" scene) and/or a definition for the setting being displayed. As described in the setting description 412a, the "Away" scene may apply the same setting to each electrical load controlled by the control device (e.g., "Entry Keypad"). As such, the user interface 302 may not display the load control configuration information, similar to the load control configuration information 414 shown in FIG. 4C, for each of the load control devices and/or electrical loads controlled by the control device (e.g., "Entry Keypad") in the "Away" scene to conserve display area on the user interface. Though, load control configuration information may be displayed for each of the load or load control device controlled in the "Away" scene.

The user interface 302 may include an edit settings button 416a that enables the user to edit the control settings for controlling the lighting devices that are controlled in response to selection of the "Away" scene on the control device (e.g., "Entry Keypad"). For example, the edit settings button 416a may cause the user interface 302 to display a current control settings screen for the lighting devices controlled by the "Entry Keypad," similar to the current control settings 348 shown in FIG. 3N, that enables the current dimming level to be adjusted for the electrical loads and load control devices in response to the selection of the "Away" scene. After the settings for the "Away" scene are adjusted, or otherwise determined to be at the appropriate level, the network device 300 may receive a selection of the next button 418.

Figure 4E:
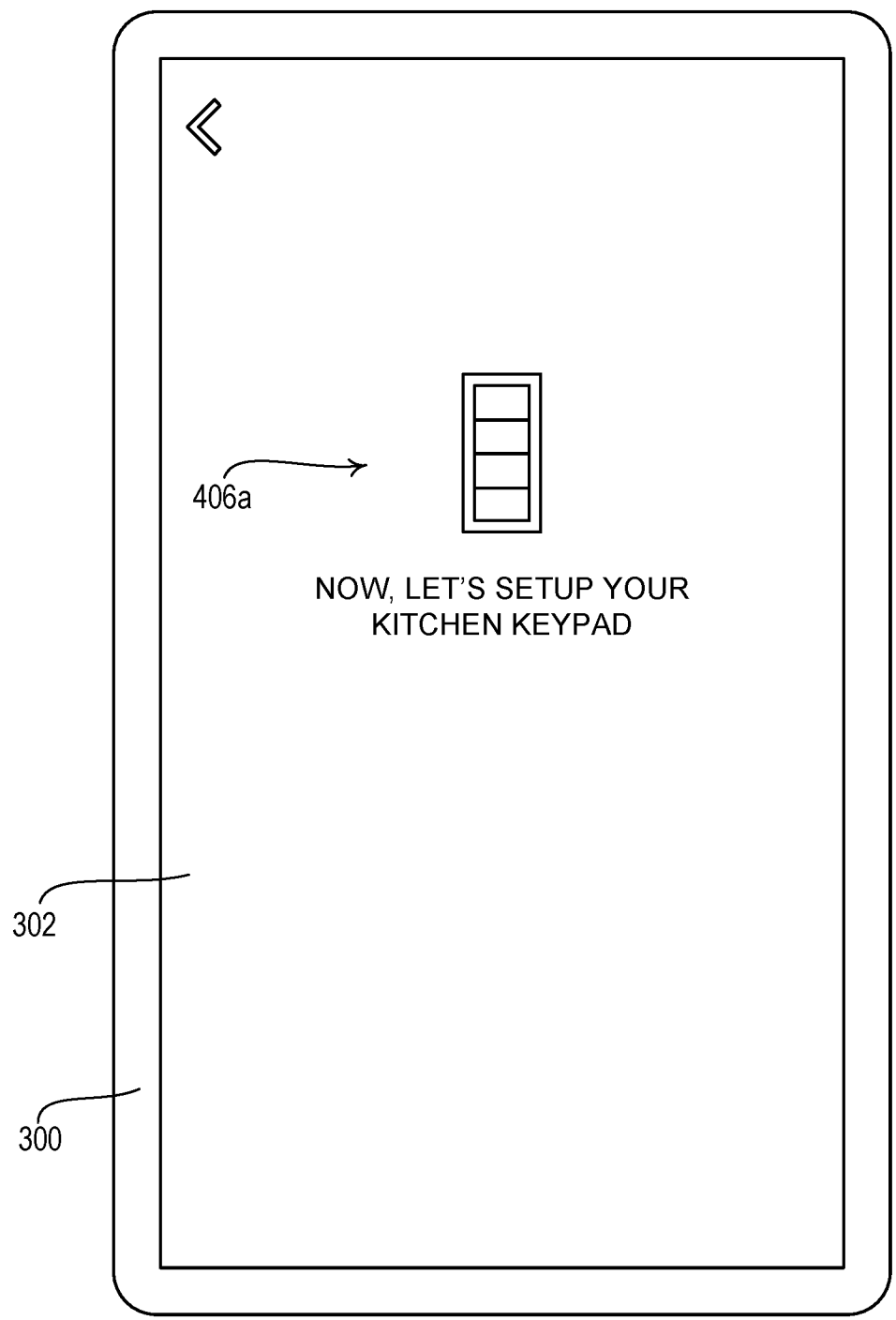

The user interface 302 may iterate through the programmed settings for other control devices that have been added to the load control system. As shown in FIG. 4E, the settings review process may select another added control device and provide the user with an indication of the next device for which the control settings may be adjusted. The user interface 302 may include a control device descriptor 406a of the selected control device for which the settings may be adjusted. In the example shown in FIG. 4E, the control device descriptor 406a identifies the "Kitchen Keypad" as the selected device for which settings may be adjusted. The "Kitchen Keypad" may be a remote control device configured to transmit digital messages for performing load control and the programmed settings may allow for load control of electrical loads in response to the actuation of buttons on the "Kitchen Keypad." An image of the "Kitchen Keypad" is provided to identify to the user the type of control device. The button configuration on the icon for the "Kitchen Keypad" provided in the control device descriptor 406a may be different than the button configuration on the icon for the "Entry Keypad" identified in the control device descriptor 406. The "Kitchen Keypad" identified in the control device descriptor 406a may include a four-button remote control device, similar to the four-button remote control device illustrated in FIG. 2B.

The settings review process may proceed to provide the control settings that have been programmed for the selected control device. For example, the settings review process may iterate through the programmed settings for each of the buttons on the "Kitchen Keypad."

Figure 4F:
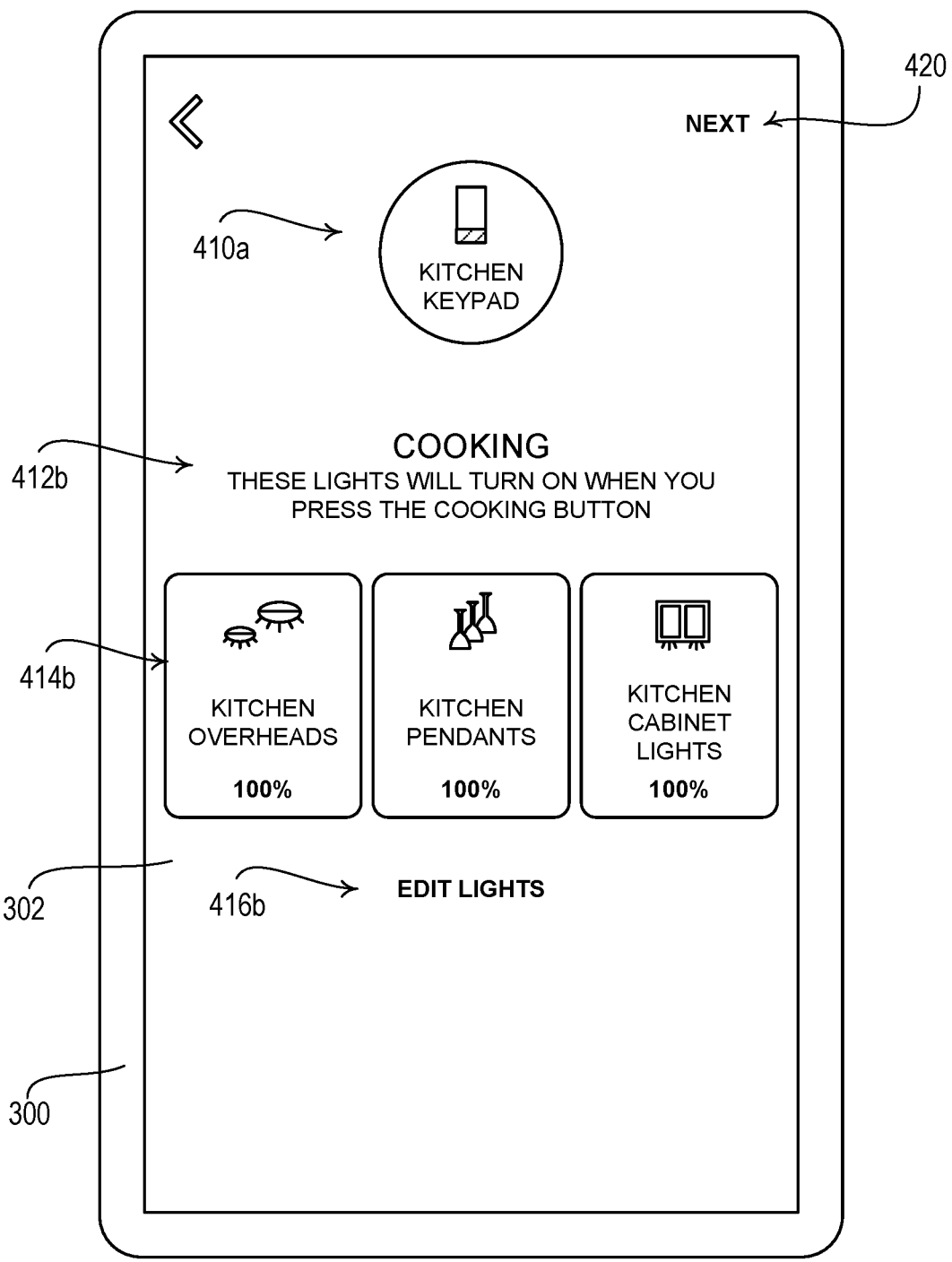

As shown in FIG. 4F, the user interface 302 may identify the control device (e.g., "Kitchen Keypad") for which control settings are being configured in a device identifier 410a. The user interface 302 may identify the control setting (e.g., scene or other setting) being configured for the "Kitchen Keypad" in a setting description 412b. The setting description 412b may identify the name of the setting (e.g., "Cooking" scene) and/or a definition for the setting. The "Cooking" button may be selected on the "Kitchen Keypad" for sending a digital message from the "Kitchen Keypad" for implementing the "Cooking" scene.

The user interface 302 may display load control configuration information 414b that is stored in the programming data for performing control in response to the selection of the "Cooking" button on the "Kitchen Keypad." The load control configuration information 414b may be represented as tiles that identify the name of the load control devices and/or electrical loads configured to be controlled by the selection of the "Cooking" scene. The load control devices and/or electrical loads may be identified by the selected location when added to the load control system. For example, the load control configuration information 414b may identify that the "Kitchen Overheads," the "Kitchen Pendants," and the "Kitchen Cabinet Lights" as the lights that are associated with the "Cooking" scene. The load control configuration information 414b may identify the current control settings (e.g., 100% dimming level) for controlling each of the load control devices and/or electrical loads in response to the selection of the "Cooking" scene.

The user interface 302 may include an edit settings button 416b that enables the user to edit the control settings for controlling the electrical loads in response to selection of the "Cooking" scene on the "Kitchen Keypad." For example, the edit settings button 416b may cause the user interface 302 to display a current control settings screen for the "Kitchen Overheads," the "Kitchen Pendants", and/or the "Kitchen Cabinet Lights." The current control settings screen may be similar to the current control settings 348 shown in FIG. 3N and may enable the current dimming level to be adjusted for controlling the "Kitchen Overheads," the "Kitchen Pendants," and/or the "Kitchen Cabinet Lights" in response to the selection of the "Cooking" scene. After the settings for the "Cooking" scene are adjusted, or otherwise determined to be at the appropriate level, the network device 300 may receive a selection of a next button 420 to view/adjust additional settings for the "Kitchen Keypad."

Figure 4G:
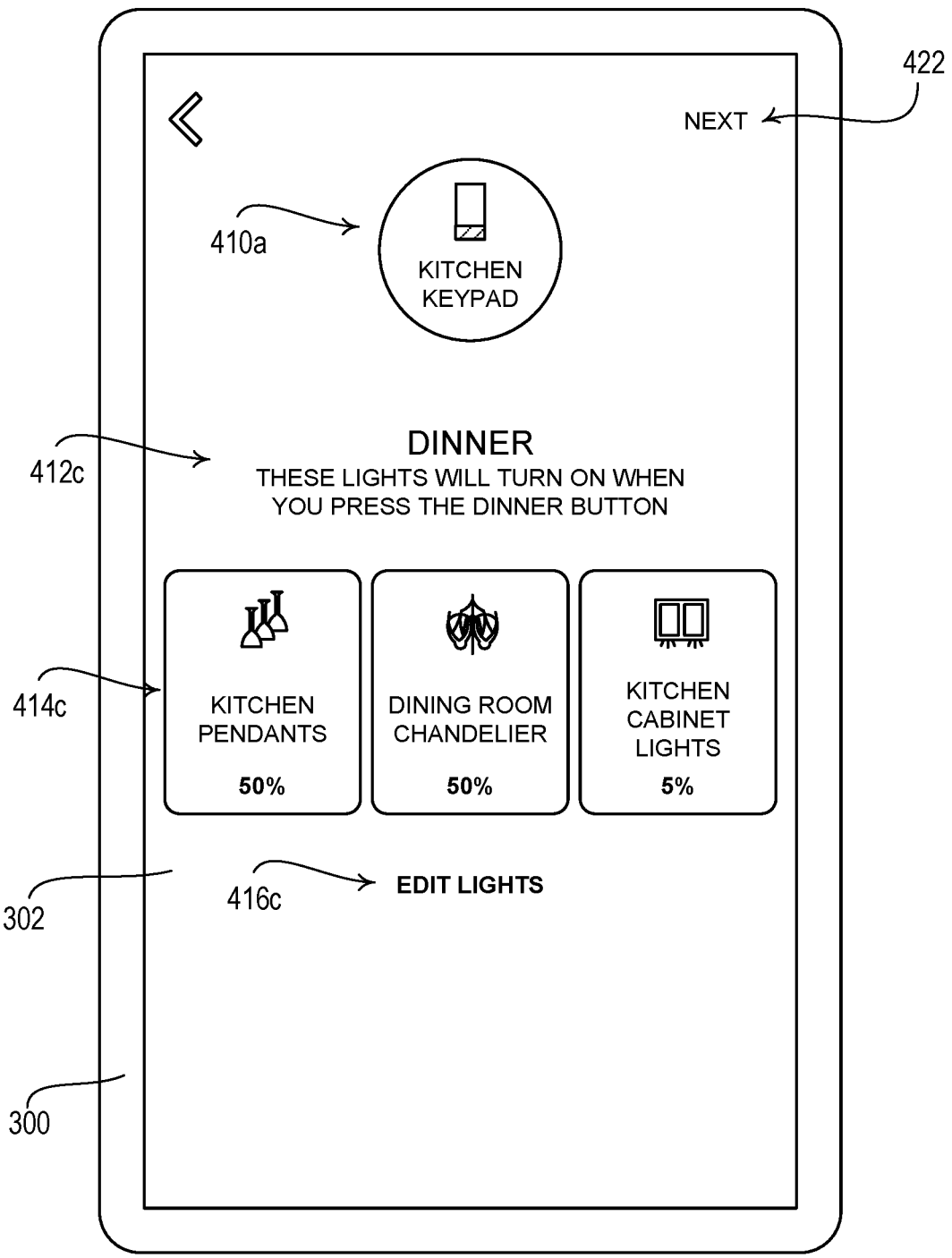

As shown in FIG. 4G, the settings review process may iterate through each of the scenes that have been automatically programmed for the buttons on the "Kitchen Keypad" to enable review and/or adjustment of the settings for the scene. The user interface 302 may identify the "Dinner" scene in a setting description 412c as the scene currently being configured for the "Kitchen Keypad." The "Dinner" button may be selected on the "Kitchen Keypad" for sending a digital message from the "Kitchen Keypad" for implementing the "Dinner" scene.

The user interface 302 may display load control configuration information 414c that is stored in the programming data for performing control in response to the selection of the "Dinner" button on the "Kitchen Keypad." The load control devices and/or electrical loads may be identified by the selected location when added to the load control system. For example, the load control configuration information 414c may be represented as tiles that identify the "Kitchen Pendants," the "Dining Room Chandelier," and the "Kitchen Cabinet Lights" as the lights that are associated with the "Dinner" scene.

The load control configuration information 414c may identify the control settings for controlling each of the load control devices and/or electrical loads in response to the selection of the "Dinner" scene. The load control device controlling the "Kitchen Pendants" is programmed to be controlled to a dimming level of 50% upon selection of the "Dinner" scene. The load control device controlling the "Dining Room Chandelier" is programmed to be controlled to a dimming level of 50% upon selection of the "Dinner" scene. The load control device controlling the "Kitchen Cabinet Lights" is programmed to be controlled to a dimming level of 5% upon selection of the "Dinner" scene.

The user interface 302 may include an edit settings button 416c that enables the user to edit the control settings for controlling the electrical loads in response to selection of the "Dinner" scene on the "Kitchen Keypad." For example, the edit settings button 416c may cause the user interface 302 to display a current control settings screen for the "Kitchen Pendants," the "Dining Room Chandelier," and/or the "Kitchen Cabinet Lights." The current control settings screen may be similar to the current control settings 348 shown in FIG. 3N and may enable the current dimming level to be adjusted for controlling the "Kitchen Pendants," the "Dining Room Chandelier," and the "Kitchen Cabinet Lights" in response to the selection of the "Dinner" scene. After the settings for the "Dinner" scene are adjusted, or otherwise determined to be at the appropriate level, the network device 300 may receive a selection of a next button 422 to view/adjust additional settings for the "Kitchen Keypad."

Figure 4H:
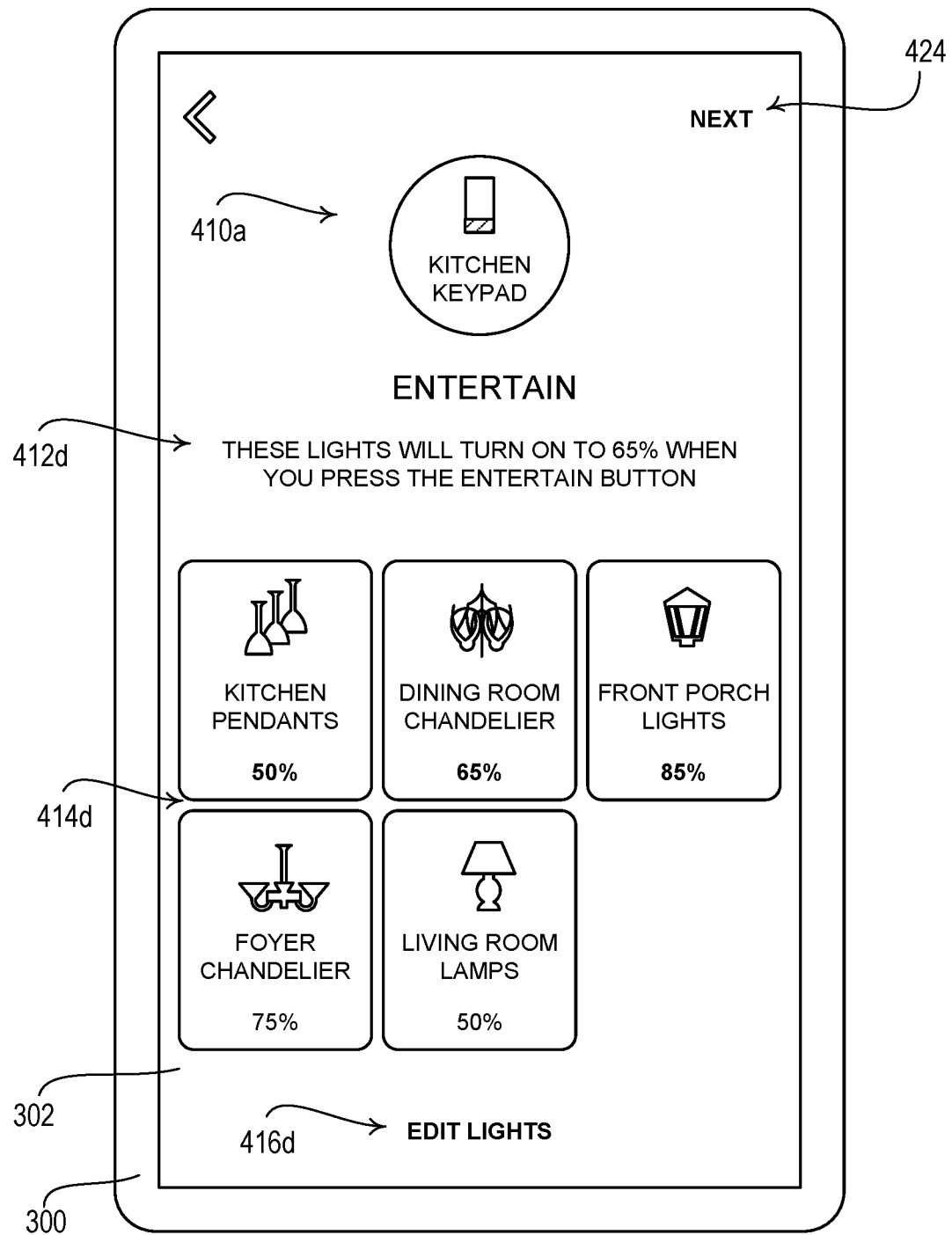

As shown in FIG. 4H, the user interface 302 may identify the "Entertain" scene in a setting description 412d as the scene currently being configured for the "Kitchen Keypad." The "Entertain" button may be selected on the "Kitchen Keypad" for sending a digital message from the "Kitchen Keypad" for implementing the "Entertain" scene.

The user interface 302 may display load control configuration information 414d that is stored in the programming data for performing control in response to the selection of the "Entertain" button on the "Kitchen Keypad." The load control devices and/or electrical loads may be identified by the selected location when added to the load control system. For example, the load control configuration information 414d may be represented as tiles that identify the "Kitchen Pendants," the "Dining Room Chandelier," the "Front Porch Lights," the "Foyer Chandelier," and the "Living Room Lamps" as the lights that are associated with the "Entertain" scene.

The load control configuration information 414d may identify the control settings for controlling each of the load control devices and/or electrical loads in response to the selection of the "Entertain" scene. The load control device controlling the "Kitchen Pendants" is programmed to be controlled to a dimming level of 50% upon selection of the "Entertain" scene. The load control device controlling the "Dining Room Chandelier" is programmed to be controlled to a dimming level of 65% upon selection of the "Entertain" scene. The load control device controlling the "Front Porch Lights" is programmed to be controlled to a dimming level of 85% upon selection of the "Entertain" scene. The load control device controlling the "Foyer Chandelier" is programmed to be controlled to a dimming level of 75% upon selection of the "Entertain" scene. The load control device controlling the "Living Room Lamps" is programmed to be controlled to a dimming level of 50% upon selection of the "Entertain" scene.

The user interface 302 may include an edit settings button 416c that enables the user to edit the control settings for controlling the electrical loads in response to selection of the "Entertain" scene on the "Kitchen Keypad." For example, the edit settings button 416c may cause the user interface 302 to display a current control settings screen for the "Kitchen Pendants," the "Dining Room Chandelier," the "Front Porch Lights," the "Foyer Chandelier," and/or the "Living Room Lamps." After the settings for the "Entertain" scene are adjusted, or otherwise determined to be at the appropriate level, the network device 300 may receive a selection of a next button 424 to view/adjust additional settings for the "Kitchen Keypad."

Figure 4I:
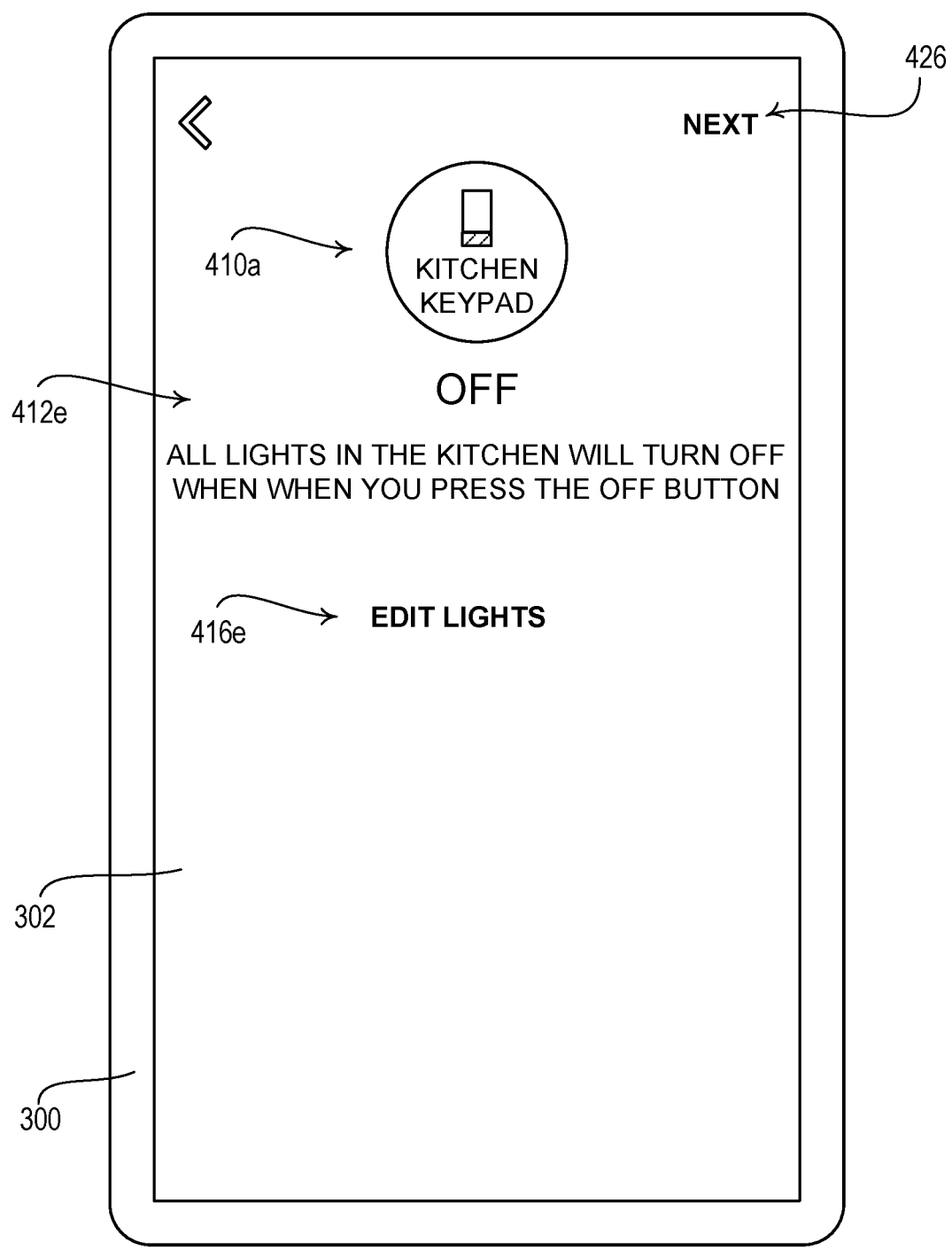

As shown in FIG. 4I, the user interface 302 may identify the "Off" scene in the setting description 412e as the scene currently being configured for the "Kitchen Keypad." The "Off" button may be selected on the "Kitchen Keypad" for sending a digital message from the "Kitchen Keypad" for implementing the "Off" scene.

As described in the setting description 412e, the "Off" scene may apply the same setting to each electrical load controlled by the "Kitchen Keypad" upon selection of the "Off" button. The user interface 302 may include an edit settings button 416e that enables the user to edit the control settings for controlling the load devices that are controlled in response to selection of the "Off" scene on the "Kitchen Keypad." After the settings for the "Off" scene are adjusted, or otherwise determined to be at the appropriate level, the network device 300 may receive a selection of the next button 426.

The settings review process may continue to provide programming data for additional devices. If the settings for each of the added devices in the programming data has been presented to the user, or skipped, the programming data may be stored at the network device 300 and/or the system controller. The network device 300 and/or the system controller may identify the updated settings in the programming data and update the programming of the load control system accordingly. For example, the network device 300 and/or the system controller may send the updated settings to the load control devices for being implemented in response to digital messages from control-source devices. The network device 300 and/or the system controller may, alternatively, send the entire programming data, including the updates, which may replace the programming data on the receiving devices. The system controller may store the updated settings thereon for being implemented to send control instructions to load control devices in response to digital messages received from control-source devices.

Figure 5A:
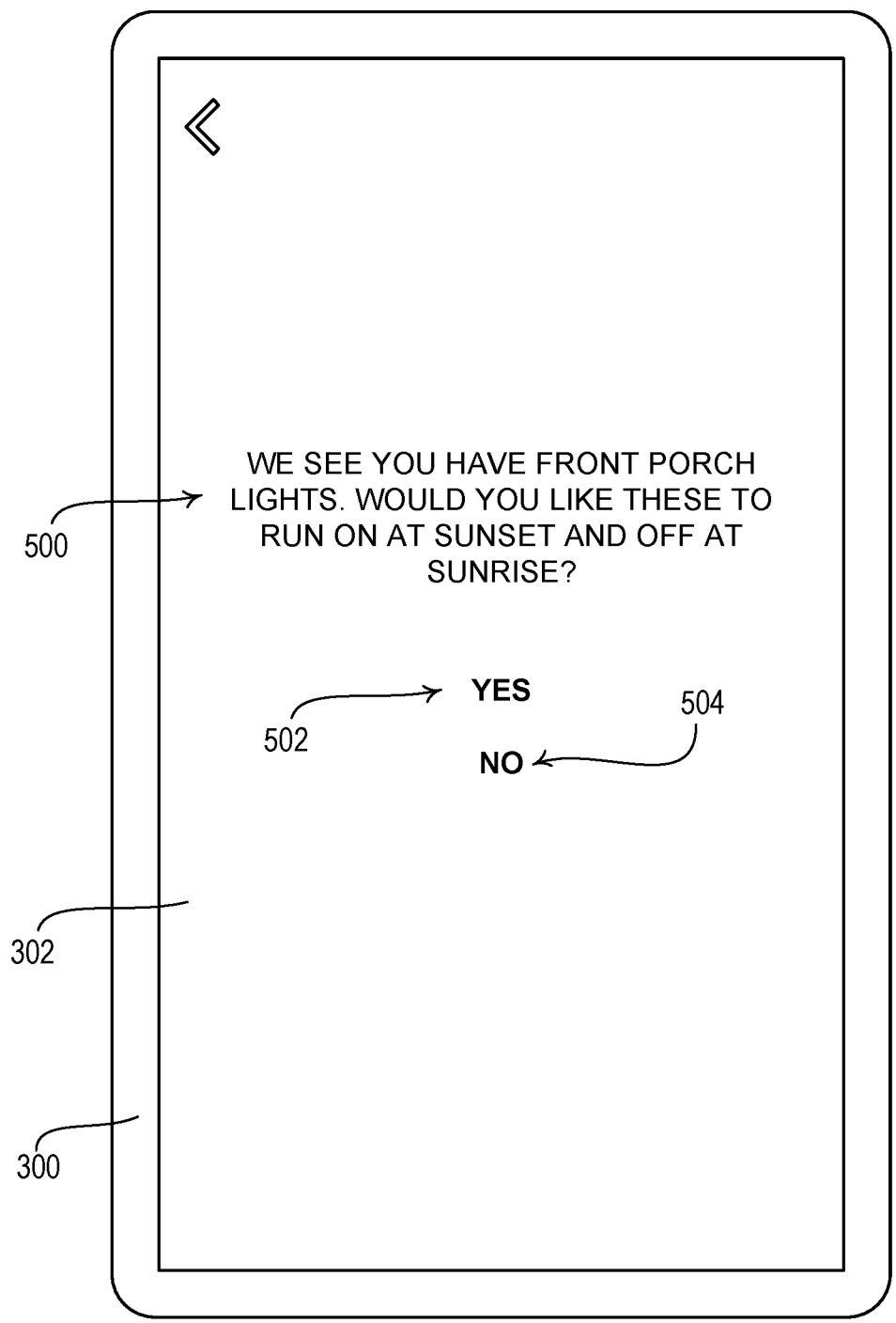
FIGS. 5A-5D show example configurations of a user interface that may be displayed on a visual display for adjusting programming data for control devices in response to a recommendation to configure a load control system.
Figure 5B:
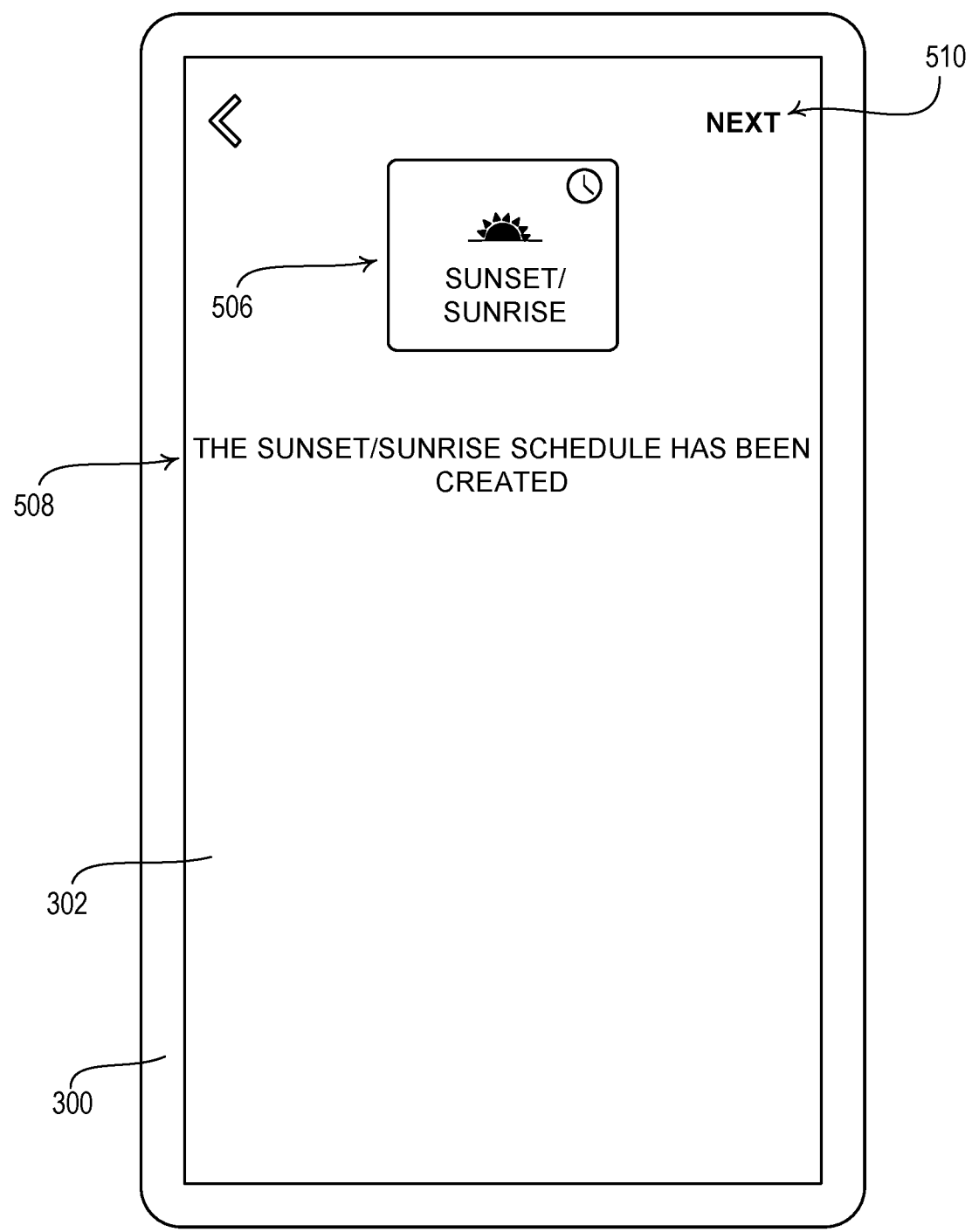

The settings review process executed on the network device 300 or the system controller may also, or alternatively, detect the addition of control devices in a location and provide the user with options for adjusting the settings for devices added to the location. FIGS. 5A and 5B show example configurations of the user interface 302 that may be displayed on a visual display of the network device 300 by a design software, e.g., a graphical user interface (GUI) software, for reviewing and/or adjusting programming data for control devices in an identified location to configure a load control system (e.g., a building control system). The configurations of the user interface 302 that are illustrated in FIGS. 5A and 5B may be implemented after adding control devices (e.g., as shown in FIGS. 3A-3P) to the load control system to provide the user with options for configuring the settings for performing control of electrical loads in the load control system. In another example, the configuration of the user interface 302 shown in FIGS. 5A and 5B may be displayed in response to another triggering event.

As shown in FIG. 5A, the user interface 302 may display a recommendation 500 to the user for programming a control device based on the location in which the control device was added. For example, the settings review process may detect the addition of a lighting control device to the front porch location and generate the recommendation 500 for implementing a schedule for operating the load control device. The recommendation 500 may be to implement a sunset/sunrise schedule due to the addition of the lighting control device at the front porch location. The user may accept the recommendation 500 using the accept button 502, or reject the recommendation using the reject button 504.

As shown in FIG. 5B, the user interface 302 may display a confirmation 508 that the network device 300 received the user selection. The user interface 302 may display a tile 506 that indicates the added schedule. The user may select the tile 506 to view/adjust the sunset/sunrise schedule. The network device 300 may receive a selection of the next button 510 to view other recommendations or options for adjusting the programming data for the load control system. For example, the settings review process may cause other recommendations, such as the recommendations shown in FIGS. 5C and 5D, or programming options to be displayed to the user.

Figure 5C:
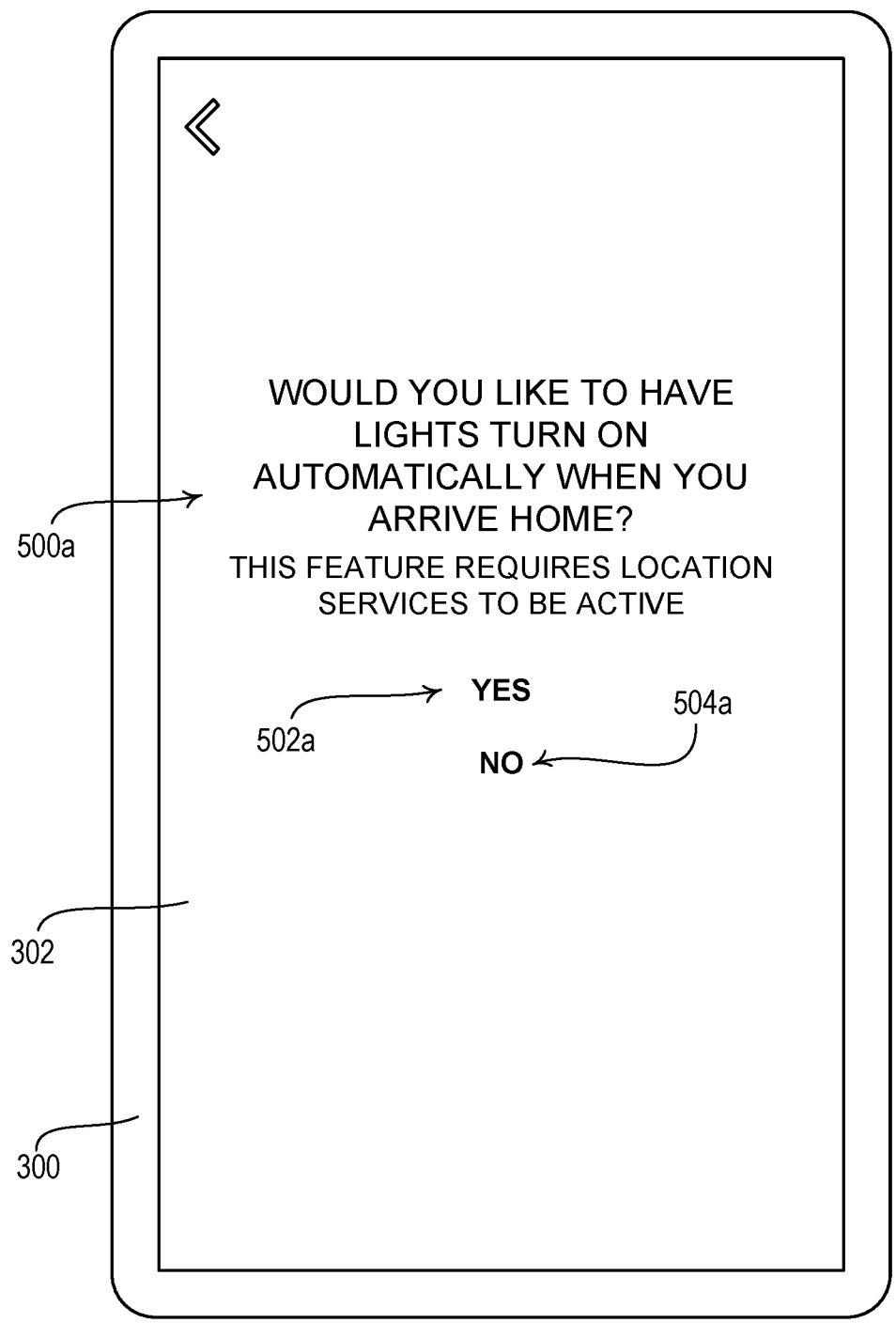
Figure 5D:
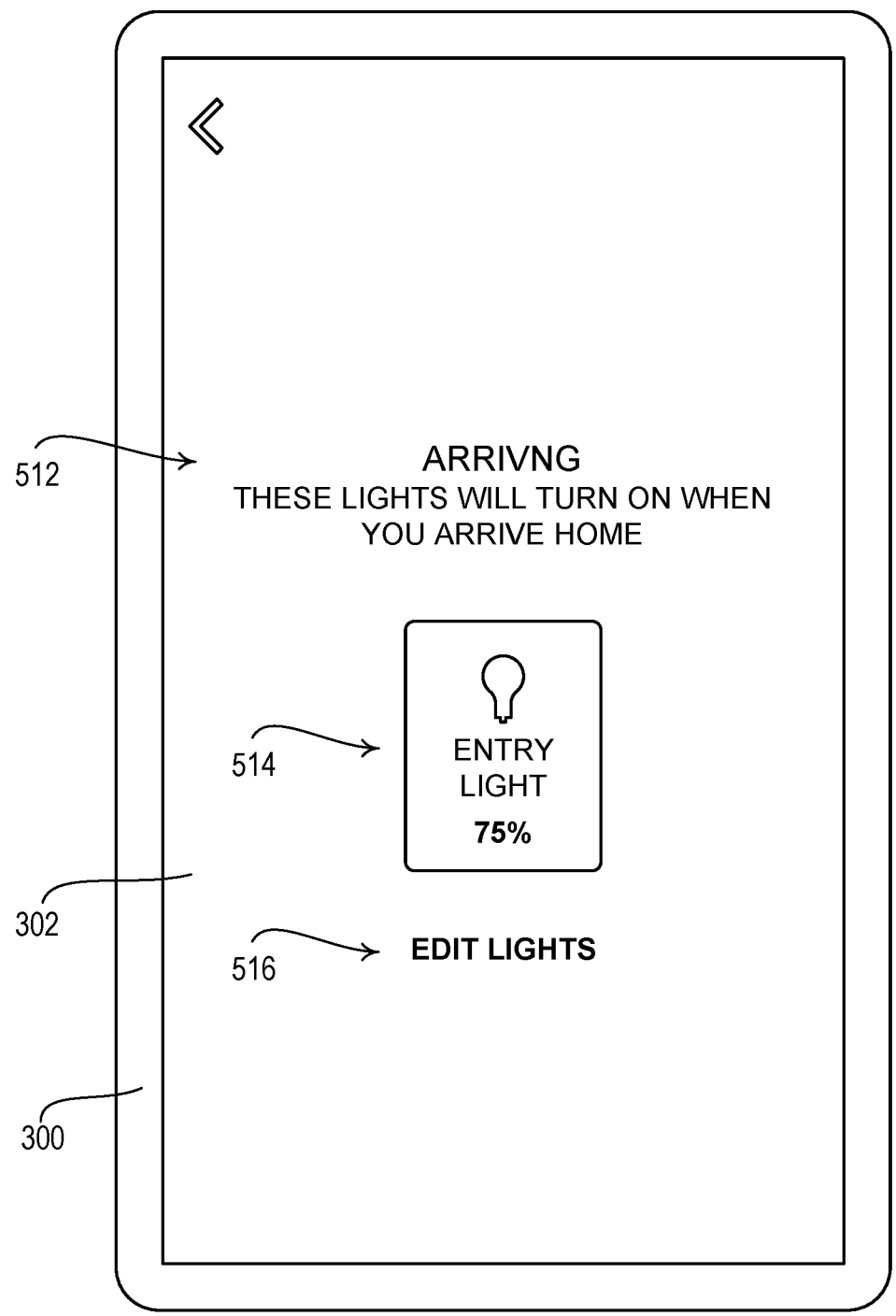

FIGS. 5C and 5D show example configurations of the user interface 302 that may be displayed on a visual display of the network device 300 by a design software, e.g., a graphical user interface (GUI) software, for reviewing and/or adjusting the programming data for control devices that have been added to a load control system (e.g., a building control system). As shown in FIGS. 5C and 5D, the adjustment to the programming data may be an addition of settings. The configurations of the user interface 302 that are illustrated in FIGS. 5C and 5D may be implemented after adding control devices (e.g., as shown in FIGS. 3A-3P) to the load control system to provide the user with options for configuring the settings for performing control of electrical loads in the load control system. In another example, the configuration of the user interface 302 shown in FIGS. 5C and 5D may be displayed in response to another triggering event.

As shown in FIG. 5C, the user interface 302 may display a recommendation 500*a* to the user for programming control devices based on automated control features. The automated control features may include location-based services that indicate a location of the user. The location services may indicate the location of the user to the system controller. The location of the user may be detected by the network device of the user or other forms of location detection (e.g., occupancy sensing, etc.). The location-based services may be implemented for a specific user (e.g., using the network device of the user) or occupancy detection generally (e.g., using occupancy sensing).

The recommendation 500*a* may recommend performing load control when the user arrives at a location. For example, the recommendation 500*a* may recommend turning on lights when a user arrives at a location. The recommendation 500*a* may recommend different types of load control for different devices and/or different locations. The user may accept the recommendation 500*a* using the accept button 502*a*, or reject the recommendation 500*a* using the reject button 504*a*.

As shown in FIG. 5D, the user interface 302 may display a setting description 512 that may identify the name of the setting (e.g., "Arriving" scene) and/or a definition for the setting. The user interface 302 may display the load control configuration information 514 that is included in the programming data for performing control in response to the "Arriving" scene. The load control configuration information 514 may be represented as a tile that identifies the name of the load control device or electrical load (e.g., "Entry Light") configured to be controlled in the currently identified settings (e.g., "Arriving" scene) and/or the current control settings (e.g., 75% dimming level) for controlling the load control device or electrical load in response to the "Arriving" scene.

The user interface 302 may include an edit settings button 516 that enables the user to edit the control settings for controlling the electrical load (e.g., "Entry Light") in response to the "Arriving" scene. For example, the edit settings button 516 may cause the user interface 302 to display a current control settings screen for the lighting load (e.g., "Entry Light"), similar to the current control settings 348 shown in FIG. 3N, that enables the current dimming level to be adjusted for the lighting device (e.g., "Entry Light") in response to the "Arriving" scene.

Though the "Arriving" scene is described for being configured, a "Leaving" scene may be similarly configured. The "Arriving" scene and the "Leaving" scene may correspond to the "Home" scene and "Away" scene, or may be different scenes for performing load control in the system.

Though the user interface 302 is described as being a single user interface 302 with updated configurations, one or more user interfaces may be implemented. Additionally, though configurations of the user interface 302 may be illustrated in a particular order or combination, other orders and combinations may be implemented.

Figure 6:
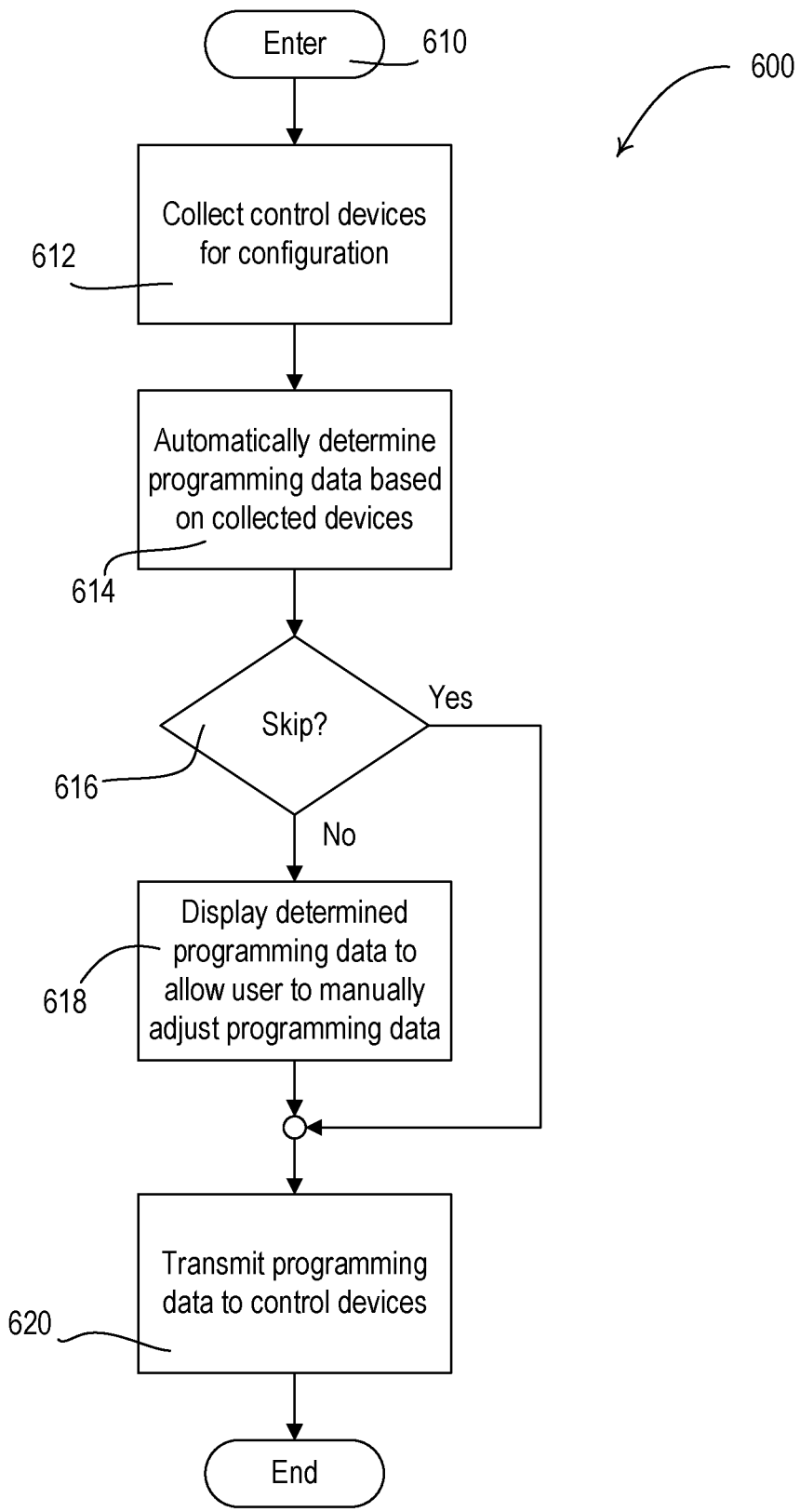
FIGS. 6-11 depict flow diagrams of example methods for configuring a load control system.

FIG. 6 is a flow diagram of an example method 600 for configuring a load control system using a graphical user interface software (e.g., the design software). The method 600 may be performed by a network device and/or a system controller in a load control system. The method 600 may be performed on a single device, or may be distributed across multiple devices. For example, the method 600, or portions thereof, may be performed by the system controller and/or one or more network devices, such as personal computers (PCs), laptops, tablets, smart phones, servers, or equivalent devices having access to a visual display. The method 600 may be performed on a system controller capable of displaying and retrieving information via an application on a network device or other device having a visual display.

The method 600 may begin at 610. At 612, the design software may collect the control devices (e.g., control-source devices and/or control-target devices) for being added to the load control system. For example, the control devices may be collected as illustrated in FIGS. 3A-3P. The user may actuate a button on each control device to cause the control device to be added to the load control system (e.g., the control device may be added to the programming database and/or the control device may be associated with the system controller 150, such that the control device may communicate with the system controller). After the control devices are collected, at 612, the design software may automatically determine programming data based on the collected devices at 614. The programming data may include the programming settings and/or control features for controlling the electrical loads in the load control system. The programming data may be automatically determined based on the control device, the location of the control device, and/or the type of load being controlled.

At 616, the design software may determine whether to adjust the automatically determined programming data, or skip the adjustment of the automatically-determined programming data. For example, as shown in FIG. 4A, the user may be presented with options for adjusting the automatically-determined programming data, or skip the adjustment of the automatically-determined programming data. If the user selects to adjust (e.g., edit) the programming data, the design software may display the determined programming data to allow the user to review and/or manually edit the programming data, at 618. The programming data may be displayed and/or adjusted at a network device by a settings review process. If the user manually edits the programming data at 618, the programming data may be marked as "edited" in memory in the network device.

After the review and/or adjustment of the programming data at 618, or after the adjustment of the programming data is skipped at 616, the programming data may be transmitted, at 620 to the control devices. The control devices may perform as indicated in the programming data during normal operation of the load control system. In another example, the system controller may maintain the programming data and instruct control devices according to the programming data.

As described above with reference to FIG. 6, the control devices may be added to the programming database and may be associated with the system controller at 612 of the method 600. In addition, the control devices may be added to the programming database at 612 and then be associated with the system controller after the design software automatically determines the programming data at 614 but before the programming data is transmitted to the control devices at 620. Thus, the programming database may be completed prior to installation of the control devices of the load control system 100.

Figure 7:
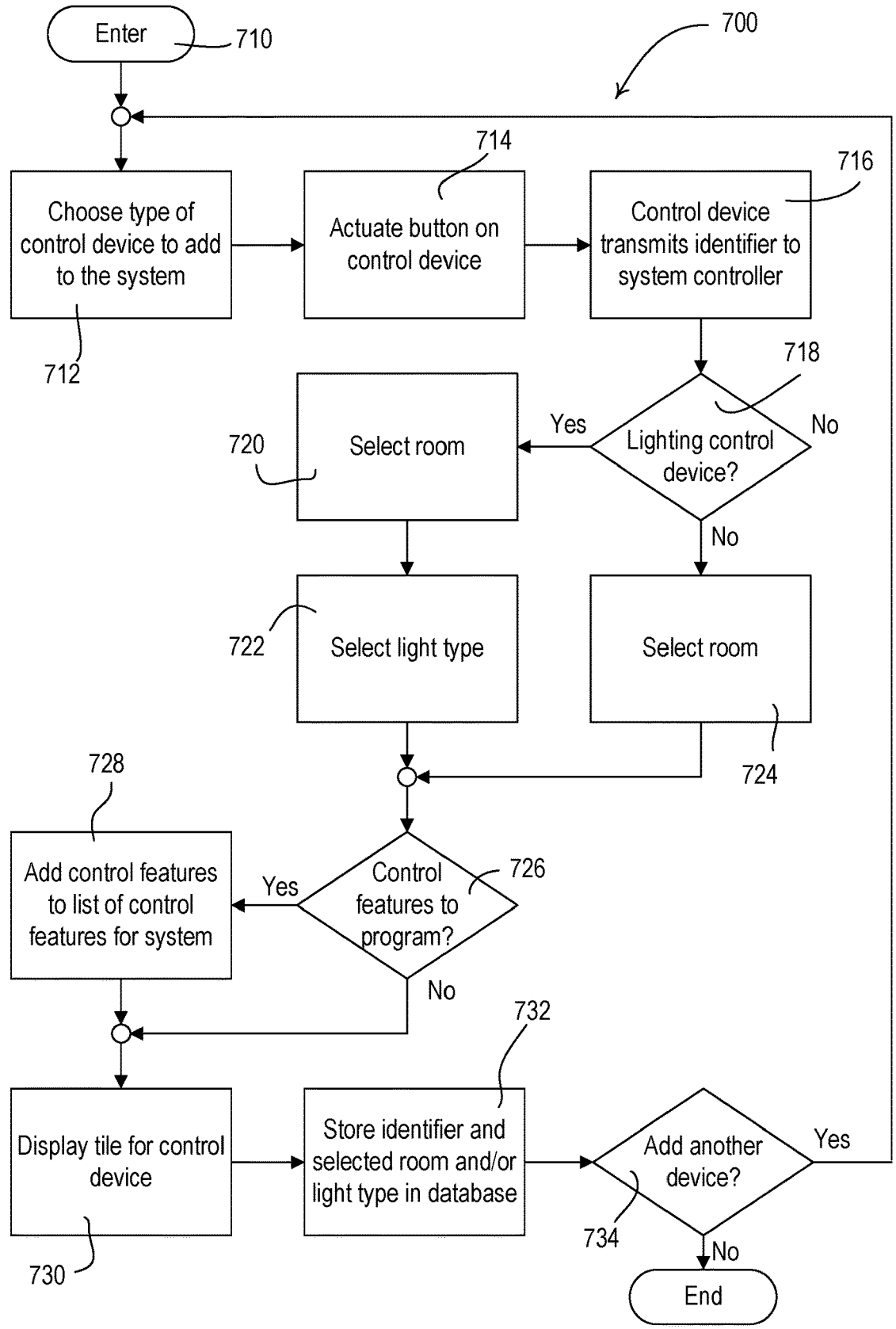

FIG. 7 is a flow diagram of an example method 700 for collecting control devices for a load control system using a graphical user interface software (e.g., the design software). The method 700 may be implemented using design software implemented on one or more devices. For example, the method 700 may be implemented at a network device and/or a system controller. The method 700 may be performed on a system controller capable of displaying and retrieving information via an application on a network device or other device having a visual display. The method 700 may be executed during the method 600, for example, to collect the control devices at 612.

The method 700 may begin at 710. At 712, a type of control device may be chosen to add to the system. The type of control device may be chosen by user selection via a user interface, such as the interface 302 shown in FIG. 3A. A button may be actuated on the control device, at 714, to identify the control device to be added to the system. Upon actuation of the button on the control device, at 714, the control device may transmit a digital message that includes an identifier of the control device to a system controller, at 716.

If the control device is identified as a lighting control device at the system controller, at 718, the design software may receive a user selection of a room in which the control device is located at 720 and a light type controlled by the lighting control device at 722. If the control device is identified, at 718, as another type of control device (e.g., a remote control device) by the system controller, the design software may receive, at 724, a user selection of a room in which the control device is located. The user selection of the room and/or the light type may be received by the design software as indicated at FIGS. 3C-3L.

If there are one or more control features associated with the collected control devices (e.g., lighting control devices and/or remote control devices) at 726, the design software may add control features for the collected control devices to a list of control features for the load control system at 728. For example, if the collected control device is a four-button remote control device located in the kitchen (e.g., the remote control device 220 shown in FIG. 2B), the design software may add a "Cooking" scene, a "Dinner" scene, an "Entertain" scene, and an "Off" scene into the list of control features for the load control system. If the control features associated with the collected control devices at 726 are already in the list of control features for the load control system, the design software may not add the control features to the list a second time at 728.

After selection of the location and/or the light type for the control device, the design software may display a tile for the control device at 730. An example of tiles that may be displayed are shown in FIGS. 3M and 3P. The tile may provide a description of the added control device and/or the control settings for the added control device. The tile may be a button that may be selected for adjusting control settings.

At 732, the identifier of the control device may be stored with the selected room and/or light type in a database. The design software may determine, at 734, whether another control device is to be added. For example, the user may indicate whether another control device is to be added. If another control device is to be added, the method 700 may return to 712. If not, the method 700 may end.

Figure 8:
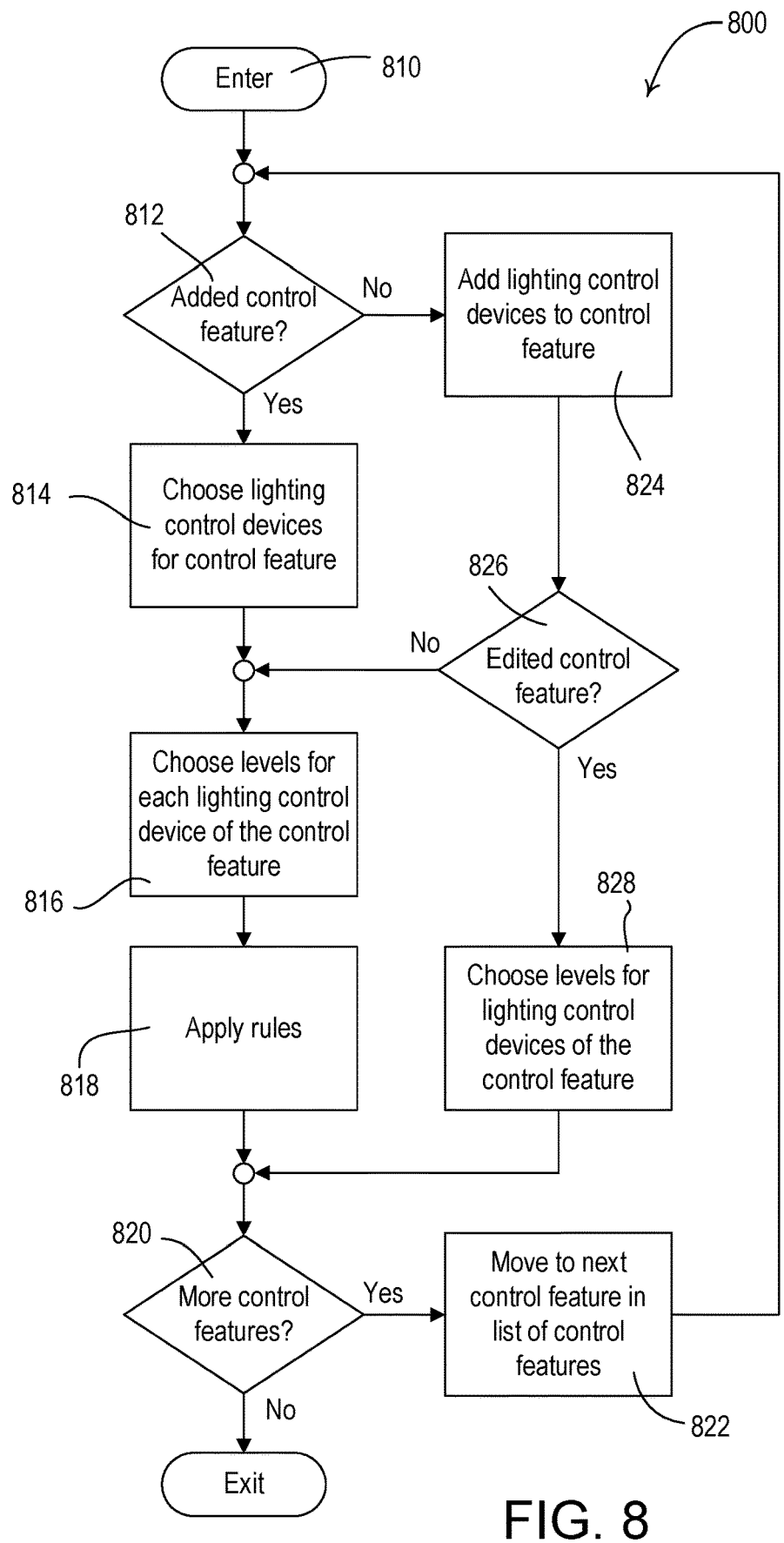

FIG. 8 is a flow diagram of an example method 800 for automatically determining programming data based on collected devices in a load control system. As previously mentioned, the programming data may include settings for one or more control features, such as, a scene (e.g., a preset), a schedule, or an automated control feature. The method 800 may be implemented using design software implemented on one or more devices. For example, the method 800 may be implemented at a network device and/or a system controller. The method 800 may be performed on a system controller capable of displaying and retrieving information via an application on a network device or other device having a visual display. The method 800 may be executed during the method 600, for example, to automatically determine the programming data at 614 after each of the control devices has been collected at 612. In addition, or alternatively, the method 800 may be executed each time that a control device is added to the load control system at 612. After the load control system is fully programmed (e.g., after the method 600 is completed), the method 800 may be executed when one or more additional devices are added to the load control system to automatically determine programming data based on the collected devices.

The method 800 may begin at 810. The design software may automatically determine programming data for each of the control features in the list of control features (e.g., the list of control features determined at 728 of method 700). If the present control feature to be programmed is determined not to be a control feature in the list at 812, the design software may choose (e.g., automatically choose) the lighting control devices for being programmed for the present control feature (e.g., a preset scene) at 814. At 816, the design software may choose (e.g., automatically choose) the dimming levels for the lighting loads controlled by the lighting control devices chosen at 814. The lighting control devices to be included in the control feature and/or the dimming levels may be chosen based on the location of the control device and/or the type of light being controlled by the lighting control device. At 818, the design software may apply one or more rules to the dimming levels of the control feature determined at 814 and 816 to modify the programming data if one or more conditions exist in the programming data (e.g., as will be described in greater detail below). At 820, a determination may be made as to whether more control features may be configured. If additional scenes are available for being configured for a lighting control device, the method 800 may continue to the next control feature (e.g., of the same lighting control device or another), at 822.

If the present control feature to be programmed is not determined to be a control feature to be added to the list of control features at 812 (e.g., the control feature is an existing control feature), the design software may choose (e.g., automatically choose) the lighting control devices to add to the present control feature at 824. In some cases, no lighting control devices will be added to the present control feature at 824. At 826, the design software may determine if the control feature to be programmed has been marked as edited (e.g., has been previously automatically programmed at 614 and edited at 618 of method 600). If the control feature has not been edited at 826, the design software may choose the dimming levels for the lighting loads controlled by each of the lighting control devices (e.g., the existing and new lighting control devices) at 816 and apply the rules to the dimming levels of the control feature at 818. If the design software determines that the control feature has been edited at 826, the design software may choose the dimming levels for the lighting loads controlled by the added lighting control devices at 828. If the design software determines that the control feature has been edited at 826, the design software may not apply the rules to the dimming levels of the control feature. As a result, the design software may not overwrite manual changes to the control feature made by a user of the load control system. When there are no more control features to program at 820, the method 800 may exit. Though the method 800 is described using a lighting control device and lighting loads, the method 800 may be performed for other control devices and load types.

Figure 9:
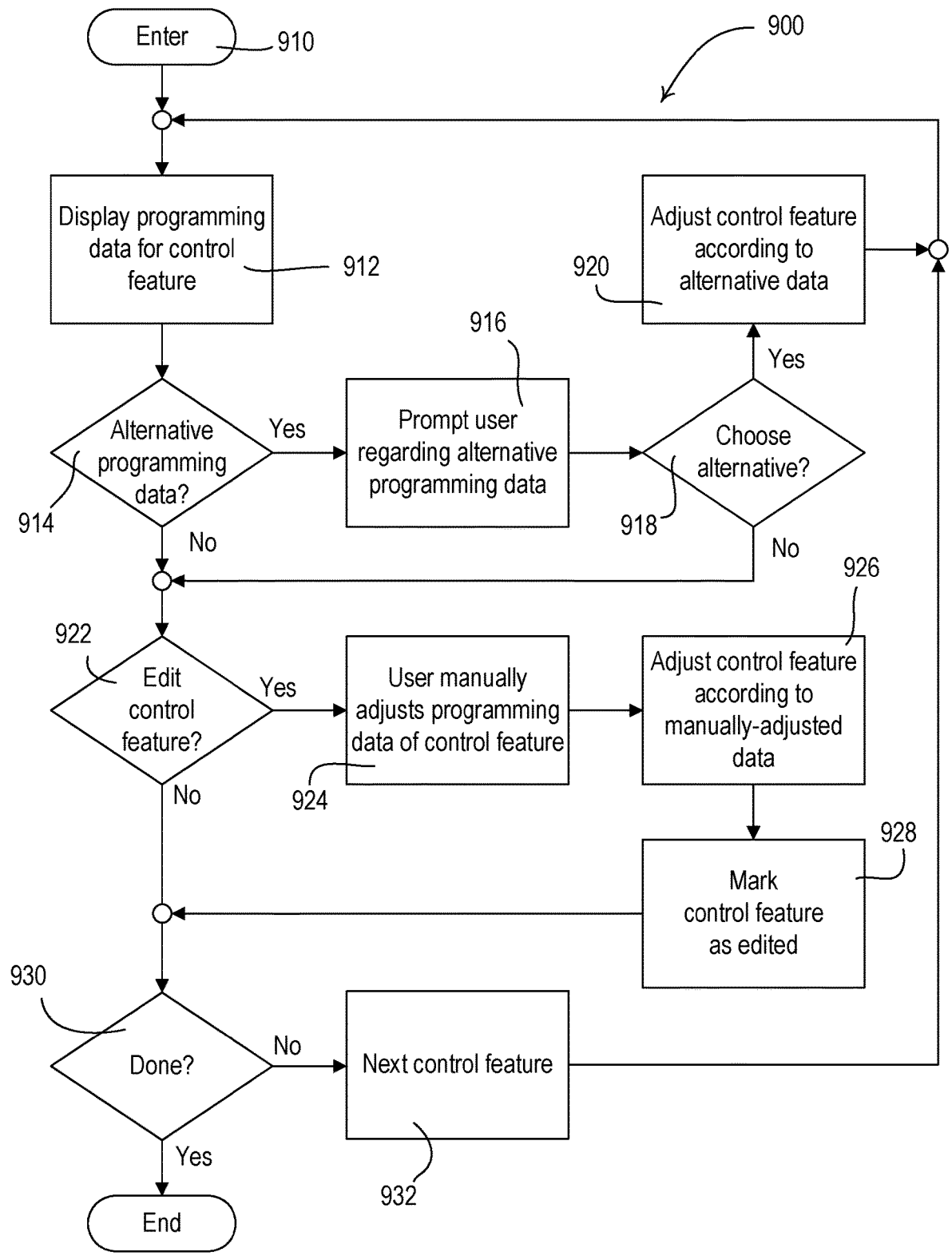

FIG. 9 is a flow diagram of an example method 900 for displaying determined programming data to allow a user to adjust the programming data (e.g., the control features). The method 900 may be implemented using design software comprising a settings review process implemented on one or more devices. For example, the method 900 may be implemented at a network device and/or a system controller. The method 900 may be performed on a system controller capable of displaying and retrieving information via an application on a network device or other device having a visual display. The method 900 may be executed during the method 600, for example, to display the programming data and allow user to adjust the programming data at 618.

The method 900 may begin at 910. At 912, the programming data may be displayed for a control feature (e.g., a scene, a schedule (and/or scheduled events), or an automated control feature). A determination may be made, at 914, as to whether there is alternative programming data available. For example, a determination may be made as to whether a recommendation is available for alternative programming. If alternative programming is available, the user may be prompted, at 916, with a display regarding the alternative programming data. FIGS. 5A and 5C illustrate examples of a prompt that provides a recommendation for alternative programming that is available.

If the user chooses, at 918, to implement the alternative program data being recommended, the programming data of the control feature may be adjusted according to the alternative data, at 920. If the user does not choose to implement the alternative programming data at 918, or alternative programming data is not determined to be available at 914, the method 900 may continue to determine whether to edit the current control feature, at 922.

If, at 922, the user selects to edit the control feature, the user may manually adjust the programming data of the control feature at 924. For example, the user may edit the programming data of the control feature by selecting an edit settings button (e.g., the edit settings button 416 shown in FIG. 4C) and editing the control settings for the control feature. The control feature may be adjusted, at 926, according to the manually-adjusted data and stored at the system controller, the network device, and/or the control devices. The control feature may be marked as 'edited" at 928 (e.g., so that future executions of the method 800 do not overwrite the manual changes made by the user during the method 900).

A determination may be made, at 930, as to whether the adjustment to the programming data is finished. If the adjustments to the programming data are not finished, the next control feature (e.g., scene, schedule, or automated control feature) may be determined for being adjusted at 932. If the adjustments to the programming data are finished, the method 900 may end.

Figure 10:
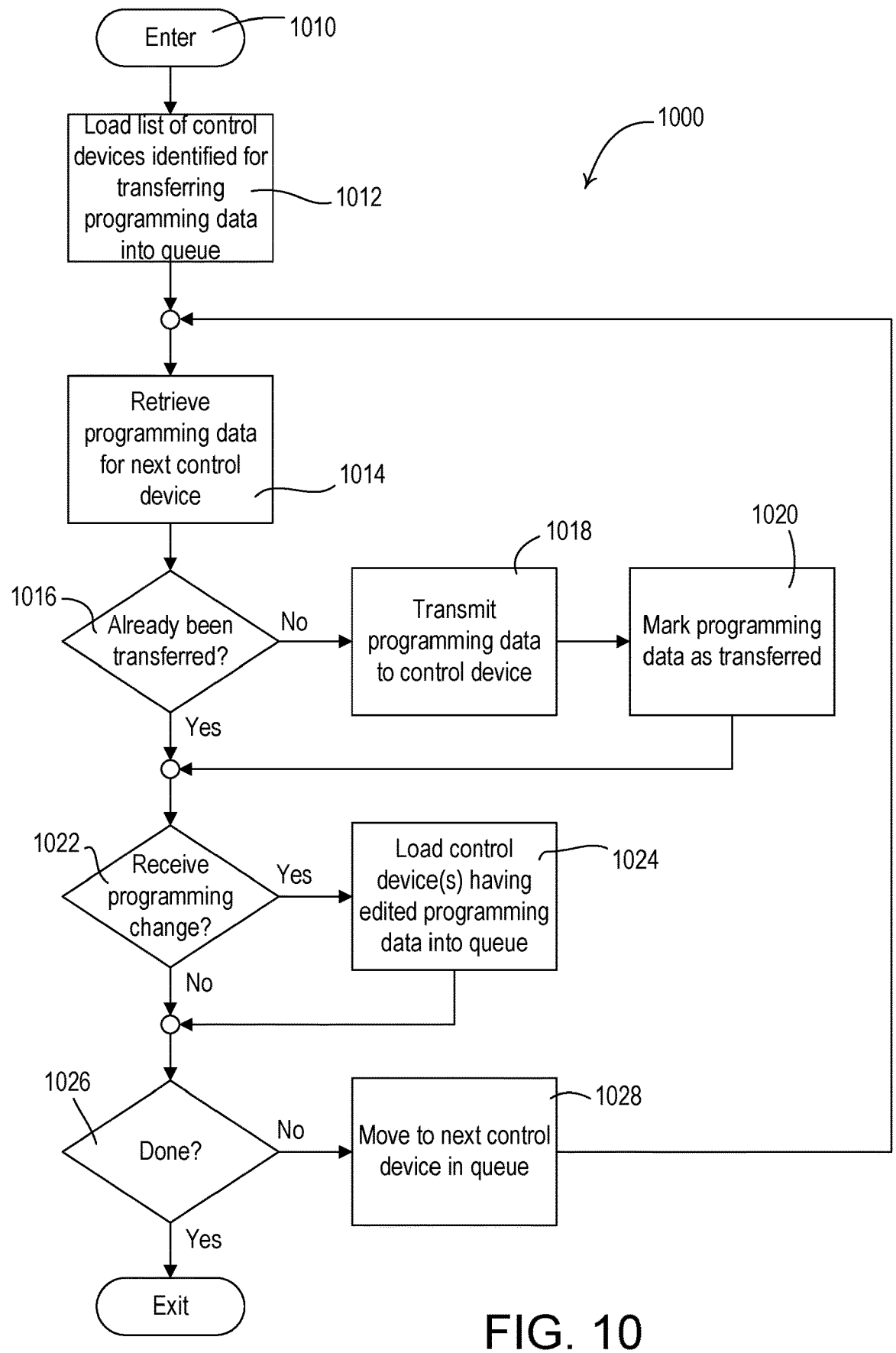

FIG. 10 is a flow diagram of an example method 1000 for transmitting programming data to control devices of a load control system. The method 1000 may be implemented using design software comprising a settings review process implemented on one or more devices. For example, the method 1000 may be implemented at a control device, such as, a system controller (e.g., the system controller 150 of the load control system 100), capable of transmitting the programming data to other control devices. The method 1000 may be executed during the method 600, for example, to transmit the programming data to the control devices at 618.

The method 1000 may begin at 1010. At 1012, the system controller may load into a transfer queue a list of control devices that are identified for having the programming data transferred to them (e.g., the lighting control devices, remote control devices, and other control devices of the load control system). The system controller may determine the order that the control devices are put into the queue at 1012. The system controller may prioritize certain types of control devices or certain rooms higher than others. For example, the system controller may put the control devices from the room that was last programmed (e.g., predicted as the room in which the user is most likely located) in the queue first (e.g., to enable more immediate control of the recently programmed devices and/or devices in the more recently programmed locations). At 1014, the system controller may retrieve from memory the programming data for the next control device. If the programming data has not already been transferred to that control device at 1016, the system controller may transmit the programming data to the control device at 1018 and mark the programming data for that control device as "transferred" at 1020.

After transferring the programming data, or if the programming data had already been determined to be transferred at 1016, the system controller may determine at 1022 if any changes to the programming data have been made since the programming data was last transferred or while the transfer of programming data was occurring (e.g., during the method 1000). The system controller may mark the programming data for a control device that has already been transferred to indicate that the programming data has already been transferred to the control device. When the programming data for the control device is edited, the system controller may mark the programming data for the control device to enable the programming data to be transferred at a subsequent programming data update (e.g., the next system update). If edits to the programming data have been determined to have been made at 1022, the system controller may load into the queue (e.g., at the end of the queue) at 1024 the control device(s) having edited programming data for being transferred to them as a result of the changes.

After adding the additional control device(s) into the queue at 1024, or if changes to the programming data have not been received at 1022, the system controller may determine if the transfer of the programming data to the control devices has been completed (e.g., the queue is empty) at 1026. If the queue still has control devices for being transferred programming data at 1026, the system controller may move to the next control feature at 1028 and retrieve the programming data for the next control device at 1014. If the queue is empty at 1026, the method 1000 may end.

Figure 11:
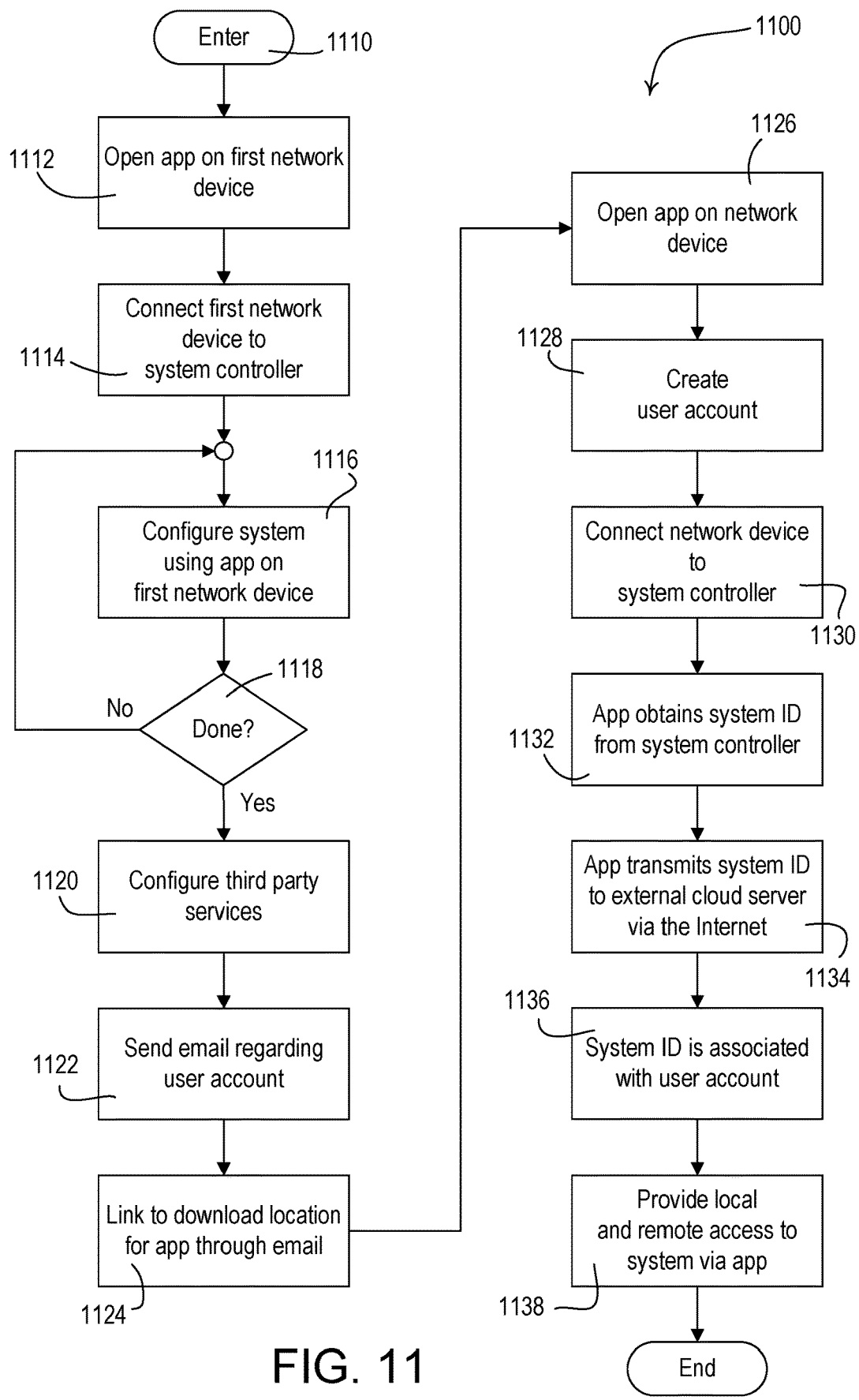

FIG. 11 is a flow diagram of an example method 1100 for configuring a load control system using a graphical user interface software (e.g., the design software). The load control system may be designed and/or configured by a worker, such as an electrical contractor, who may be hired by a homeowner to design and/or configure the load control system in a house in which the homeowner lives. The method 1100 may allow the contractor to design and/or configure the load control system prior to the homeowner creating a user account with the manufacturer of the load control system. The design software may also allow the homeowner to control and/or monitor the operation of the load control system after the homeowner creates the user account.

The method 1100 may begin at 1110. At 1112, the design software may be opened on a network device (e.g., a smart phone and/or tablet that is owned by the contractor). The contractor may start designing and/or configuring the load control system without logging into a user account for the load control system. For example, the contractor may select a link labelled "I'm setting up this system for someone else" on a screen of the design software that is displayed immediately after the design software is opened. At 1114, the network device may be connected to the system controller of the load control system. For example, the contractor may actuate a button on the system controller when the network device is in close proximity to the system controller to enable connection of the network device to the system controller. The network device may be configured to communicate directly with the system controller using a standard wireless technology, such as Wi-Fi technology and/or Bluetooth technology, for example. The network device may be able to connect to the system controller for a limited amount of time (e.g., 48 hours) after being connected to the system controller at 1114 (e.g., to provide security for the homeowner since the contractor will not able to connect to the system controller in the future).

At 1116, the load control system may be designed and/or configured. For example, the contractor may use the method 600 shown in FIG. 6 to design and/or configure the load control system. The contractor may continue to design and/or configure the load control system until the contractor is done at 1118. The load control system may be designed and/or configured using the auto-programming features described herein. When the design and/or configuration of the load control system has completed at 1118, other services (e.g., third party services) may be configured at 1120. For example, the configuration may include providing the third party with authentication and/or access to the load control system. Authentication may be performed by physical authentication, which may include pressing a button located within (e.g., in the same location as) a load control system. Physical authentication may be performed prior to the creation of a user account for the load control system. Other services may include troubleshooting services, commissioning services, monitoring services and/or configuration services. The other services may be achieved using a single device, or may be distributed across multiple devices. For example, the other services, or portions thereof, may be achieved by using a third party server (e.g., Amazon Alexa, Google Home, etc.).

Next, an email may be sent at 1122 that includes instruction for how to create a user account that will allow the user to access the programming information to configure, control, and/or monitor the operation of the load control system. For example, when the contractor completes design and/or configuration of the load control system, an email may be sent to the homeowner that includes instructions for how the homeowner may create a user account. The design software may be accessed via a link in the email and downloaded on the network device of the user at 1124. For example, when the homeowner receives the email, the homeowner may use a network device (e.g., a smart phone and/or tablet that is owned by the homeowner) to link to a download location of the design software (e.g., by clicking on a link in the email) and download the design software onto the network device at 1124.

At 1126, the design software may be opened on the network device (e.g., by the homeowner). At 1128, a new user account may be created with the manufacturer of the load control system. For example, the homeowner may select a link labelled "Create New Account" on the screen of the design software that is displayed immediately after the design software is opened. In addition to creating a new user account at 1128, the homeowner may be able to log into an existing user account with the manufacturer of the load control system and click on a link labeled "Add a New System." At 1130, the network device may be connected to the system controller of the load control system, for example, by the homeowner actuating a button on the system controller when the network device is in close proximity to the system controller (e.g., within RF range of the system controller). Since the network device is connected to the system after the user account is created and/or logged into, the network device may be able to connect to the system controller (e.g., have local access to the system controller) for an unlimited amount of time after being connected to the system controller at 1130. When the network device of the homeowner connects to the system controller at 1030, the system controller may then block access by the network device of the contractor, after which the network device of the contractor may not be able to connect (e.g., remotely connect) to the system controller.

The design software may obtain a system identifier (ID) from the system controller at 1132. The design software may transmit the system ID to an external cloud server managed by the manufacturer of the load control system at 1134. The design software may transmit a signed security certificate to the external could service. The signed security certificate may provide authorization for the external cloud server to grant the network device remote access to the system controller. The system ID may be associated with the user account of the homeowner at 1136, after which the homeowner may have local and remote access to connect the network device to the system controller using the design software at 1138.

Figure 12:
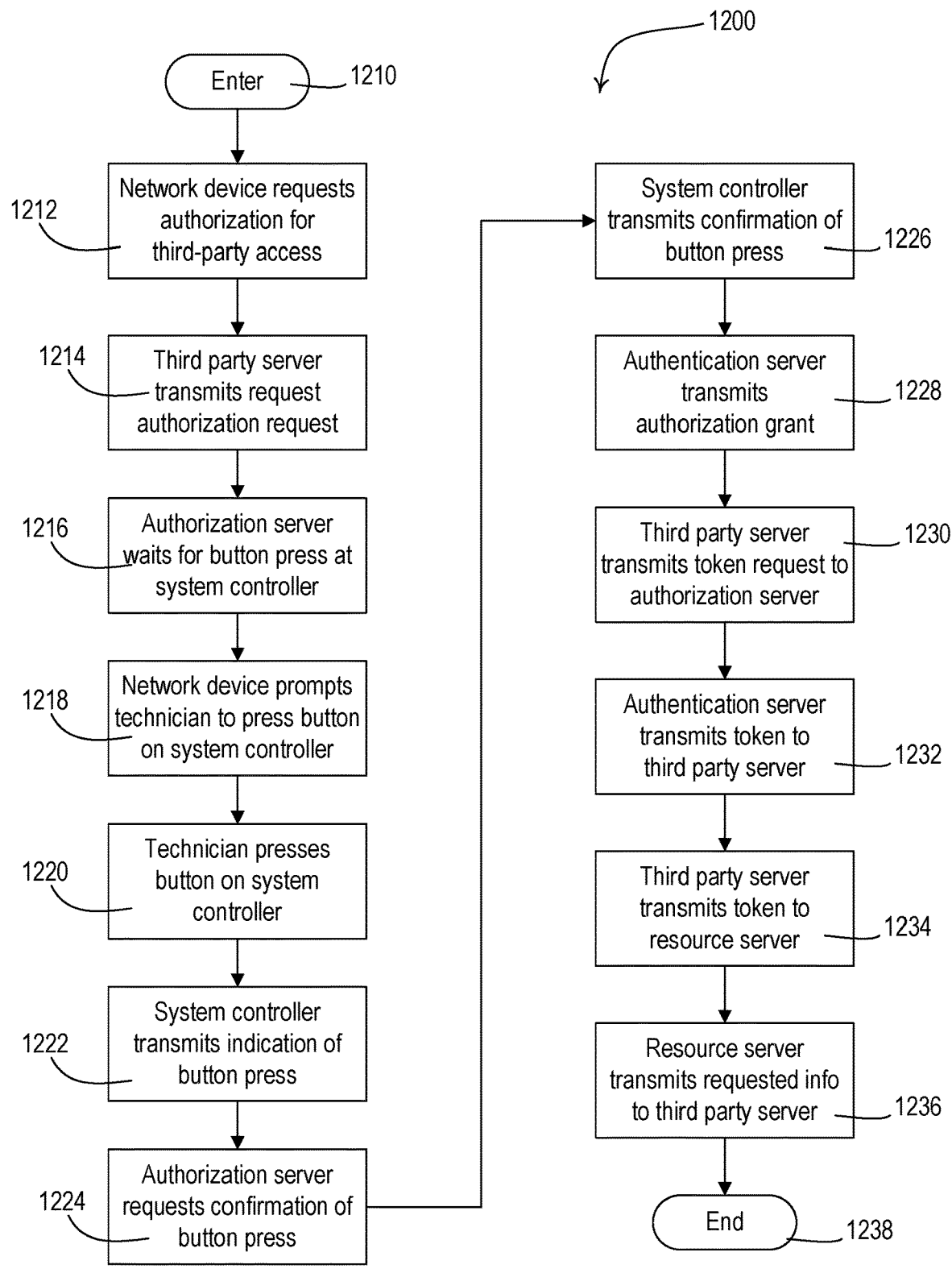
FIG. 12 depicts a flow diagram of an example method for configuring access to a load control system.

FIG. 12 is a flow diagram of an example method 1200 for configuring access services for a load control system. The method 1200 may be performed by a network device, a system controller in a load control system, third party servers, authentication servers and/or resources servers. The method 1200 may be performed on a single device, or may be distributed across multiple devices. For example, the method 1200, or portions thereof, may be performed by the system controller, third party servers, authentication servers, resources servers and/or one or more network devices, such as personal computers (PCs), laptops, tablets, smart phones, or equivalent devices having access to a visual display. The method 1200 may be performed on a system controller capable of displaying and retrieving information via an application on a network device or other device having a visual display. The method 1200 may be executed during the method 1100, for example, to configure third party services at 1120.

The method 1200 may begin at 1210. At 1212, a technician (e.g., a contractor) may use a network device to request authorization for access to a load control system by a third party service (e.g., Amazon Alexa voice service, Google Home, etc.). A technician may be any person configuring a third party service. The request may be transmitted and/or forwarded, by a server of the third party server, to an authorization server of the load control system at 1214. The third party server may be remotely located and/or controlled by another party (e.g., the third party requesting access to the load control system). The access request may include an identifier of the load control system (e.g., a media access control (MAC) address associated with the load control system or other unique identifier of the load control system). The request may include a location (e.g., a redirect Uniform Resource Identifier (URI)) to send an authorization grant. The request may include authorization grant type information. For example, the authorization grant type may be an authorization code. The request may include an indication of the type of access requested by the third party (e.g., read access, write access, read/write access, administrative access, user access, etc.) The request may include an indication of the identity of the third party service (e.g., a client identification).

After receiving the request, the authorization server may verify the access request. For example, at 1216, the authorization server may wait for a verification from the load control system. The verification may be performed by physical action (e.g., an event) at the load control system. For example, the verification may be receiving an indication of a button press on a device in the load control system. The button may be located on the system controller and/or a device associated with the system controller (e.g., the remote control device 122). A button press on a device that is physically located within the load control system may indicate that the third party service is authorized to access the load control system. At 1218, the network device may prompt the contractor to press the button on the system controller or other device. At 1220, the contractor may press the button, which may be located on the system controller. When the button has been pressed, the system controller may transmit an indication of the button press to the authorization server at 1222. The request may not be verified if the button is not pressed before a verification timer expires. As discussed herein, the button may be located on the system controller and/or a device associated with the system controller (e.g., the remote control device 122). At 1224, the authorization server may request confirmation of the button press from the system controller. If the system controller confirms the button press, the system controller may transmit a conformation to the authorization server at 1226.

At 1228, the authorization server may transmit an authorization grant. The authorization grant may be transmitted to the third party server. For example, the authorization grant may be transmitted to a location specified by the third-party server in the authorization request sent at 1216 (e.g., a redirect URI). The third-party server may request a token from the authorization at 1230. At 1232, the authorization server may transmit a token to third party server. The token may be used to access the load control system and/or information associated with the load control system. At 1234, the third party server may transmit a request to a resource server. The request may be for access to the load control system and/or for information associated with the load control system. The request may include the token received at step 1232. At 1236, the resource server may transmit access to the load control system and/or information associated with the load control system to the third party server. For example, the resource server may transmit system configuration information, status of load control devices or electrical loads (e.g., lighting levels) in the load control system, or other information about the system. The third party (e.g. the contractor) may then access the load control system and/or information associated with the load control system. The system may be controlled in response to the access that is granted.

Figure 13:
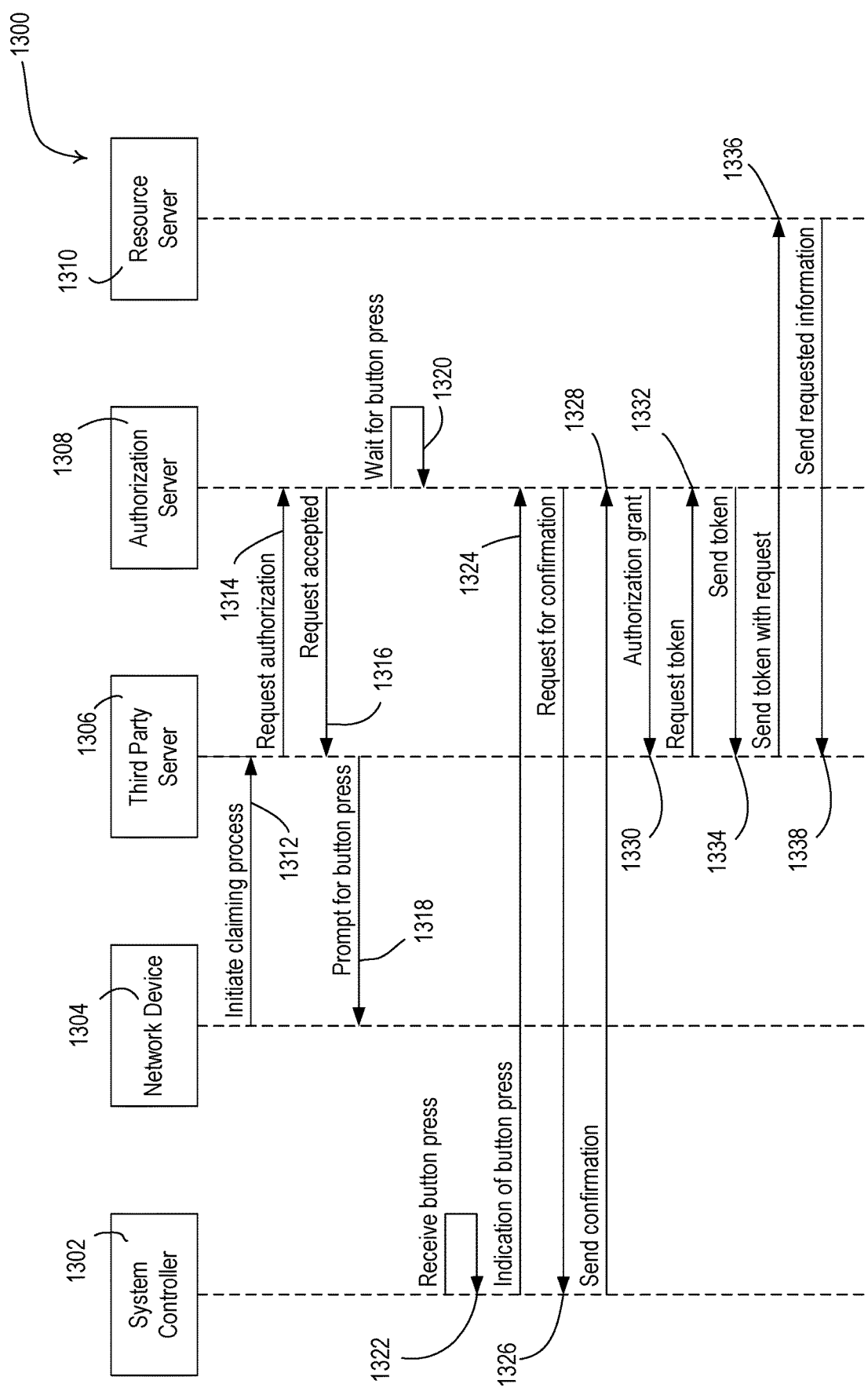
FIG. 13 is a sequence diagram of an example system for configuring access to a load control system.

FIG. 13 is a sequence diagram illustrating communications of an example system 1300 to configure a third party service with access to a load control system and/or information associated with a load control system. The system 1300 may include a system controller 1302, a network device 1304, a third party server 1306, an authorization server 1308, and/or a resource server 1310. The system controller 1302 may be associated with a load control system (e.g., the system controller 150 of the load control system 100) for performing load control. The network device 1304 may be configured to communicate with the system controller 1302. For example, the network device may be a smart phone and/or tablet that may be used by a third party (e.g., contractor) to configure the system. The third party server 1306 may be owned and/or operated by a third party service (e.g., a third-party service provider such as Alexa, etc.). The third party server 1306 may not have access to the system controller 1302 and/or the load control system associated with the system controller 1302. The third party server 1306 may be located remotely from the system controller 1302 and/or the network device 1304. The authorization server 1308 may manage authorizations for access by the third-party service to the load control system (e.g., the system controller 1302 and/or a load control system associated with the system controller 1302). The resource server 1310 may manage access by the third party service to the load control system (e.g., the system controller 1302 and/or a load control system associated with the system controller 1302), for example, to obtain information regarding the load control system and/or to control the load control system.

At 1312, the network device 1304 may initiate a claiming process with a third party server 1306. The claiming process may include transmitting an identification of the load control system (e.g., a MAC address of a system controller associated with the load control system) to which the third party service may want to access to provide third party services. At 1314, the third party server 1306 may transmit an authorization request. The authorization request may be sent to the authorization server 1308. The authorization request may include an identification of the load control system (e.g., a MAC address associated with the load control system).

The authorization server 1308 may receive the authorization request from the third party server 1306. At 1316, the authorization server 1308 may transmit a message indicating that the authorization request was accepted to the third party server 1306. The authorization server 1308 may start a timer and wait for a button press at 1320. After receiving the message indicating that the authorization request was accepted at 1316, the third party server 1306 may prompt the user of the network device to perform a physical authentication at the load control system. For example, the third-party server 1306 may prompt the user of the network device to press a button on a device (e.g., system controller 1302 or another device) in the load control system.

At 1322, the system controller 1302 may wait for a button press, which may act as a physical access authentication. For example, the button may be located on the system controller 1302 or on a device associated with the system controller 1302. When the system controller 1302 detects that the button has been pressed, the system controller 1302 may transmit an indication of the button press to the authorization server 1308 at 1324. At 1326, the authorization server 1308 may receive an indication of the button press and request confirmation of the button press from the system controller 1302. The request for confirmation may serve as an added level of security to ensure that the button press, or other physical action, was actually recognized by the system. The button press, or other physical action, may occur once, but the authorization server 1308 may request confirmation of the button press from the system controller 1302 to ensure the system controller 1302 recognized the button press. If the system controller 1302 confirms that the button has been pressed, the system controller 1302 may send confirmation to the authorization server 1308 at 1328.

At 1330, the authorization server may transmit an authorization grant to the third party server 1306. For example, the authorization grant may be transmitted to a location specified by the authorization server 1306 in the authorization request transmitted at 1314 (e.g., a redirect URI). After receiving the authorization grant, the third party server 1306 may transmit a token request to the authorization server 1308 at 1332. The authorization server 1308 may then transmit a token to the third party server 1306 at 1334. The token may be used by the third party service to access the load control system, for example, for obtaining information regarding the load control system and/or for controlling the load control system. For example, at 1336, the third party server 1306 may transmit an information request to the resource server 1310. The request may include the token transmitted to the third party server 1306 at 1334. After receiving the request, which may include the token, the resource server 1310 may transmit the requested information or services to the third party server 1306 at 1338.

Figure 14:
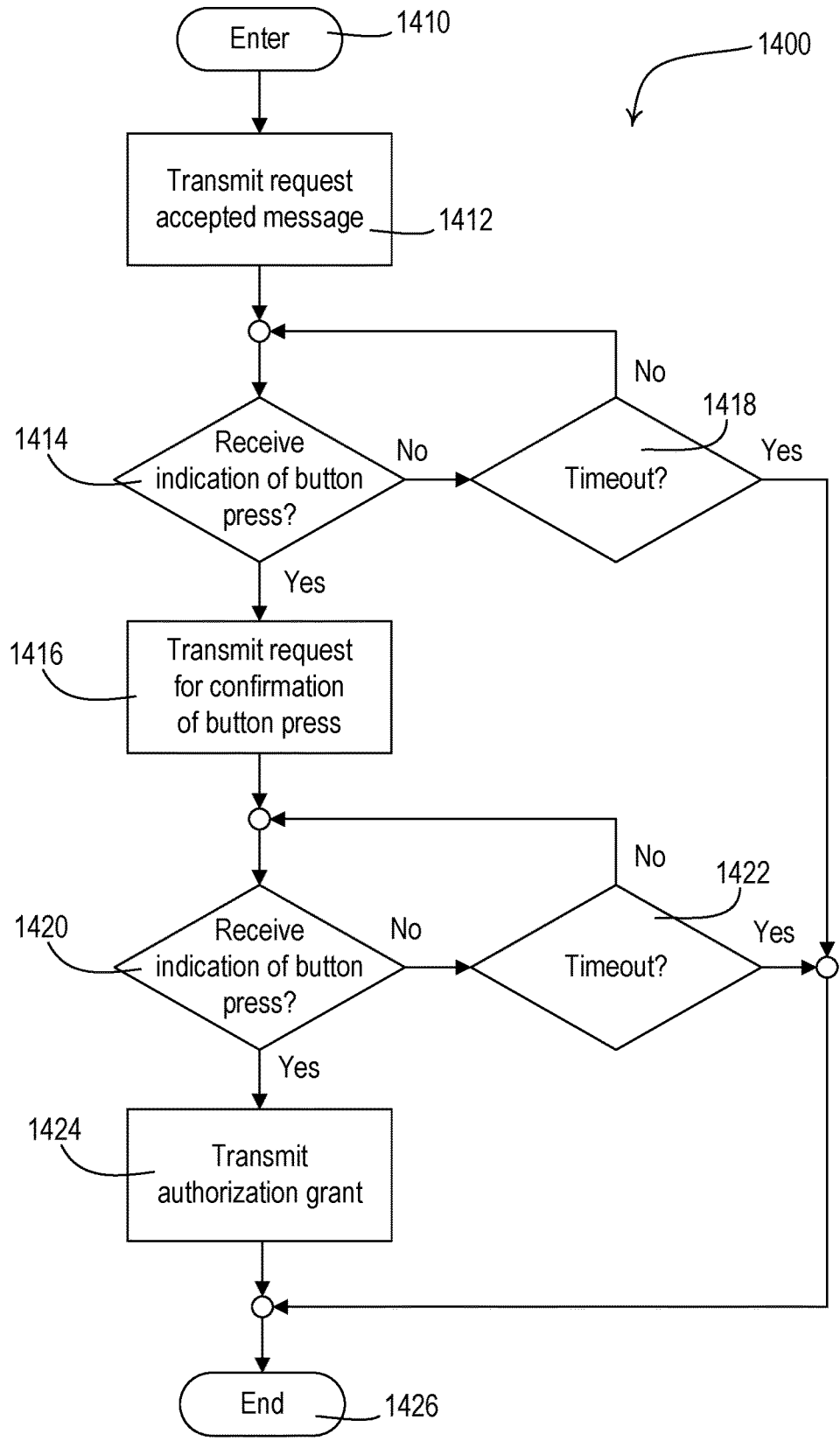
FIG. 14 depicts another flow diagram of an example method for configuring access to a load control system.

FIG. 14 is a flow diagram of an example method 1400 for granting a third party authorization to access a load control system. The method 1400 may be performed by a network device and/or a server (e.g., an authentication server, a resource server, and/or a third party server). The method 1400 may be performed on a single device, or may be distributed across multiple devices. For example, the method 1400, or portions thereof, may be performed by one or more network devices, such as personal computers (PCs), laptops, tablets, smart phones, or servers.

The method 1400 may begin at 1410. For example, a device (e.g., an authorization server) may receive an authorization request from another device (e.g., a third party server) at 1410. The authorization request may request access to a system (e.g. a load control system). At 1412, the device (e.g., the authorization server) may transmit a message, indicating that the request has been accepted, to another device (e.g., the third party server). The device may transmit the message indicating that the request has been accepted at 1412, for example, if the authorization request includes certain information. For example, the device (e.g., authorization server) may transmit the request accepted message if the authorization request includes an identifier of the system (e.g. a MAC address associated with the system).

At 1414, the device (e.g., authorization server) may monitor for a message indicating an access verification. For example, the access verification may be an indication of a button press by a device in the load control system. The device may start a timer after receiving the authorization request at 1410. The timer may expire after a period of time. At 1418, the device may monitor for the access verification at 1414 until the timer expires. If the timer expires at 1418 before the device (e.g., the authorization server) receives the access verification, the method 1400 may end at 1426.

When the device (e.g., the authorization server) receives an access verification (e.g., an indication of a button press at the system controller or another device in the load control system), the device may transmit a request for confirmation of the access verification to the system (e.g., the system controller or other device in the load control system) at 1416. At 1420, the device (e.g., the authorization server) may monitor for confirmation of the access verification. The device (e.g., the authorization server) may start a timer after transmitting a request for confirmation to the system. The timer may expire after a period of time. At 1422, the device (e.g., the authorization server) may monitor for confirmation of the access verification until the timer expires. If the timer expires before the device (e.g., the authorization server) receives a confirmation of the button press, the method 1400 may end. When the device receives confirmation of the access verification, the device may transmit an authorization grant to another device (e.g., a third party server) at 1424 to access the load control system or information associated with the load control system. The authorization grant may include a token. The authorization grant may be transmitted to a location specified in the authorization request received at 1410. After the device transmits the authorization grant at 1424, the method 1400 may end at 1426.

Figure 15:
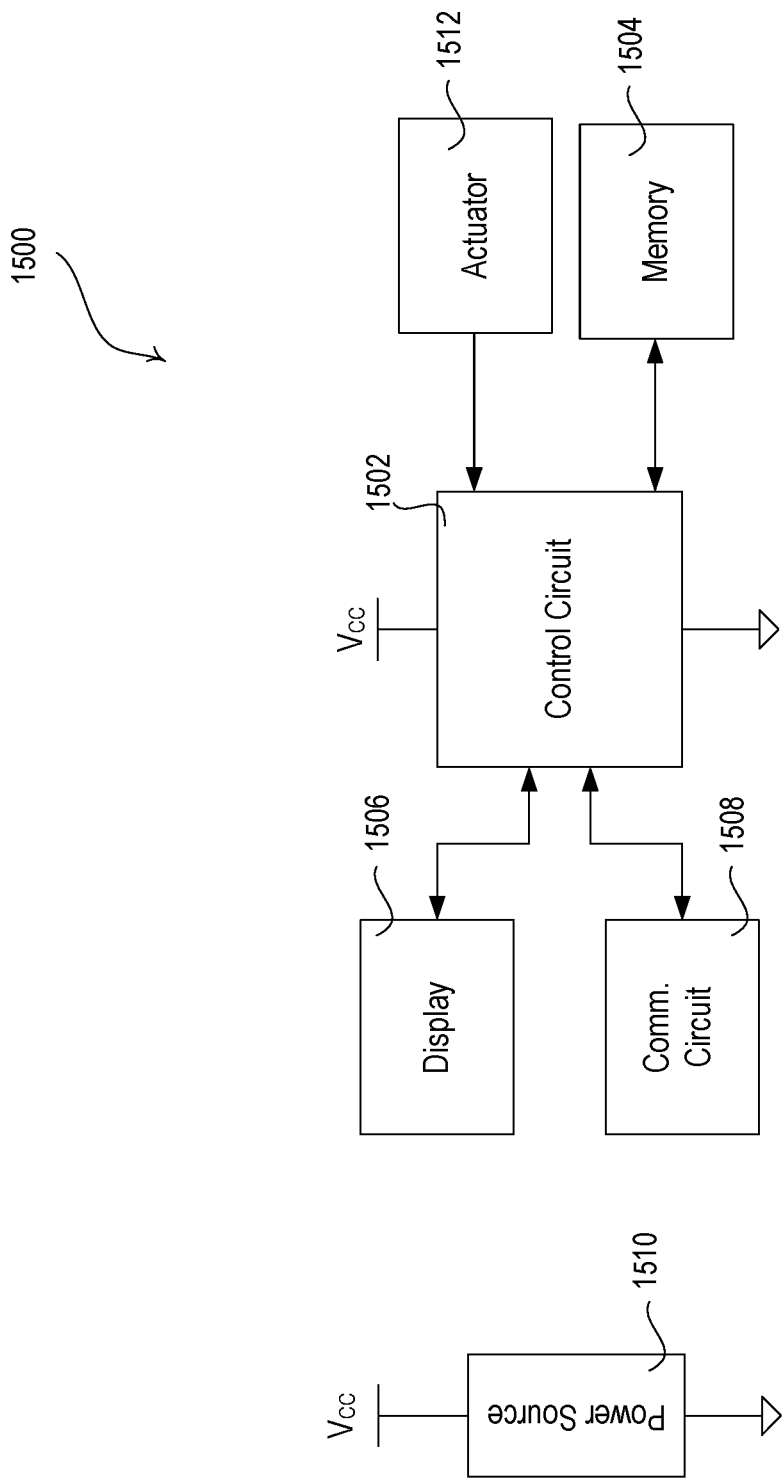
FIG. 15 is a block diagram of an example network device.

FIG. 15 is a block diagram illustrating an example computing device 1500. As described herein, a computing device may include a network device or a server device (e.g., authorization server, resource server, and/or third party server). The computing device 1500 may include a control circuit 1502 for controlling the functionality of the computing device 1500. The control circuit 1502 may include one or more general purpose processors, special purpose processors, conventional processors, digital signal processors (DSPs), microprocessors, integrated circuits, a programmable logic device (PLD), application specific integrated circuits (ASICs), or the like. The control circuit 1502 may perform signal coding, data processing, power control, input/output processing, or any other functionality that enables the computing device 1500 to perform as described herein. The control circuit 1502 may store information in and/or retrieve information from the memory 1504. The memory 1504 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The computing device 1500 may include a communications circuit 1508 for transmitting and/or receiving information. The communications circuit 1508 may perform wireless and/or wired communications. The communications circuit 1508 may include an RF transceiver or other circuit capable of performing wireless communications via an antenna. Communications circuit 1508 may be in communication with control circuit 1502 for transmitting and/or receiving information.

The control circuit 1502 may be in communication with a display 1506 for providing information to a user. The processor 1502 and/or the display 1506 may generate GUIs for being displayed on the computing device 1500. The display 1506 and the control circuit 1502 may be in two-way communication, as the display 1506 may include a touch screen module capable of receiving information from a user and providing such information to the control circuit 1502. A computing device may not include a display 1506. For example, a server device (e.g., Amazon Echo, Google Home, etc.) may not include a display 1506. The computing device 1500 may include an actuator 1512 (e.g., one or more buttons) that may be actuated by a user to communicate user selections to the control circuit 1502.

Each of the modules within the computing device 1500 may be powered by a power source 1510. The power source 1510 may include an AC power supply or DC power supply, for example. The power source 1510 may generate a supply voltage Vcc for powering the modules within the computing device 1500.

Figure 16:
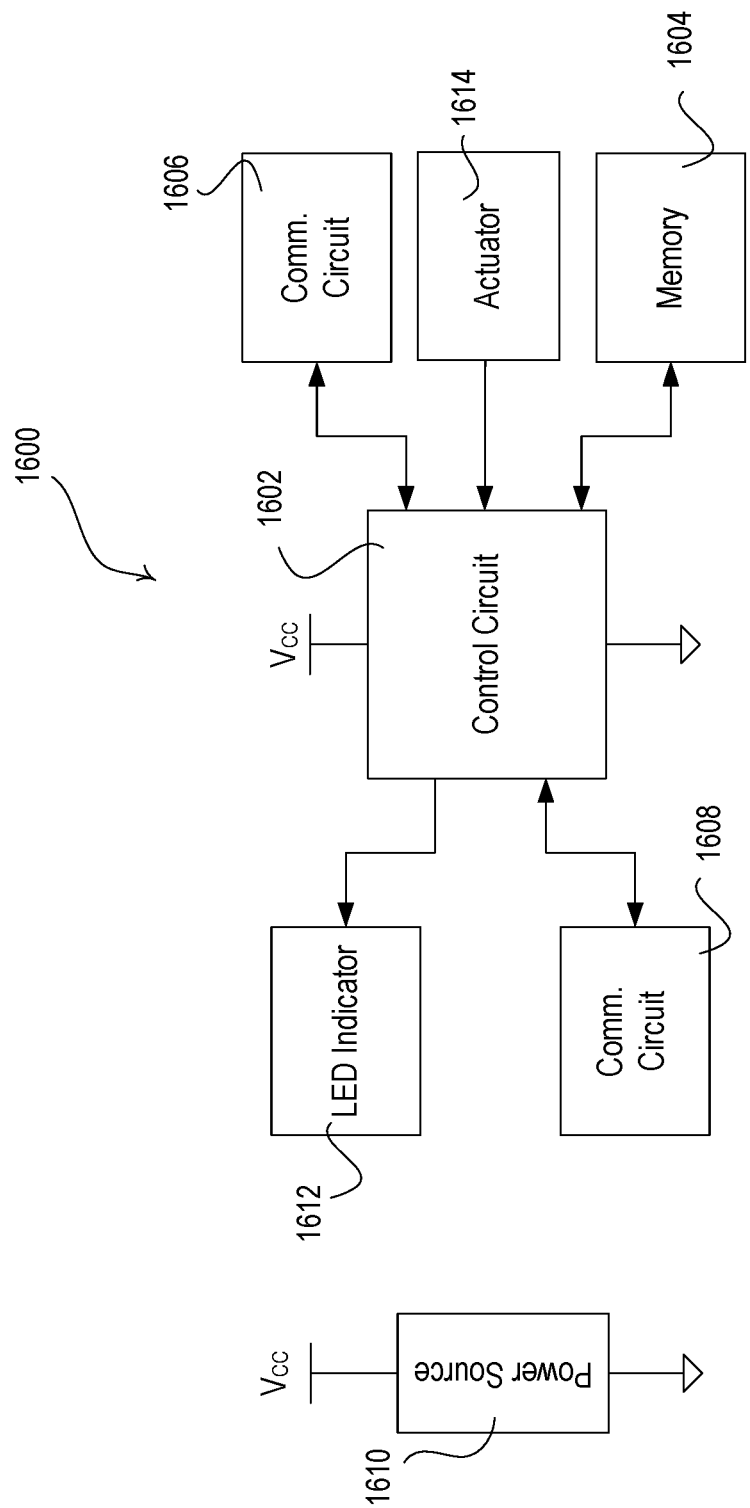
FIG. 16 is a block diagram of an example system controller.

FIG. 16 is a block diagram illustrating an example system controller 1600 (such as system controller 150, described herein). The system controller 1600 may include a control circuit 1602 for controlling the functionality of the system controller 1600. The control circuit 1602 may include one or more general purpose processors, special purpose processors, conventional processors, digital signal processors (DSPs), microprocessors, integrated circuits, a programmable logic device (PLD), application specific integrated circuits (ASICs), or the like. The control circuit 1602 may perform signal coding, data processing, power control, input/output processing, or any other functionality that enables the system controller 1600 to perform as described herein. The control circuit 1602 may store information in and/or retrieve information from the memory 1604. The memory 1604 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1600 may include a communications circuit 1606 for transmitting and/or receiving information. The communications circuit 1606 may perform wireless and/or wired communications. The system controller 1600 may also, or alternatively, include a communications circuit 1608 for transmitting and/or receiving information. The communications circuit 1606 may perform wireless and/or wired communications. Communications circuits 1606 and 1608 may be in communication with control circuit 1602. The communications circuits 1606 and 1608 may include RF transceivers or other communications modules capable of performing wireless communications via an antenna. The communications circuit 1606 and communications circuit 1608 may be capable of performing communications via the same communication channels or different communication channels. For example, the communications circuit 1606 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 1608 may be capable of communicating (e.g., with control devices and/or other devices in the load control system) via another wireless communication channel (e.g., WI-FI® or a proprietary communication channel, such as CLEAR CONNECT™).

The control circuit 1602 may be in communication with an LED indicator 1612 for providing indications to a user. The control circuit 1602 may be in communication with an actuator 1614 (e.g., one or more buttons) that may be actuated by a user to communicate user selections to the control circuit 1602. For example, the actuator 1614 may be actuated to put the control circuit 1602 in an association mode and/or communicate association messages from the system controller 1600.

Each of the modules within the system controller 1600 may be powered by a power source 1610. The power source 1610 may include an AC power supply or DC power supply, for example. The power source 1610 may generate a supply voltage Vcc for powering the modules within the system controller 1600.

Figure 17:
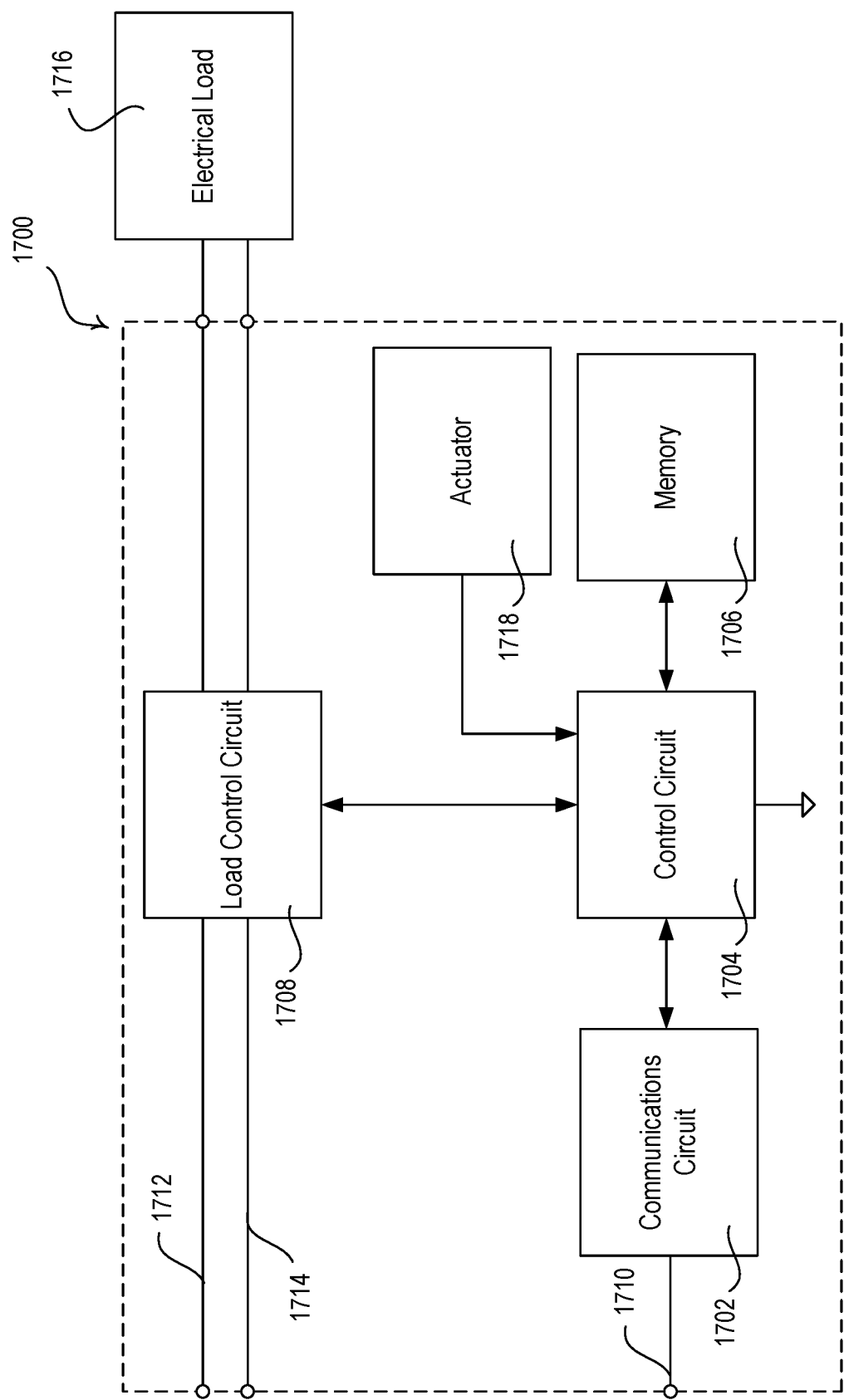
FIG. 17 is a block diagram of an example control-target device.

FIG. 17 is a block diagram illustrating an example control-target device, e.g., a load control device 1700, as described herein. The load control device 1700 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 1700 may include a communications circuit 1702. The communications circuit 1702 may include a receiver, an RF transceiver, or other communications module capable of performing wired and/or wireless communications via communications link 1710. The communications circuit 1702 may be in communication with control circuit 1704. The control circuit 1704 may include one or more general purpose processors, special purpose processors, conventional processors, digital signal processors (DSPs), microprocessors, integrated circuits, a programmable logic device (PLD), application specific integrated circuits (ASICs), or the like. The control circuit 1704 may perform signal coding, data processing, power control, input/output processing, or any other functionality that enables the load control device 1700 to perform as described herein.

The control circuit 1704 may store information in and/or retrieve information from the memory 1706. For example, the memory 1706 may maintain a registry of associated control devices and/or control instructions. The memory 1706 may include a non-removable memory and/or a removable memory. The load control circuit 1708 may receive instructions from the control circuit 1704 and may control the electrical load 1716 based on the received instructions. The load control circuit 1708 may send status feedback to the control circuit 1704 regarding the status of the electrical load 1716. The load control circuit 1708 may receive power via the hot connection 1712 and the neutral connection 1714 and may provide an amount of power to the electrical load 1716. The electrical load 1716 may include any type of electrical load.

The control circuit 1704 may be in communication with an actuator 1718 (e.g., one or more buttons) that may be actuated by a user to communicate user selections to the control circuit 1704. For example, the actuator 1718 may be actuated to put the control circuit 1704 in an association mode and/or communicate association messages from the load control device 1700.

Figure 18:
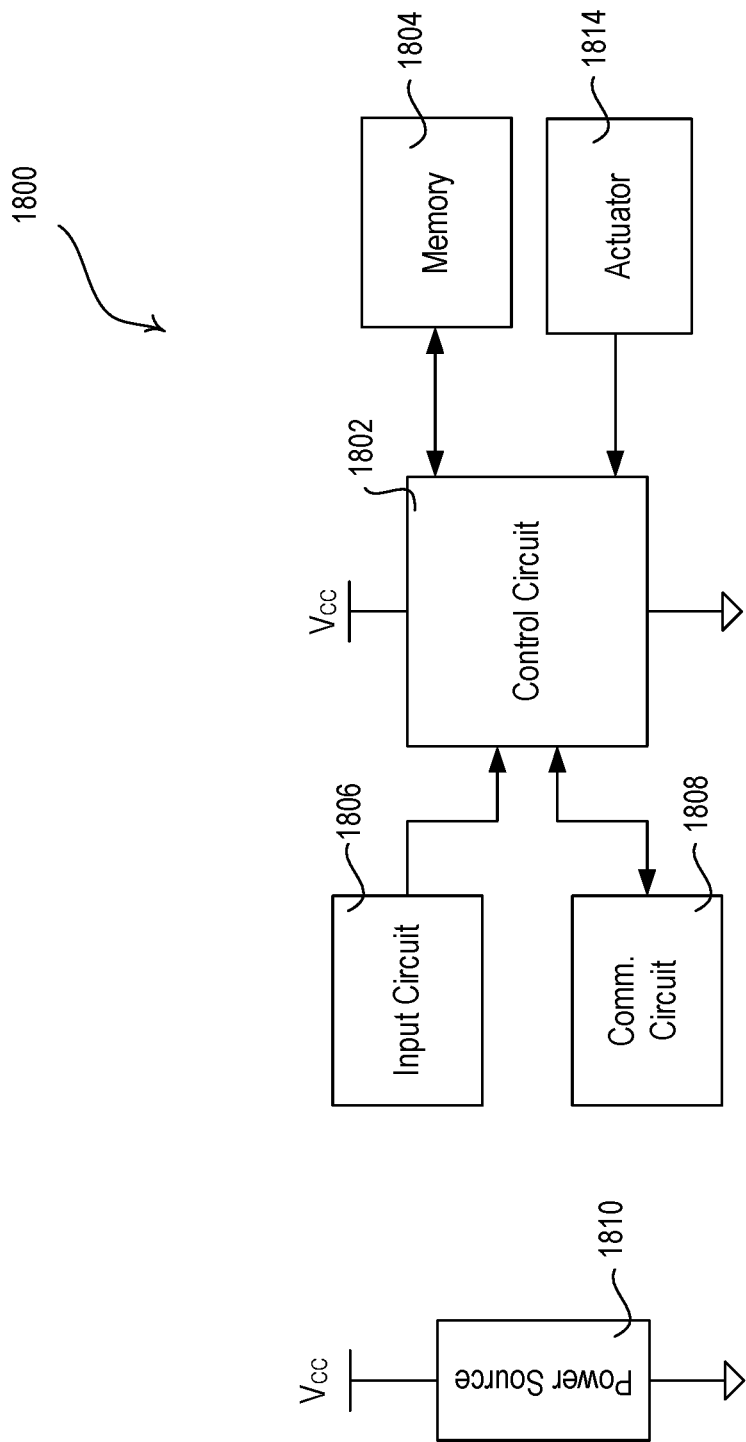
FIG. 18 is a block diagram of an example control-source device.

FIG. 18 is a block diagram illustrating an example control-source device 1800 as described herein. The control-source device 1800 may be a remote control device, an occupancy sensor, a daylight sensor, a window sensor, a temperature sensor, and/or the like. The control-source device 1800 may include a control circuit 1802 for controlling the functionality of the control-source device 1800. The control circuit 1802 may include one or more general purpose processors, special purpose processors, conventional processors, digital signal processors (DSPs), microprocessors, integrated circuits, a programmable logic device (PLD), application specific integrated circuits (ASICs), or the like. The control circuit 1802 may perform signal coding, data processing, power control, input/output processing, or any other functionality that enables the control-source device 1800 to perform as described herein.

The control circuit 1802 may be in communication with an actuator 1814 (e.g., one or more buttons) that may be actuated by a user to communicate user selections to the control circuit 1802. For example, the actuator 1814 may be actuated to put the control circuit 1802 in an association mode and/or communicate association messages from the control-source device 1800. The control circuit 1802 may store information in and/or retrieve information from the memory 1804. The memory 1804 may include a non-removable memory and/or a removable memory, as described herein.

The control-source device 1800 may include a communications circuit 1808 for transmitting and/or receiving information. The communications circuit 1808 may transmit and/or receive information via wired and/or wireless communications. The communications circuit 1808 may include a transmitter, an RF transceiver, or other circuit capable of performing wired and/or wireless communications. The communications circuit 1808 may be in communication with control circuit 1802 for transmitting and/or receiving information.

The control circuit 1802 may be in communication with an input circuit 1806. The input circuit 1806 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 1806 to put the control circuit 1802 in an association mode and/or communicate association messages from the control-source device. The control circuit 1802 may receive information from the input circuit 1806 (e.g. an indication that a button has been actuated or sensed information). Each of the modules within the control-source device 1800 may be powered by a power source 1810.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A method of configuring a load control system, the method comprising:
   collecting, via at least one processor, control devices for configuration, wherein each of the control devices are associated with a light type information and location information that indicates a respective location name for each of the control devices in the load control system;
   automatically determining, via the at least one processor, programming data for controlling electrical loads in the load control system based on the light type information and location information for each of the respective collected control devices; and
   transmitting, via at least one communications circuit, the determined programming data to the control devices to enable control of the electrical loads.

2. The method of claim 1, further comprising:
   displaying, via a display, the determined programming data on a network device;
   receiving, via the at least one processor, a user selection to edit a control feature of the programming data; and
   transmitting, via the at least one communications circuit, the edited programming data to the control devices for controlling the electrical loads.

3. The method of claim 2, wherein the control feature corresponds to an identified type of the control devices, and wherein the edited programming data is transmitted to the identified type of the control devices for enabling control.

4. The method of claim 2, further comprising:
   in response to the user selection to edit the control feature, storing an indication that the control feature has been edited, and wherein the indication is configured to prevent the user selection from being overwritten by later automatic updates to the programming data.

5. The method of claim 2, wherein the user selection to edit the programming data is received in response to a prompt providing a recommendation to edit the programming data to alternative programming data.

6. The method of claim 1, wherein collecting the control devices further comprises:
   choosing, via a display, a type of control device to add to the load control system;

actuating a button at a control device of the collected control devices, wherein actuating the button is configured to transmit an identifier of the control device to a system controller;

selecting, via the display, a room in which the control device is located; and storing an identifier and the selected room in a database.

7. The method of claim 6, wherein the control device is a lighting control device, and wherein collecting the lighting control devices further comprises:

selecting, via the display, a light type for a lighting load controlled by the control device;

displaying, via a display, a tile to identify the light type; and storing the light type with the identifier and the selected room in the database.

8. The method of claim 1, wherein the control devices comprise lighting control devices and the programming data comprises control settings for at least one of a scene, a schedule, or an automated control feature, and wherein the automatically determined programming data for each lighting control device is further based on a light type of a lighting load controlled by the lighting control device.

9. The method of claim 8, wherein the control settings comprise a dimming level that is automatically determined for each lighting control device for the scene, the schedule, or the automated control feature.

10. The method of claim 1, wherein the programming data is automatically determined based on information stored in a lookup table, wherein the lookup table includes the location information for each of the collected control devices, the light type information, and scene levels.

11. The method of claim 10, wherein the electrical loads comprise lighting loads, and wherein the lookup table includes a rule for each location in the location information that defines a minimum dimming level for at least one of the lighting loads.

12. The method of claim 1, further comprising:

accessing design software;

creating a user account via the design software after automatically determining the programming data for controlling the electrical loads in the load control system, wherein the programming data for controlling the electrical loads is based on light type information and location information for each of the collected control devices;

connecting a network device to a system controller of the load control system;

obtaining a system identifier (ID) from the system controller, wherein the system ID is associated with the user account;

transmitting, via the at least one communication circuit, the system ID to an external cloud server; and accessing the system controller via the network device to control the electrical loads.

13. The method of claim 12, further comprising:

sending, via the at least one communication circuit, an email that includes instruction for how to create the user account that will allow the user to access the programming data to configure, control, and monitor operation of the electrical loads;

wherein accessing design software comprises accessing the design software via a link in the email.

14. The method of claim 1, further comprising:

after a control device is collected, determining, via the at least one processor, a control feature for the programming data that is associated with the collected control device;

adding the control feature for the collected control device to a list of control features for the load control system when the control feature is not already in the list of control features for the load control system; and wherein other programming data is automatically determined for the control feature associated with the collected control device after the control feature is added to the list of control features.

15. The method of claim 14, wherein the other programming data is automatically determined for the control feature after the control feature has been determined to be unedited by a user selection.

16. The method of claim 14, wherein the other programming data is automatically determined for control devices added since a last update, while the programming data is unedited for control devices added prior to the last update.

17. The method of claim 14, wherein the list of control features corresponds to a list of control devices identified in a transfer queue for being transferred the programming data; and wherein the list of control devices are prioritized in the transfer queue according to at least one of a device type or a location, wherein the control devices having the prioritized device type or location are given a higher priority for receiving the programming data.

18. The method of claim 14, wherein the list of control features corresponds to a list of control devices identified in a transfer queue for being transferred the programming data; and wherein the control features that have been transferred are available for controlling the electrical loads in the load control system while the other control features are in the transfer queue or are being transferred.

19. A method of configuring a load control system, the method comprising:

accessing, via a network device, design software;

automatically determining programming data for controlling electrical loads in the load control system, wherein the programming data is automatically determined for the electrical loads based on light type information and location information that are associated with each of the respective electrical loads;

creating a user account via the design software after automatically determining the programming data for controlling the electrical loads in the load control system;

connecting the network device to a system controller of the load control system;

obtaining a system identifier (ID) from the system controller, wherein the system ID is associated with the user account;

transmitting the system ID to an external cloud server managed by a manufacturer of the load control system; and accessing the system controller via the network device to control the electrical load.

20. The method of claim 19, further comprising:

receiving, via at least one communication circuit, an indication of a button press on the system controller; and identifying the button press as a verification of an authorization request from a third party server.

21. The method of claim 19, wherein the programming data is automatically determined based on information stored in a lookup table, wherein the lookup table includes the respective location information location information that is associated with each of the electrical loads, the light type information, and scene levels.

22. The method of claim 21, wherein the electrical loads comprise lighting loads, and wherein the lookup table includes a rule for each location in the location information that defines a minimum dimming level for at least one of the lighting loads.

* * * * *